(12) United States Patent
Olsson et al.

(10) Patent No.: US 11,397,274 B2
(45) Date of Patent: Jul. 26, 2022

(54) TRACKED DISTANCE MEASURING DEVICES, SYSTEMS, AND METHODS

(71) Applicant: SeeScan, Inc., San Diego, CA (US)

(72) Inventors: Mark S. Olsson, La Jolla, CA (US); Michael J. Martin, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 46 days.

(21) Appl. No.: 16/241,864

(22) Filed: Jan. 7, 2019

(65) Prior Publication Data

US 2019/0243020 A1    Aug. 8, 2019

Related U.S. Application Data

(60) Provisional application No. 62/614,217, filed on Jan. 5, 2018.

(51) Int. Cl.
| | |
|---|---|
| *G01V 3/08* | (2006.01) |
| *G01S 17/08* | (2006.01) |
| *G01S 13/08* | (2006.01) |
| *G01V 3/15* | (2006.01) |
| *G01S 13/42* | (2006.01) |
| *G01S 17/89* | (2020.01) |

(Continued)

(52) U.S. Cl.
CPC .............. *G01V 3/081* (2013.01); *G01S 13/08* (2013.01); *G01S 13/42* (2013.01); *G01S 13/86* (2013.01); *G01S 13/88* (2013.01); *G01S 15/08* (2013.01); *G01S 17/08* (2013.01); *G01S 17/86* (2020.01); *G01S 17/89* (2013.01); *G01S 19/13* (2013.01); *G01V 3/15* (2013.01); *G01V 3/38* (2013.01)

(58) Field of Classification Search
CPC . G01R 19/00; G01V 3/15; G01V 3/00; G01V 3/081; G01V 3/104; G01V 3/165; G01V 3/38; G01S 17/08; G01S 13/86; G01S 17/86; G01S 15/08; G01S 17/89; G01S 13/42; G01S 13/08; G01S 13/88; G01S 19/13
See application file for complete search history.

(56) References Cited

U.S. PATENT DOCUMENTS

| | | |
|---|---|---|
| 7,443,154 B1 | 10/2008 | Merewether et al. |
| 7,755,360 B1 | 7/2010 | Martin |

(Continued)

FOREIGN PATENT DOCUMENTS

WO    2016003938 A1    1/2016

OTHER PUBLICATIONS

International Searching Authority, "Written Opinion of the International Searching Authority" for PCT Patent Application No. PCT/US2018/013014, dated Jul. 12, 2018, European Patent Office, Munich.

*Primary Examiner* — Lee E Rodak
*Assistant Examiner* — Brent J Andrews
(74) *Attorney, Agent, or Firm* — Steven C. Tietsworth, Esq.

(57) ABSTRACT

Tracked distance measuring device, systems, and methods for determining and mapping point of interest for use in utility locating operations and other mapping applications are disclosed. A tracked distance measuring device embodiment includes simultaneously triggered rangefinder and positioning elements to measure a distance and determine location and pose, optionally in conjunction with a utility locator.

24 Claims, 31 Drawing Sheets

(51) Int. Cl.
*G01S 13/88* (2006.01)
*G01S 13/86* (2006.01)
*G01S 17/86* (2020.01)
*G01S 15/08* (2006.01)
*G01S 19/13* (2010.01)
*G01V 3/38* (2006.01)

(56) References Cited

U.S. PATENT DOCUMENTS

| | | |
|---|---|---|
| 9,081,109 B1 | 7/2015 | Olsson et al. |
| 9,465,129 B1 | 10/2016 | Olsson et al. |
| 2012/0242341 A1* | 9/2012 | Olsson .................. G01R 19/00 324/326 |
| 2014/0313321 A1 | 10/2014 | Olsson et al. |
| 2015/0077120 A1 | 3/2015 | Olsson et al. |
| 2015/0123664 A1 | 5/2015 | Olsson et al. |
| 2016/0187522 A1* | 6/2016 | Olsson ..................... G01V 3/00 324/326 |

* cited by examiner

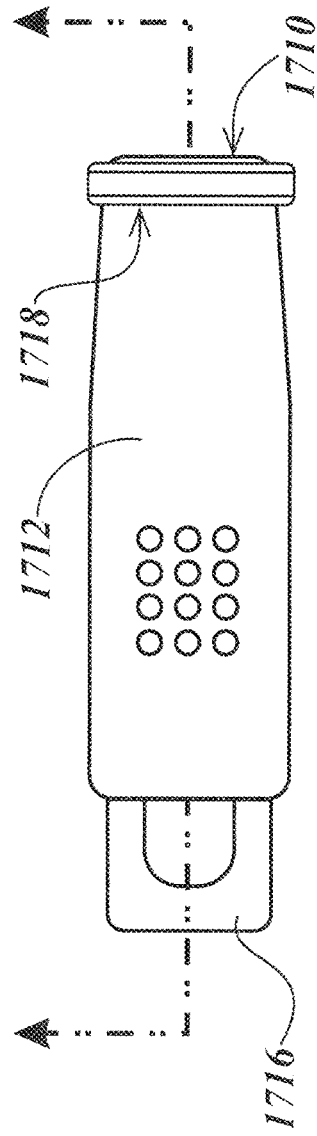
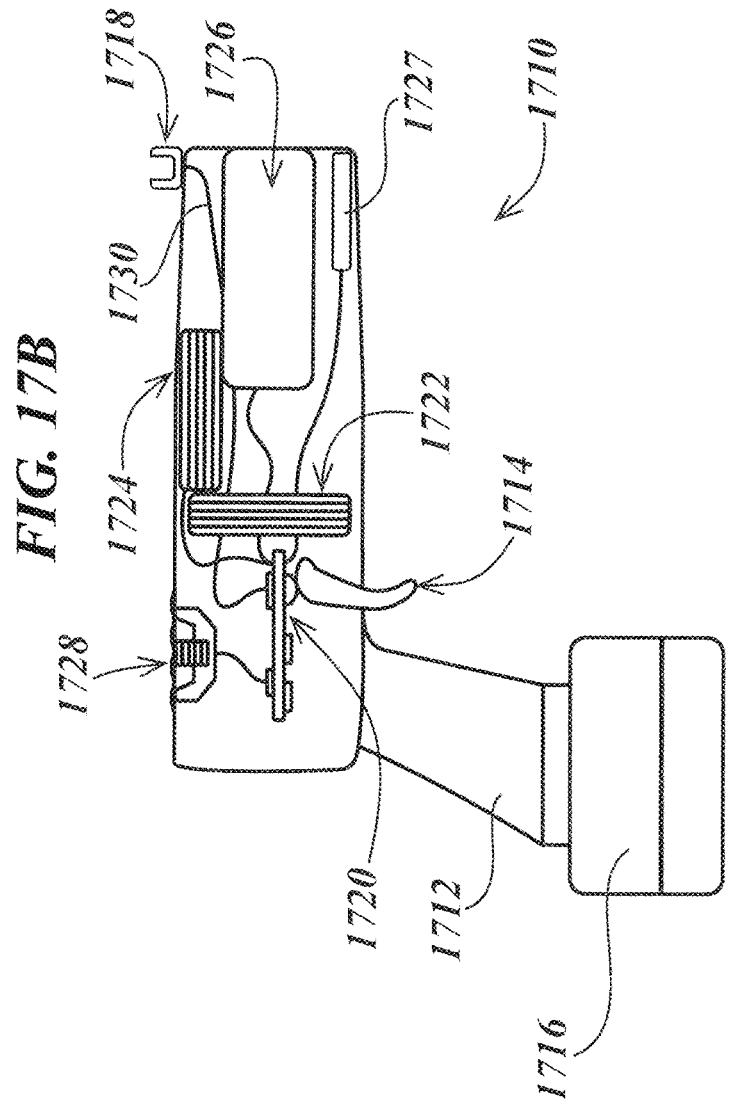
FIG. 17B
FIG. 17C

TRACKED DISTANCE MEASURING DEVICES, SYSTEMS, AND METHODS

CROSS REFERENCE TO RELATED APPLICATIONS

This application claims priority under 35 U.S.C. § 119(e) to U.S. Provisional Patent Application Ser. No. 62/614,217, entitled TRACKED DISTANCE MEASURING DEVICES, SYSTEMS, AND METHODS, filed Jan. 5, 2018. The content of that application is hereby incorporated by reference herein in its entirety for all purposes.

FIELD

This disclosure relates generally to distance measuring devices, systems, and methods. More specifically, but not exclusively, the disclosure relates to tracked distance measuring devices, systems, and methods for use with utility locating and mapping systems to identify and map points of interest (POIs).

BACKGROUND

In typical mapping systems, one or more points of interest (POIs) may be included with other map information to show a location or feature within the mapped area. For example, locations of important landmarks or tourist attractions, hospitals or other service facilities, utility assets such as fire plugs, covers, pipe penetrations, electrical boxes, and the like, environmental features that can distort signals (such as those used in utility locating), and other items, features, or characteristics which may be of interest or otherwise desirable to be used in a mapping system may be included. Including POIs in maps can be useful in future work, such as future locate operations.

Some POIs may also be arbitrarily selected by a user and need not specifically correspond to an attraction or feature, but may nevertheless provide useful future information. In some mapping systems, particularly digital mapping systems, points of interest may further include metadata associated with each feature (e.g., information about that location or services offered or the like). Creation of such POIs often requires manual input by a user and/or image recognition algorithms to identify them. Manual input of points of interest can be labor intensive and subject to human error, whereas use of image recognition algorithms may fail to correctly identify and/or fail to provide the degree of location accuracy required in some mapping systems.

Utility locating systems are frequently used to determine the presence or absence and location of utility lines within the ground ("buried utilities" or "buried objects") and map their locations. Such systems may include a portable utility locator to measure magnetic field signals emitted from conductive utility lines, and/or other signals within the mapped area to determine the utility's location (commonly known as a "locate"). In many utility locating operations, various things within the locating operation (which may be POIs) can have a measurable effect on signals received at the utility locator device, affecting locating and mapping accuracy and reliability. For example, other conductive objects in proximity to a utility pipe or cable, other magnetic field sources, and/or environmental conditions may distort magnetic field signals emitted from utilities. In addition, it may be useful to map and provide precise locations for various other utility assets and infrastructure in a locate area, such as, for example, power poles, signs, valves, covers, transformer control systems, metallic structures, and the like. Existing utility locating and mapping systems and devices do not locate, map, or further identify such points of interest, thereby reducing accuracy and reliability. Failure of existing utility mapping systems and devices to identify POIs within the locate area may result in less than ideal fitting of utility location data to actual mapped areas, such as to reference maps.

Accordingly, there is a need for improved devices, systems, and methods to address the above described as well as other problems in the art.

SUMMARY

In one aspect, the disclosure relates to a distance measuring system. The distance measurement system may include, for example, a utility locator device including one or more magnetic field antennas, a processing element programmed with instructions for processing received magnetic field signals to determine relative position of one or more magnetic field signal sources and the locator and provide the determined relative position as locator output data and/or store the determined relative position in a non-transitory memory of the locator, a positioning element for determining a location of the signal tracking device in three dimensional space and providing output data defining the determined location, and a tracked distance measuring device. The tracked distance measuring device may include, for example, a housing, a rangefinder element for determining a distance or relative position to a point of interest (POI), and providing rangefinder output data corresponding to the determined distance or relative position to the POI, a magnetic field dipole sonde that may include an alternating current (AC) signal generator including an output for providing an output AC current signal at one or more predetermined frequencies and a magnetic field dipole antenna operatively coupled to the AC signal generator output to receive the output AC current signal and radiate a corresponding magnetic field dipole signal for sensing by the utility locator device. The tracked distance measurement device may further include an actuator mechanism operatively coupled to the rangefinder element and the magnetic field dipole sonde for triggering a distance determination and triggering generation of the magnetic field dipole signal in conjunction with the triggering a distance determination. The system may further include one or more non-transitory memories for storing the output data from the positioning device and the output data from the utility locator device, as well as other data, such as images or video, sensor data, or other system data or information.

In another aspect, the disclosure relates to method of measuring distance with a distance measuring system. The method may include, for example, triggering a tracked distance measuring device, in response to a user input, to initiate in conjunction a measurement of distance from a rangefinder element to a point of interest (POI) and transmission of a dipole magnetic field signal from a magnetic field dipole sonde element for sensing by a utility locator. The method may further include providing, from the tracked distance measurement device, the measurement as tracked distance measurement output data and determining absolute positional data at the locator using a positioning element and providing the absolute positional data as an output. The absolute positional data, the output data is processed in conjunction with the tracked distance measurement data, and relative positional data based on sensing of the dipole magnetic field signal at the locator may be processed to determine absolute positional data associated with the POI.

In another aspect, a tracked distance measuring device embodiment may include a body element housing a rangefinder element to measure the distance to a point of interest (POI) as well as a position element to determine the position of the tracked distance measuring device in three dimensional space as well as pose of the tracked distance measuring device at that location. An actuator may be included allowing a user to initiate measurement to a POI that may simultaneously correlate to the position of the tracked distance measuring device. The term "position," as used herein, refers to a location within three dimensional space in a relative or absolute coordinate system and/or as a pose that describes the direction and tilt at that location. The POI may be mapped based on the position data of the tracked distance measuring device and distance data determined therefrom. In some implementations, the POI may be outlined or traced by the tracked distance measuring device such that the outline of the POI may be mapped. Processing elements and data logging elements may further be included within the central body element or in a locator or other associated device to process and store data, which may include mapping information of POIs.

The rangefinder element may be a laser rangefinder utilizing a laser beam to determine distance to a POI or other rangefinding devices or systems. For example, in some embodiments, the rangefinder elements may instead be or include other types of rangefinders (e.g., radar, sonar, LiDAR, ultrasonic, and the like). In some embodiments, the rangefinder element may be modular or otherwise user attachable and removable from tracked distance measuring device. For example, the rangefinder element may be a commercially available distance meter device, such as the Leica DISTO™ line of laser distance meters, which may detachably couple to the tracked distance measuring device (e.g., a magnetic field utility locator or other device).

The rangefinder element may further be or include an optical ground tracking apparatus to determine position via optically tracking movements as it is moved about the ground surface within a locate area. The optical ground tracking device may further include a laser in a known or reference orientation relative to a camera or cameras on the optical ground tracking device, with the lasers (or other pointing mechanisms) used to direct the camera or cameras towards a POI, as well as for use in a method for determining the precise location of the POI. Camera(s) within the optical ground tracking device may generate images associated with the POI for mapping its location as well as identifying the POI. The optical ground tracking device may be positioned in a known orientation relative to a utility locator device allowing the POI range data generated by the optical ground tracking device to be communicated to and be tracked by the utility locator device.

In embodiments where an optical ground tracking device is equipped with two or more cameras collecting stereoscopic images of a single POI, three dimensional modeling of a POI may be implemented. The three dimensional modeled POI may be added to a map or mapping system covering the locate area.

The position element may include one or more dipole signal transmitters and associated magnetic antennas for generating and transmitting dipole magnetic field signals for detection by a corresponding signal tracking device, such as a locator's magnetic field antennas or antenna array. For example, in an exemplary embodiment, the signal tracking device may be a utility locator device such as those described in the incorporated patent and patent applications listed subsequently herein. The utility locator device may receive the transmitted signal or signals and determine and map information about the position including pose of each signal and thereby, information about the location of each POI. Gyroscopic and other inertial sensors may further be included within the position elements of a tracked distance measuring device.

The body element may also include various other sensors and other components. Such sensors and components may include, but are not limited to, Bluetooth radios/transceivers, Wi-Fi radios/transceivers, and/or other wireless communication devices, imaging sensors, audio sensors and recorders, gyroscopic sensors, accelerometers, other inertial sensors, and/or global positioning satellite (GPS) sensors or other satellite navigation sensors. The central body element may further include a power module containing batteries or other powering components for providing electrical power to the signal transmitter and/or other components of the tracked measuring device.

In exemplary utility locating and mapping system embodiments, the signal tracking device may be a utility locator device as further described in the incorporated patents and patent applications listed subsequently herein. The utility locator device may receive the transmitted signal or signals and determine and map information about the position including pose of each signal and thereby, information about the location of each POI. Gyroscopic and other inertial sensors may further be included within the position elements of a tracked distance measuring device.

In another aspect, the utility locator device of systems and methods herein receive the signal or signals from a tracked distance measuring device while simultaneously receiving signals from other sources such as, but not limited to, buried utility lines, pipe Sondes, and/or other system devices, and determine the position of each signal. The utility locator may use a dodecahedral or similar antenna array and associated components configured to make tensor gradient measurements of received magnetic field signals, such as described in the incorporated applications.

In another aspect, the present disclosure is directed towards corresponding methods for determining the position, which includes pose, of signals received at a utility locator from a tracked measuring device.

In another aspect, embodiment of the present disclosure may include one or more information input elements to associate and/or annotate POIs. The input elements of some embodiments may include methods and apparatus for taking audio notes created by a user and further correlating or associating such audio notes or other information with the POI, mark location, and/or other signal data. Speech-to-text (STT) type or similar or equivalent translating methods may be used to translate audio files and create virtual POIs that may further be used in the map systems containing utility information.

In another aspect, image recognition, artificial intelligence, simultaneous localization and mapping (SLAM), or similar or equivalent methods may be used to recognize and generate corresponding POI metadata from POI images.

In another aspect, in some stand-alone tracked distance measuring device system embodiments, the position of the device correlating to a POI may be determined and stored within the tracked distance measuring device. Global navigation satellite sensors such as GPS receivers and/or other position and orientation sensors may be used in systems to determine the device's absolute location information and store the location information correlating to the POI distance data.

In another aspect, methods for determining dipole signal location and POI location are described.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 17B illustrates details of an embodiment of a tracked distance measuring device.

FIG. 17C is a section view of details of the tracked distance measuring device embodiment of FIG. 17B.

DETAILED DESCRIPTION OF EMBODIMENTS

Terminology

Figure 1:
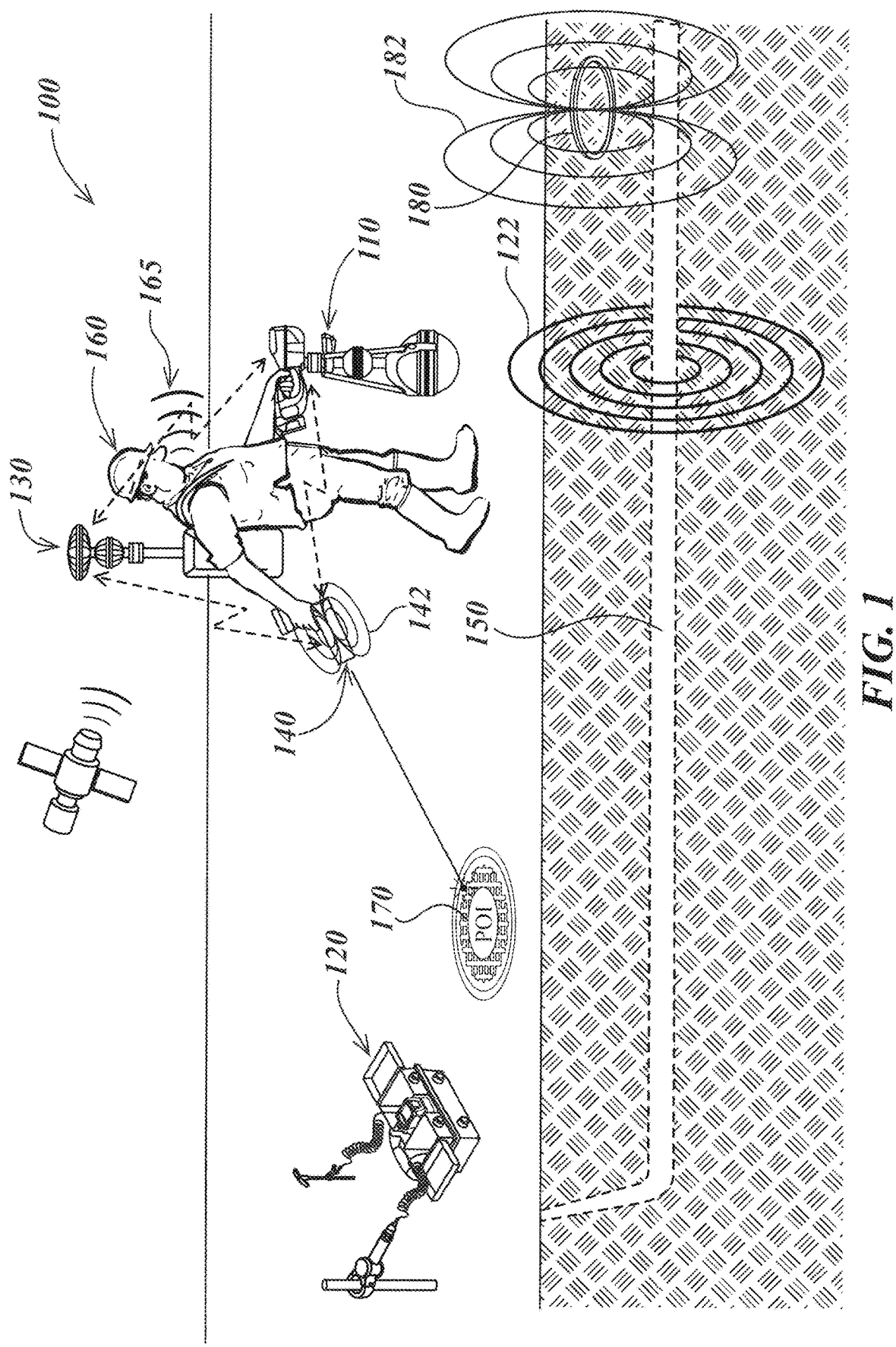
FIG. 1 illustrates details of one embodiment of a tracked distance measuring device and utility locating system.

As used herein, the terms "buried objects," "buried assets," and "buried utilities" include electrically conductive objects such as water and sewer lines, power lines, and other buried conductors, as well as objects located inside walls, between floors in multi-story buildings, or cast into concrete slabs as well as non-conductive utilities and electronic marker devices. They further include other conductive and nonconductive objects disposed below the surface of the ground.

In a typical application a buried object is a pipe, cable, conduit, wire, or other object buried under the ground surface, at a depth of from a few centimeters to meters or more, which has an alternating current flowing in it, with the alternating current generating a corresponding electromagnetic field. Metallic pipes or wires can carry their own conductive current, while non-metallic utilities, such as PVC or EBS pipe, or other non-conductors, may have tracing wires with current flow in them or may have marker devices or other mechanisms to indicate their presence.

In a locate operation, a user, such as a utility company employee, construction company employee, homeowner, or other person attempts to find the utility based on sensing magnetic fields generated by the AC current flow in the utility (or in a tracer wire, RFID-like marker, or other tracing element). The sensed information may be used directly or may be combined with other information to mark the utility, map the utility (e.g., by surface position as defined by latitude/longitude or other surface coordinates, and/or also by depth), and/or for other purposes, such as soil conductivity data collection, magnetic field data collection, geological applications, and the like.

As noted above, locating buried utilities or other assets may be done by receiving AC magnetic field signals emitted from the utilities and then processing these signals in one or more devices commonly denoted as "utility locating devices", "utility locators", or simply "locators."

Utility locators sense the magnetic field component of the electromagnetic signal emitted from a flowing AC current and process the signal accordingly to determine information about the buried object. The fundamentals of utility locating by sensing magnetic fields in well-known and described in the art. Typical locators use one or more horizontal antenna elements to determine when the locator is directly above the utility, and then use vertical or omnidirectional antenna coil arrays to determine depth.

Applicant SeeScan, Inc., a global leader in the field, provides more advanced locators using additional antenna elements, such as multiple omnidirectional antenna arrays, dodecahedral antenna arrays, and other advanced sensing and signal processing techniques and devices, such as, for example, those described in the incorporated applications, to determine additional information about the buried utilities as well as their associated environment by measuring and processing multiple magnetic field signals in two or three orthogonal dimensions and over time, position, frequency, phase, as well as other parameters.

Utility locators used in embodiments as described herein may be of the variety described in the incorporated patents and patent applications below, or others as are known or developed in the art. Such utility locators include one or more antennas or antenna arrays and electronic circuitry to receive and process magnetic field signal components of electromagnetic signals emitted from multiple sources and/or at multiple frequencies to determine each source's relative (e.g., the user's position over the ground or to some other reference) or to an absolute position (e.g., such as determined by a positioning system receiver such as a GPS receiver, GLONASS, Galileo, or other satellite or terrestrial position system receiver) based on its emitted signals.

As used herein, the term "position" refers to a location in space, typically in three-dimensional (X, Y, Z coordinates or their equivalent) space, as well as a "pose" of the source at that location relative to some other device or location. The pose may be the orientation at that particular location. For example, a signal emitted from a tracked distance measuring device embodiment may be used to determine a position that includes a location in three dimensional space relative to a corresponding device, such as an associated utility locator device or other signal receiving device, as well as the pose or orientation describing the direction and degree of tilt of the signal at that location (with respect to the utility locator or some other reference).

As used herein, "points of interests" or "POIs" may be any point of area or location within the mapped or locate area in which a distance is measured by the rangefinder element of a tracked distance measuring device. The POI may be location or object within a locate area that may affect locating equipment or signals within the locate area or mapping of the area. In some uses, a POI may be any arbitrary point within the work or mapped area that is designated as a POI by a user or device.

Overview

This disclosure relates generally to tracked distance measuring devices. More specifically, but not exclusively, the disclosure relates to tracked distance measuring devices used within utility locating and mapping systems used to identify and map points of interest.

The disclosures herein may be combined in various embodiments with the disclosures in Applicant's co-assigned patents and patent applications, including transmitter and locator devices and associated apparatus, systems, and methods, as are described in U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S.

Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. Pat. No. 9,488,747, issued Nov. 8, 2016, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL GROUND TRACKING APPARATUS, SYSTEMS AND METHODS; U.S. Pat. No. 9,599,740, issued Mar. 21, 2017, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. Pat. No. 9,632,199, issued Apr. 25, 2017, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. patent application Ser. No. 14/949,868, filed Nov. 23, 2015, entitled BURIED OBJECT LOCATOR APPARATUS AND SYSTEMS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Pat. No. 9,341,740, issued May 17, 2016, entitled OPTICAL GROUND TRACKING APPARATUS, SYSTEMS, AND METHODS; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/331,570, filed Oct. 21, 2016, entitled KEYED CURRENT SIGNAL UTILITY LOCATING SYSTEMS AND METHODS; U.S. patent application Ser. No. 15/339,766, filed Oct. 31, 2016, entitled GRADIENT ANTENNA COILS AND ARRAYS FOR USE IN LOCATING SYSTEMS; U.S. patent application Ser. No. 15/345,421, filed Nov. 7, 2016, entitled OMNI-INDUCER TRANSMITTING DEVICES AND METHODS; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/376,576, filed Dec. 12, 2016, entitled MAGNETIC SENSING BURIED OBJECT LOCATOR INCLUDING A CAMERA; U.S. Provisional Patent Application 62/435,681, filed Dec. 16, 2016, entitled SYSTEMS AND METHODS FOR ELECTRONICALLY MARKING AND LOCATING BURIED UTILITY ASSETS; U.S. Provisional Patent Application 62/438,069, filed Dec. 22, 2016, entitled SYSTEMS AND METHODS FOR ELECTRONICALLY MARKING, LOCATING, AND DISPLAYING BURIED UTILITY ASSETS; U.S. patent application Ser. No. 15/396,068, filed Dec. 30, 2016, entitled UTILITY LOCATOR TRANSMITTER APPARATUS AND METHODS; U.S. Provisional Patent Application 62/444,310, filed Jan. 9, 2017, entitled DIPOLE-TRACKED LASER DISTANCE MEASURING DEVICE; U.S. patent application Ser. No. 15/425,785, filed Feb. 6, 2017, entitled METHODS AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/434,056, filed Feb. 16, 2017, entitled BURIED UTILTY MARKER DEVICES, SYSTEMS, AND METHODS; U.S. patent application Ser. No. 15/457,149, filed Mar. 13, 2017, entitled USER INTER- FACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, filed Mar. 13, 2017, entitled UTILITY LOCATORS WITH RETRACTABLE SUPPORT STRUCTURES AND APPLICATIONS THEREOF; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. patent application Ser. No. 15/633,682, filed Jun. 26, 2017, entitled BURIED OBJECT LOCATING DEVICES AND METHODS; U.S. patent application Ser. No. 15/681,409, filed Aug. 20, 2017, entitled WIRELESS BURIED PIPE AND CABLE LOCATING SYSTEMS; U.S. Provisional Patent Application 62/564,215, filed Sep. 27, 2017, entitled MULTIFUNCTION BURIED UTILITY LOCATING CLIPS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND TRACKING APPARATUS, SYSTEMS, AND METHODS; and U.S. Pat. No. 9,841,503, issued Dec. 12, 2017, entitled OPTICAL GROUND TRACKING APPARATUS, SYSTEMS, AND METHODS. The content of each of the above-described patents and applications is incorporated by reference herein in its entirety. The above applications may be collectively denoted herein as the "co-assigned applications" or "incorporated applications."

In one aspect, the disclosure relates to a distance measuring system. The distance measurement system may include, for example, a utility locator device including one or more magnetic field antennas, a processing element programmed with instructions for processing received magnetic field signals to determine relative position of one or more magnetic field signal sources and the locator and provide the determined relative position as locator output data and/or store the determined relative position in a non-transitory memory of the locator, a positioning element for determining a location of the signal tracking device in three dimensional space and providing output data defining the determined location, and a tracked distance measuring device. The tracked distance measuring device may include, for example, a housing, a rangefinder element for determining a distance or relative position to a point of interest (POI), and providing rangefinder output data corresponding to the determined distance or relative position to the POI, a magnetic field dipole sonde that may include an alternating current (AC) signal generator including an output for providing an output AC current signal at one or more predetermined frequencies and a magnetic field dipole antenna operatively coupled to the AC signal generator output to receive the output AC current signal and radiate a corresponding magnetic field dipole signal for sensing by the utility locator device. The tracked distance measurement device may further include an actuator mechanism operatively coupled to the rangefinder element and the magnetic field dipole sonde for triggering a distance determination and triggering generation of the magnetic field dipole signal in conjunction with the triggering a distance determination. The system may further include one or more non-transitory memories for storing the output data from the positioning device and the output data from the utility locator device, as well as other data, such as images or video, sensor data, or other system data or information.

In another aspect, the disclosure relates to method of measuring distance with a distance measuring system. The method may include, for example, triggering a tracked distance measuring device, in response to a user input, to initiate in conjunction a measurement of distance from a rangefinder element to a point of interest (POI) and transmission of a dipole magnetic field signal from a magnetic field dipole sonde element for sensing by a utility locator. The method may further include providing, from the tracked distance measurement device, the measurement as tracked distance measurement output data and determining absolute positional data at the locator using a positioning element and providing the absolute positional data as an output. The absolute positional data, the output data is processed in conjunction with the tracked distance measurement data, and relative positional data based on sensing of the dipole magnetic field signal at the locator may be processed to determine absolute positional data associated with the POI.

In another aspect, a tracked distance measuring device embodiment may include a body element housing a rangefinder element to measure the distance to a point of interest (POI) as well as a position element to determine the position of the tracked distance measuring device in three dimensional space as well as pose of the tracked distance measuring device at that location. An actuator may be included allowing a user to initiate measurement to a POI that may simultaneously correlate to the position of the tracked distance measuring device. The term "position," as used herein, refers to a location within three dimensional space in a relative or absolute coordinate system and/or as a pose that describes the direction and tilt at that location. The POI may be mapped based on the position data of the tracked distance measuring device and distance data determined therefrom. In some implementations, the POI may be outlined or traced by the tracked distance measuring device such that the outline of the POI may be mapped. Processing elements and data logging elements may further be included within the central body element or in a locator or other associated device to process and store data, which may include mapping information of POIs.

The rangefinder element may be a laser rangefinder utilizing a laser beam to determine distance to a POI. In some embodiments, the rangefinder elements may instead be or include other types of rangefinders (e.g., radar, sonar, LiDAR, ultrasonic, and the like).

The rangefinder element may further be or include an optical ground tracking device, such as described in the incorporated applications, to determine position via optically tracking movements as it is moved about the Earth's surface. The optical ground tracking device may further include a laser in a known orientation to the camera or cameras on the optical ground tracking device used to direct the camera or cameras towards a POI as well as be used in a method for determining the precise location of the POI. Cameras within the optical ground tracking device my generate images associated with the POI for mapping it's location as well as identifying the POI. The optical ground tracking device may be positioned in a known or reference orientation relative to a utility locator device allowing the POI range data generated by the optical ground tracking device to be communicated to and be tracked by the utility locator device. In embodiments wherein the optical ground tracking device is equipped with two or more cameras collecting stereoscopic images of a single POI, three dimensional modeling of a POI may be achieved. The three dimensional modeled POI may be added to a map or mapping system covering the locate area.

The position element may include a dipole signal transmitter and associated magnetic antenna for generating and transmitting dipole magnetic field signals for detection by a corresponding signal tracking device. Within utility locating and mapping system embodiments, the signal tracking device may be a magnetic field sensing utility locator device (also known as a buried object locator or just "locator" for brevity) as further described in the incorporated patents and patent applications listed previously herein. The utility locator device may receive the transmitted signal or signals and determine and map information about the position including pose of each signal and thereby, information about the location of each POI. The positioning element of the embodiments may further be or include Global Positioning System (GPS) and/or other global navigation satellite systems as well as gyroscopic and other inertial sensors. In some tracked distance embodiments, the positioning element may also include arrays of GPS receivers and/or RTK GPS systems.

The body element may also include various other sensors and other components. Such sensors and components may include, but are not limited to, Bluetooth radios/transceivers, Wi-Fi radios/transceivers, and/or other wireless communication devices, imaging sensors, audio sensors and recorders, gyroscopic sensors, accelerometers, other inertial sensors, and/or global positioning satellite (GPS) sensors or other satellite navigation sensors. The central body element may further include a power module containing batteries or other powering components for providing electrical power to the signal transmitter and/or other components of the tracked measuring device.

Within utility locating and mapping system embodiments, the signal tracking device may be a utility locator device as described in the incorporated patents and patent applications listed previously herein. The utility locator device may receive the transmitted signal or signals and determine and map information about the position including pose of each signal and thereby, information about the location of each POI. Gyroscopic and other inertial sensors may further be included within the position elements of a tracked distance measuring device.

In another aspect, the utility locator device of systems and methods herein may receive the signal or signals from a tracked distance measuring device while simultaneously receiving signals from other sources such as, but not limited to, buried utility lines, pipe Sondes (magnetic field dipole signal generators), and other system devices and determine the position of each signal. The utility locator device may be equipped with a dodecahedral or equivalent or similar antenna array and associated components capable of tensor gradient measurements of received magnetic field signals, such as described in the incorporated applications.

In another aspect, the present disclosure relates to methods for determining the position or positions, which include location and pose, of signals received at a utility locator from a tracked measuring device.

In another aspect, the present disclosure may include one or more input elements. The input element of some embodiments may include methods and devices for taking audio notes created by a user and further correlating such audio notes with the POI, mark location, and/or other signal data. Speech-to-text (STT) type or similar translating methods may be used to translate audio files and create virtual POIs that may further be used in map systems containing utility information.

In another aspect, digital image recognition algorithms or similar, artificial intelligence techniques, simultaneous localization and mapping (SLAM), or equivalent methods may be used to recognize and generate corresponding POI metadata from generated POI images.

In another aspect, the tracked distance measuring devices herein may include one or more imaging sensors for generating still or video images of POIs. In some embodiments, the tracked distance measuring device may include a graphical user interface for displaying images and allowing the tracked distance measuring device to be aimed appropriately at a POI. Images may be stored on the tracked distance measuring device and/or communicated and stored on one or more other system devices (e.g., a utility locator, tablet, smart phone, other computing device, or the like). The stored images may further be included in mapping systems of the work area. Image recognition techniques, artificial intelligence techniques, simultaneous localization and mapping (SLAM), or like techniques may be employed to identify POIs from images taken within the locating system or other mapping system.

In another aspect, in some stand-alone tracked distance measuring device embodiments, the position of the device correlating to a POI may be determined and stored within the tracked distance measuring device. Internal global navigation satellite sensors and/or other position and orientation sensors may be configured to determine the device's location and store the location correlating to the POI distance data.

In another aspect, the rangefinder element of some tracked distance measuring devices may be modular or otherwise user removable from tracked distance measuring device. For instance, the rangefinder element may be a commercial available distance meter device such as the Leica DISTO™ line of laser distance meters that may attach to the tracked distance measuring device.

In another aspect, the rangefinder element may include an optical ground tracking device such as described in the incorporated applications.

In another aspect, methods for determining dipole signal location and POI location are described.

In another aspect, the tracked distance measuring device may include multiple dipole antennas for generating signals for tracking. The dipole antennas may be orthogonal to one another. Each antenna may broadcast a different frequency or all antennas may broadcast the same frequency.

In another aspect, global navigation sensors may by located in a GPS backpack device carried by the user. The GPS backpack device may include antennas to measure dipole signals from a tracked distance measuring device to determine the location and pose of the tracked distance measuring device in space.

Example Embodiments

Various additional aspects, features, and functions are described below in conjunction with the embodiments shown in FIG. 1 through FIG. 20 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments unless specifically described as such.

Turning to FIG. 1, a utility locating and POI identification system embodiment 100 may include a utility locator device 110, a locating system transmitter device 120, a backpack device such as a GPS backpack device 130, and a tracked distance measuring device 140. The utility locator 110 receives one or more electromagnetic signals, such as signal 122 emitted from utility 150 (based on AC current flow in the utility 150), and processes the received magnetic field signal component of the electromagnetic signal to determine utility position and/or depth below the ground surface (e.g., as described in the incorporated applications). The locator 110 may also receive signal 182 emitted from an electronic marking device 180, such as those described in the incorporated marking device applications (e.g., "UFID" devices or other RFID type devices) and process that signal as described in the incorporated marker device applications to likewise determine location information.

Signal 122 emitted from utility 150 may result from AC current provided to utility 150 from transmitter 120, which may be coupled to utility 150 via direct conductive contact or inductively or capacitively. Signal 182 may be sent by electronic marking device 180 in response to an excitation signal (e.g., as or similar to an RFID device) that may be generated from the locator, with the reply signal then received by the utility locator device 110 to determine the location of the electronic marking device 180 as well as orientation, tilt, pose, and depth within the ground.

In some embodiments, the electronic marking device 180 may communicate information (e.g., information regarding the utility line 150 or other buried asset or the like, rather than just a CW signal) to the utility locator device 110 via a signal 182 (e.g., using amplitude shift keying, phase shift keying, frequency shift keying, or other encoding technique of signal 182). Marking device 180 may be of the type described in incorporated marking device applications such as U.S. Pat. No. 9,746,572, issued Aug. 29, 2017, entitled ELECTRONIC MARKER DEVICES AND SYSTEMS and U.S. patent application Ser. No. 15/434,056, filed Feb. 16, 2016, entitled BURIED UTILITY MARKER DEVICES, SYSTEMS, AND METHODS.

In some embodiments, a distance measurement system may include a utility locator device with hardware and software configured to receive and process passive signals caused by, for example, current flow induced in the utility from broadcast signals such as AM broadcast radio transmissions, other radio frequency transmissions, other ambient signals, and/or active signals caused by currents intentionally induced onto the line through the use of a transmitter device or induction stick device (e.g., signal 122 emitted from transmitter 120) or lines that otherwise have inherent current flow therein, such as from nearby conductors carrying current. Examples of embodiments of locators with passive broadcast signal processing hardware and disclosed in, for example, incorporated U.S. patent application Ser. No. 15/360,979, filed Nov. 23, 2016, entitled UTILITY LOCATING SYSTEMS, DEVICES, AND METHODS USING RADIO BROADCAST SIGNALS.

An absolute or reference location of the utility locator device 110 may be determined or refined using a satellite system receiver (e.g., a GPS, GLONASS, or other receiver) as a positioning element and/or or may be determined with a GPS backpack device 130, which provides precision GPS positional data using a high precision GPS receiver, or other high precision device, and in conjunction provides a sonde signal detectable by a locator to determine the relative position/distance between the locator and sonde. Example GPS backpack devices are described in, for example, incorporated U.S. patent application Ser. Nos. 13/851,951 and 14/332,268. Other devices or systems for receiving positioning signals and processing them as known or developed in the art to determine a reference position (e.g., in latitude/longitude or other reference coordinates) may also used, either alone or in combination.

In some system embodiments, GPS and/or other positioning receivers or other sensor devices may be incorporated in a utility locator device, a tracked distance measuring device, and/or other connected system devices, and such systems do not require a GPS backpack device such as the GPS backpack device 130 of FIG. 1; however, use of such a device may improve positional accuracy.

Still referring to FIG. 1, user 160 may identify one or more points of interest (POIs) within the locate area. For example, POI 170 may be a metal manhole cover, and the metal of the manhole may affect magnetic fields in its proximity. A utility locating system, upon identifying and locating the presence of a POI with such a signal effect, may be configured to automatically compensate for this effect and allow for increased accuracy in identifying and mapping utility locations by adjusting for the magnetic field anomaly. In other uses, determination and storage of POI type, location, and/or other data may be desirable for mapping or other purposes besides signal distortion correction.

Tracked distance measuring device 140 may include a magnetic field dipole device (commonly referred to in the art as a "sonde," which includes an AC current signal source and a dipole antenna, with an optional battery and/or other elements such as described in the incorporated sonde applications), and the sonde may be actuated or triggered to generate and send an AC magnetic field dipole signal, such as magnetic dipole signal 142 as shown in FIG. 1, in conjunction with measuring the distance to POI 170 (e.g., a laser distance determination of using other rangefinder distance determination methods). For example, a trigger, switch, lever, pushbutton, or other actuation mechanism may be included on or within a tracked distance measuring device (e.g., actuator mechanism 204 on tracked distance measuring device 200 illustrated in FIGS. 2A and 2B) for actuating the synchronization of signal transmission and distance measuring actions.

Figure 2A:
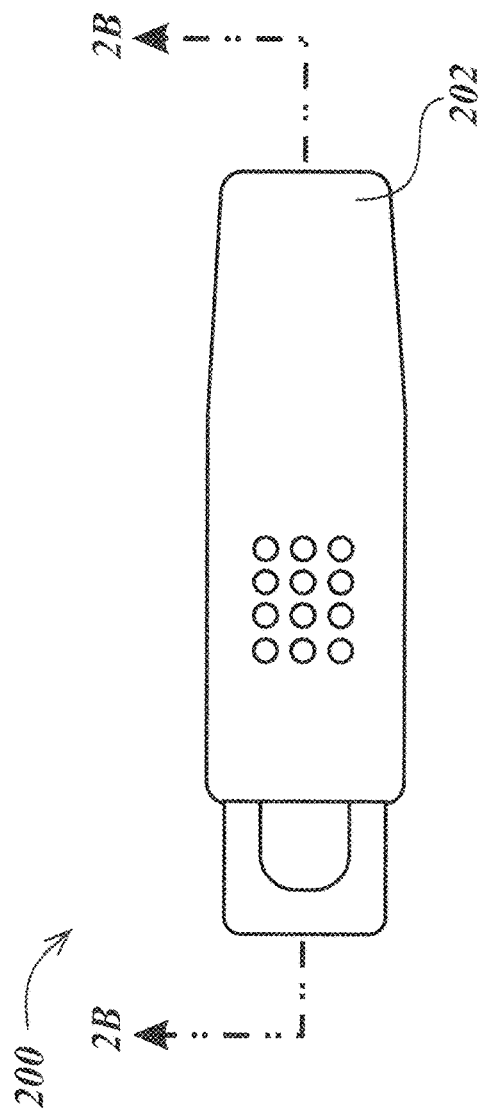
FIG. 2A illustrates details of an embodiment of a tracked distance measuring device.
Figure 2B:
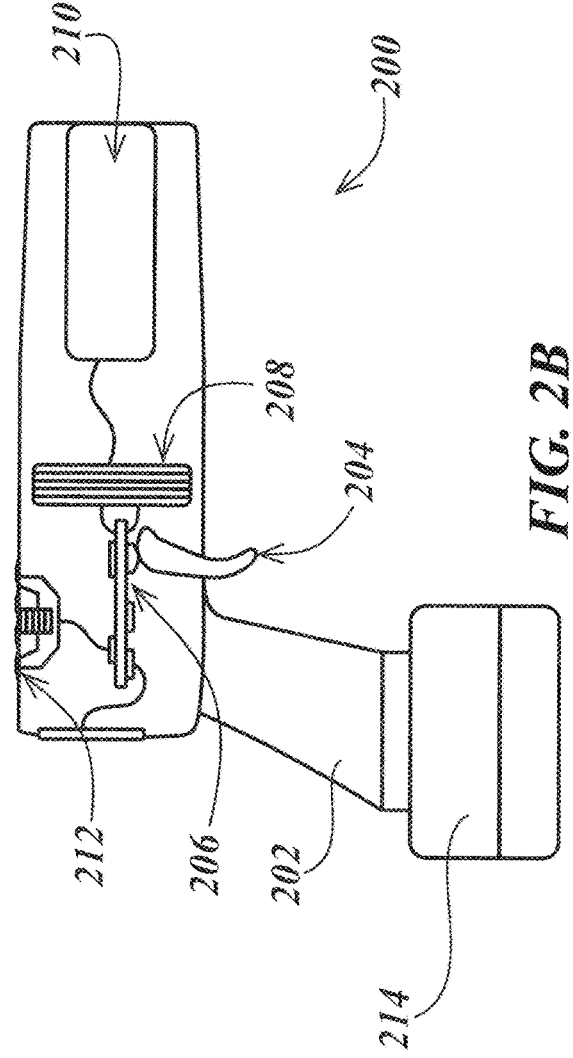
FIG. 2B is a section view of details of the tracked distance measuring device embodiment of FIG. 2A along line 2B-2B.
Figure 2D:
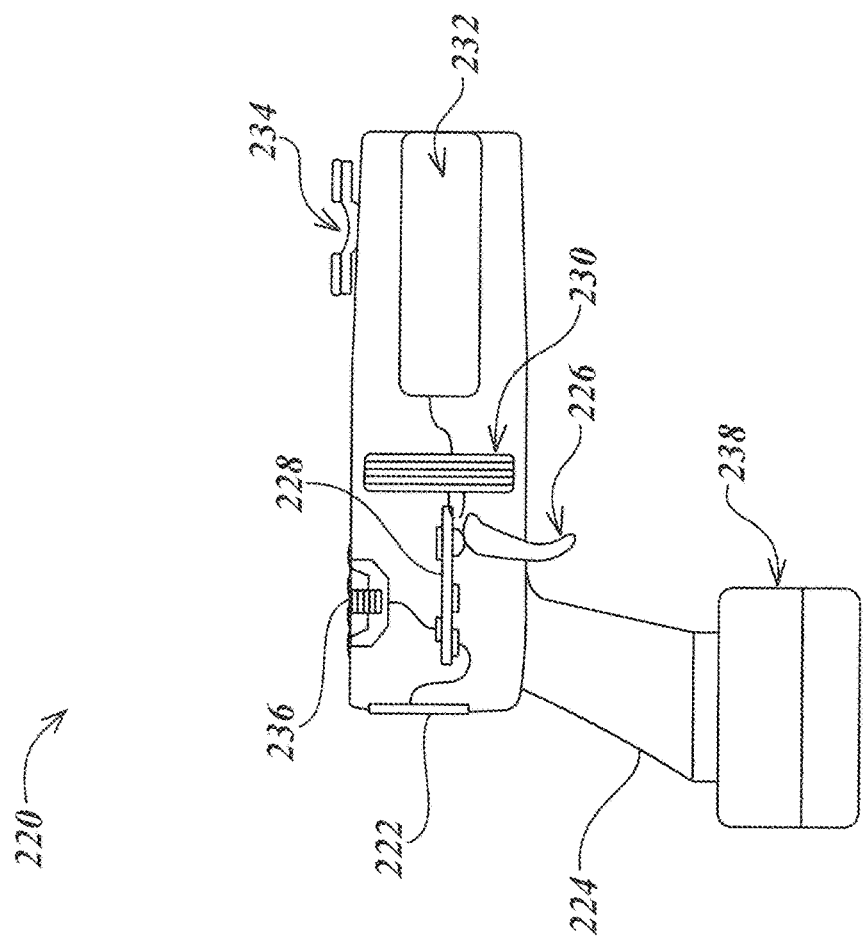
FIG. 2D is a sectional view of details of the tracked distance measuring device embodiment of FIG. 2C along line 2D-2D.

FIGS. 2A and 2B illustrate details of tracked distance measuring device embodiment 200. The tracked distance measuring device 200 may be or share aspects with the tracked distance measuring device 140 or other tracked distance measuring devices described herein. As illustrated in FIG. 2B, the tracked distance measuring device 200 may include a housing 202 and a trigger or actuator mechanism 204, which may be positioned externally. In other embodiments, other types of user input mechanisms (e.g., pushbutton controls, switches, levers, touch screens or buttons, etc.) may be used to allow user actuation. The actuator 204 may be triggered in a single action or in a continuous tracing mode (as described subsequently with respect to FIG. 12) if held in a depressed position.

As further illustrated in FIG. 2B, the actuator 204 may pass into an internal cavity within the housing 202 such that the actuator 204 communicates with PCB 206, such as via electrical connections, mechanical connections, or other mechanisms to trigger generation of a magnetic field dipole signal to be emitted via antenna 208, as well as to trigger a distance measurement to a POI via rangefinder element 210.

The rangefinder element 210 may, for example, be a laser distance measurement rangefinder or other optical rangefinder, an acoustic rangefinder, or other distance measuring devices as known or developed in the art. For example, in alternate embodiments, the rangefinder element may be or include other types of rangefinders (e.g., radar, sonar, LiDAR, ultrasonic, or the like). The PCB 206 may contain a processing element using a processor or processors and associated memory that is programmed to generate, receive, and process various signals (e.g., dipole signal for tracking, data signals from sensors and mechanisms and/or other system devices, and the like) as well as user input signals recorded via an audio input device such as microphone 212.

The tracked distance measuring device embodiment 200 may further include an electrical power source such as a battery 214. PCB 206 may further include various other sensors and modules such as gyroscopic sensors, other inertial navigation sensors, radio transceiver modules for communicating with various system devices (e.g., Bluetooth, WIFI, or other wireless communications transceivers), cellular data transceivers, and the like. In some embodiments, a tracked distance measuring device may include other sensors and modules including, but not limited to, GPS or other satellite and/or land based navigation system receivers and associated antennas, cameras and imaging sensors, audio microphones and recorders, as well as graphical user interfaces to provide visual data displays to a user, such as on LCD or other panel or screen types.

Figure 2C:
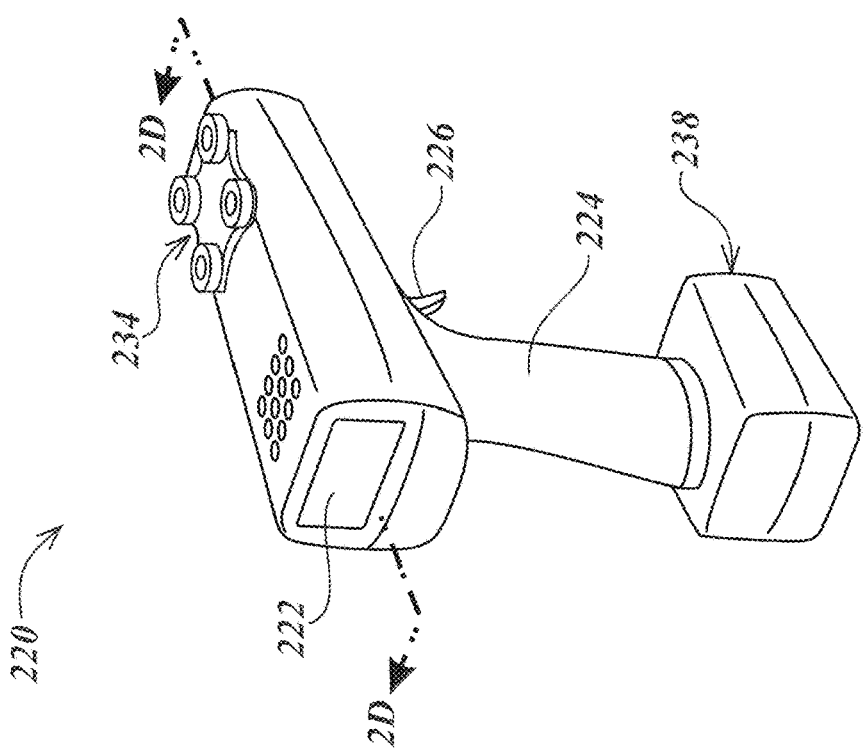
FIG. 2C illustrates details of an embodiment of a tracked distance measuring device.

For example, tracked distance measuring device embodiment 220 of FIG. 2C may include a graphical user interface 222 on which information may be displayed to a user. The tracked distance measuring device 220 may include a housing 224 and an actuator/trigger mechanism 226. The actuator mechanism 226 may allow a user to actuate operation of the tracked distance measuring device 220. As further illustrated in FIG. 2D, the actuator mechanism 226 may pass into an internal cavity within the housing 224 such that the actuator mechanism 226 communicates with PCB 228 to generate a dipole signal emitted via antenna 230, as well as initiating a correlating distance measurement via rangefinder element 232 which, in an exemplary embodiment, is a laser distance measurement rangefinder that determines distance to a particular target (e.g., a POI), by sending a laser pulse or other signal and measures the time of travel (or otherwise sends, receives, and processes light to determine a precise distance between a reference point on the tracked distance measuring device and the target/POI). As noted before, rangefinders different than laser-based may also be used in alternate embodiments.

The tracked distance measuring device embodiment 220 may include or be operatively coupled to a positioning system antenna and corresponding receiver 234 having one or more antennas and associated circuitry for receiving GPS, GLONASS, or other global navigation system or other positioning system signals. Positioning data from the devices may be used with distance measuring device 220 and location of POIs in further processing and data association/mapping. For example, in addition to position, the orientation, tilt, and pose of the tracked distance measuring device 220 may be determined from the GPS.

Orientation, tilt, and pose of the tracked distance measuring device 220 may further be determined or refined via gyroscopic or other inertial sensors on PCB 228 or on other electronic circuitry (not shown). For example, PCB 228 may include a processing element using a processor or processors and associated memory that may be used to generate, receive, and process signals (e.g., dipole signal for tracking, data signals from sensors and mechanisms and/or other system devices, and the like) as well as user input signals recorded via microphone 236.

The tracked distance measuring device 220 may further include a portable electrical power source such as battery 238. Battery 238 may be a smart or "intelligent" battery as described in incorporated U.S. patent application Ser. No. 13/532,721, filed Jun. 25, 2012, entitled MODULAR BATTERY PACK APPARATUS, SYSTEMS, AND METHODS and U.S. patent application Ser. No. 13/925,636, filed Jun. 24, 2013, entitled MODULAR BATTERY PACK APPARATUS, SYSTEMS, AND METHODS INCLUDING VIRAL DATA AND/OR CODE TRANSFER.

Figure 2F:
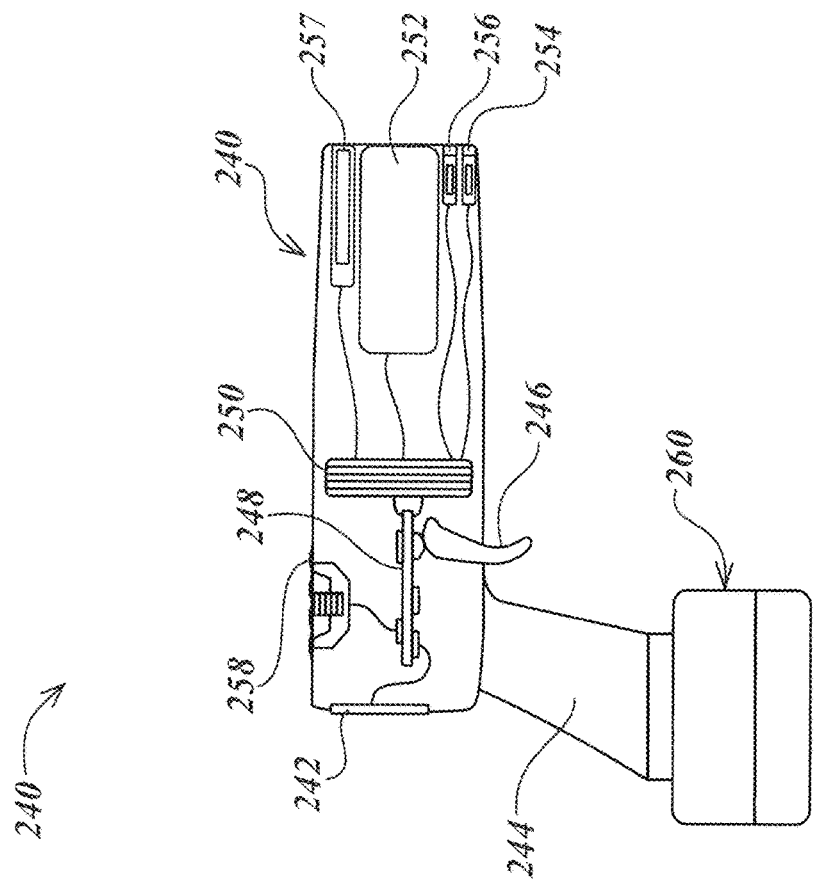
FIG. 2F is a section view of details of the tracked distance measuring device embodiment of FIG. 2E along line 2F-2F.
Figure 2E:
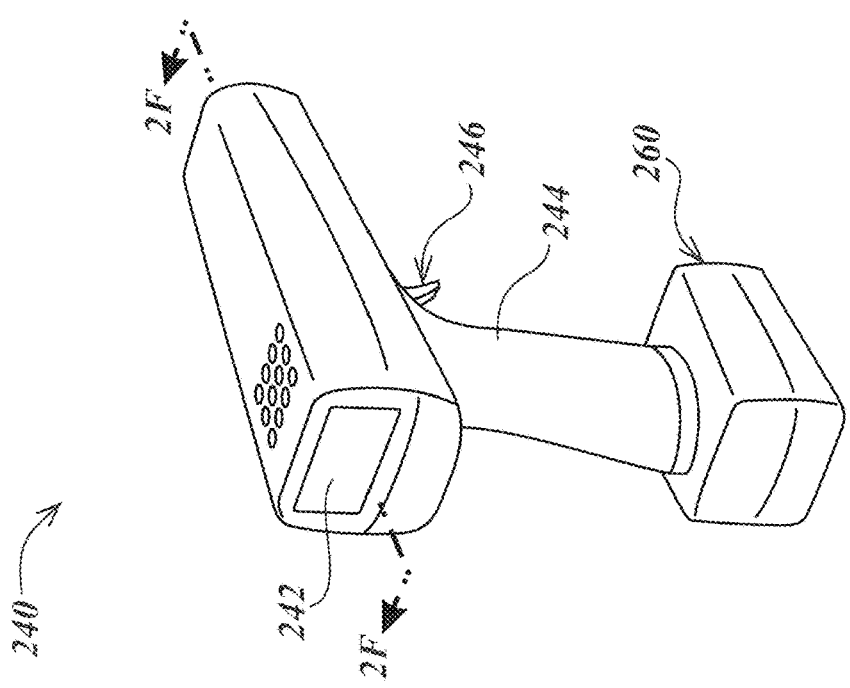
FIG. 2E illustrates details of a tracked distance measuring device embodiment.

Turning to FIG. 2E, tracked distance measuring device embodiment 240 may include a graphical user interface 242, such as a flat screen panel (which may be positioned externally on or within a housing), a housing 244, which may be gun-shaped as shown, and an actuator/trigger mechanism 246 disposed on and/or within the housing. The actuator 246 allows a user to actuate tracked distance measuring device 240 such as described previously herein. As further illustrated in FIG. 2F, the actuator 246 may extend into an internal cavity within the housing 244 as shown, and may otherwise communicate actuation to PCB 248 such that the actuator 246 provides communication to PCB 248 to initiate generation of a dipole signal emitted via antenna 250, as well as to initiate a correlating distance measurement via rangefinder element 252, which may be a laser rangefinder as described previously herein, or another type of rangefinder in alternate embodiments.

Tracked distance measuring device 240 may include one or more cameras or imaging sensors and associated optics and electronics, such as the telephoto camera 254 or wide angle camera 256. In embodiment 240, the cameras 254 and 256 may take still images or video of a targeted POI and/or the surrounding environment. Such images may be stored in a non-transitory memory, displayed on graphical user interface 242, and/or communicated to a separate communicatively connected system device for display, storage, or further processing.

Images may also be stored in a memory or database, and correlated with received and processed dipole magnetic field signals and distance to POI data. Display of imagery from cameras 254 and/or 256 on graphical user interface 242 may be done to allow a user to effectively aim the tracked distance measuring device 240 at a POI (e.g., POI 270 of FIG. 2G). Imagery collected may, for example, using artificial intelligence signal processing, simultaneous localization and mapping (SLAM) processing, and/or image recognition image processing, be used to identify the POI and create and map the POI (POI data/records may also include metadata identifying the POI type or other characteristics or associated information).

Tracked distance measuring device 240 may include a laser 257, which may be a green laser or other color or other daylight visible laser, to emit a laser beam in a desired direction and allow or aid a user in aiming the tracked distance measuring device 240. The PCB 248 may include a processing element with a processor or processors and associated non-transitory memory that may be used to generate, receive, and process signals (e.g., dipole signal for tracking, POI imagery, data signals from sensors and mechanisms and/or other system devices, and the like) as well as user input signals recorded via microphone 258.

The tracked distance measuring device 240 may further include an electrical power source, such as battery 260. Battery 260 may be an intelligent battery as described in incorporated U.S. patent application Ser. No. 13/532,721, filed Jun. 25, 2012, entitled MODULAR BATTERY PACK APPARATUS, SYSTEMS, AND METHODS and U.S. patent application Ser. No. 13/925,636, filed Jun. 24, 2013, entitled MODULAR BATTERY PACK APPARATUS, SYSTEMS, AND METHODS INCLUDING VIRAL DATA AND/OR CODE TRANSFER.

Figure 2G:
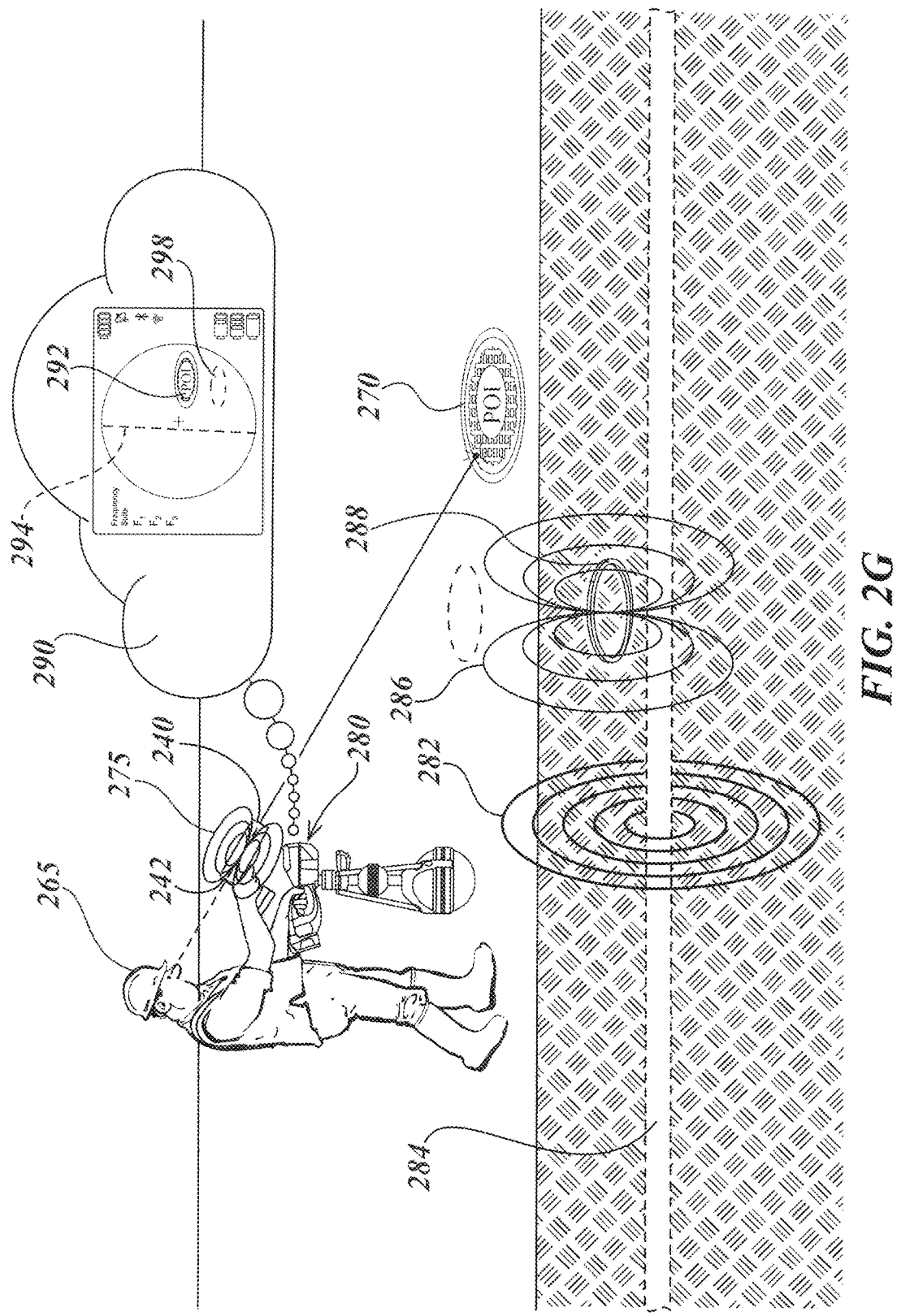
FIG. 2G illustrates details of an embodiment of a tracked distance measuring device and utility locating system showing aiming of the tracked distance measuring device.

FIG. 2G illustrates an example use of a tracked measurement system device. As shown in FIG. 2G, tracked distance measuring device embodiment 240 may be held by a user 265 such that the user looks at the GUI 242 to aim device 240 towards a POI 270, in a way similar to pointing a gun at a target (i.e., the POI). The vertical orientation of the graphical user interface 242 and forward facing cameras 254 and 256 (as shown in FIG. 2F) may be configured on the housing to allow a straight line of sight towards POI 270. Likewise, laser 257 (as shown in FIG. 2F) may be directed towards POI 270 to assist in aiming the tracked distance measuring device 240. When actuated, the tracked distance measuring device 240 may generate and send a dipole magnetic signal 275. Magnetic field signal 275 may then be received and processed at utility locator 280, such as using signal processing as described in the incorporated applications, to determine position (location and pose) and mapping of the POI 270.

In addition to the magnetic field signal 275, utility locator 280 may simultaneously receive signals from other signal sources. For example, utility locator 280 may receive signal 282 emitted by utility line 284 and signal 286 emitted from electronic marking device 288 (marking device 288 is typically excited by an external source to operate in an RFID-like functionality by scavenging electromagnetic energy to send a reply signal which may optionally include encoded data).

The location, orientation, tilt, pose, and depth within the ground of utility line 284 and electronic marking device 288 from the respective signals 282 and 286 may be stored in a non-transitory memory, may be associated so as to link them as part of a common measurement, may be displayed upon a graphical user interface 290 of the utility locator 280, and/or may be communicated as data to other electronic computing devices, system devices, and/or remote mapping systems. As illustrated in FIG. 2G, graphical user interface 290 may display a POI indication 292, which may correspond to the mapped location of POI 270, a line 294 corresponding to the mapped location of utility line 284, and/or a marker indication 298 corresponding to the mapped location of electronic marking device 288. Other displays using some or all of this information, and/or other data or information, may be presented to a user and/or stored, displayed, and/or processed remotely in a memory or database.

In some embodiments data processing, including position and mapping data, may be done in real time or near real time in the utility locator device, other signal receiving device, the tracked distance measuring device, and/or another connected electronic computing device or other devices. For example, distance measurements generated via a tracked distance measuring device such as described herein may be communicated as data to the utility locator device, other signal receiving device, or other computing device for processing of data and mapping POI location.

In some embodiments, such communication of data may be implemented by modulating the dipole tracking signal emitted by the tracked distance measuring device (e.g., amplitude shift keying, frequency shift keying, phase shift keying, or the like) in an electronic circuit. In other embodiments, Bluetooth, Wi-Fi, or other wireless data connections may be established between system devices or other computing devices (e.g., smart phones, tablets, notebook computers, and the like) to process data and determine and map POI locations. In other embodiments, data may be stored within the tracked distance measuring device, utility locator device, or other system device for post processing of data and mapping POIs.

Figure 3A:
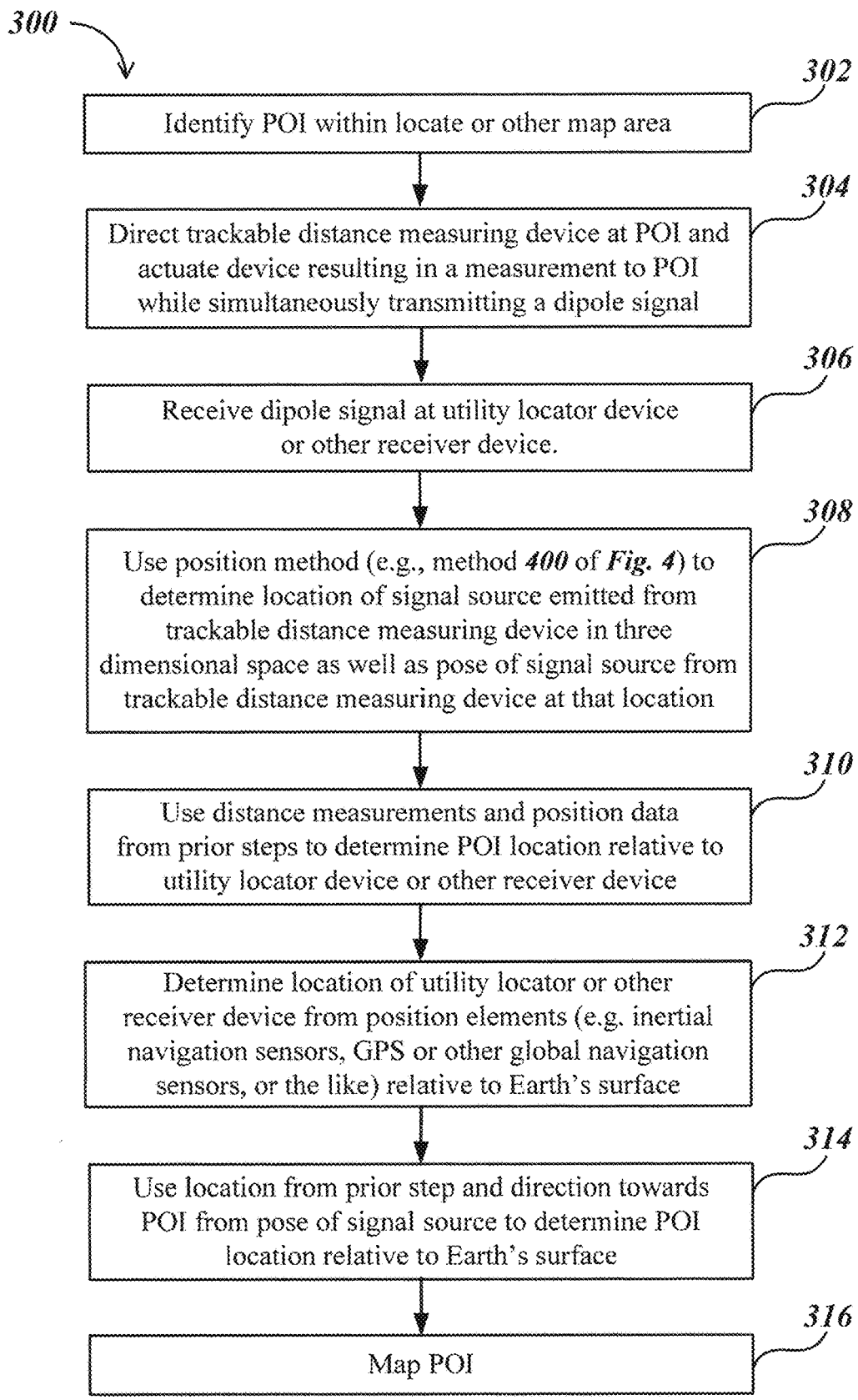
FIG. 3A illustrates details of an embodiment of a method for POI mapping within a tracked distance measuring device and utility locating system.
Figure 3B:
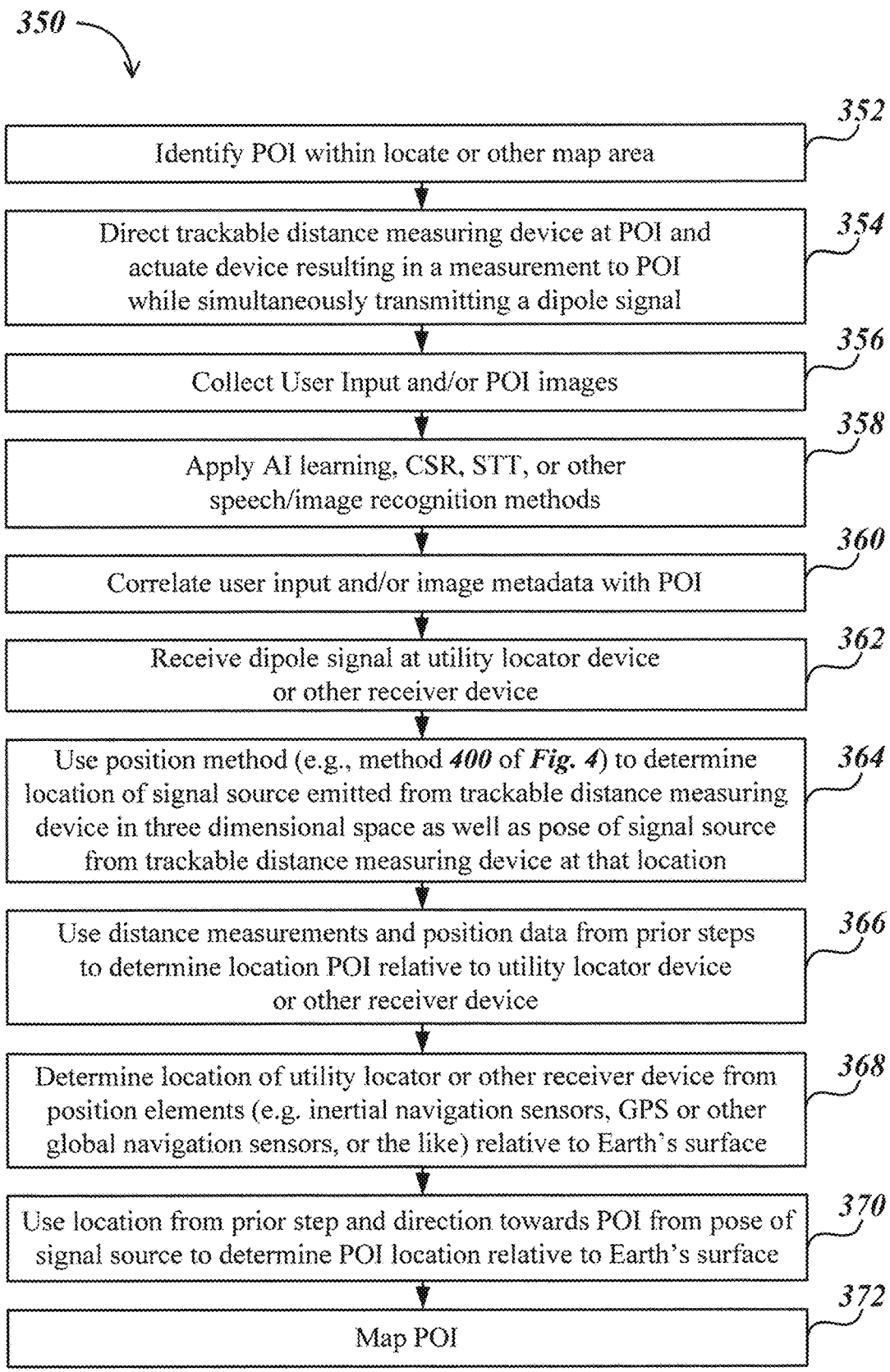
FIG. 3B illustrates details of an embodiment of a method for POI mapping within a tracked distance measuring device and utility locating system with correlated user input.

FIG. 3A illustrates details of a method/process embodiment 300 for determining the location and mapping of a POI. In step 302, a user may identify a POI within the locate area or other area being mapped or sensed, such as by visual sighting, reference to an image or printed map, or via other identification methods. In step 304, a tracked distance measuring device may be directed at the POI and actuated such as described previously herein. Upon actuation, the tracked distance measuring device may generate a distance measurement to the POI, for example with a laser rangefinder, while simultaneously generating a magnetic field dipole signal which may be CW or may be modulated with data.

In step 306, the dipole signal may be received at an associated utility locator or other signal sensing/tracking device. In step 308, the position of the signal source emitted from the tracked distance measuring device may be determined. This position data may include a location and pose in three-dimensional space relative to the utility locator or other signal tracking device. Step 308 may utilize a method such as method 400 of FIG. 4 (described subsequently herein), or other similar signal position determination methods.

In step 310, the distance measurement data to the POI and position data of the tracked distance measurement device may be used to determine POI location relative to the utility locator or other signal tracking device based on geometrically processing the data. This step 310 may utilize a method such as method 550 of FIG. 5C (described subsequently herein). In step 312, the location of the utility locator device or other signal sensing/tracking devices relative to the Earth's surface may be determined from position determining systems (e.g., GPS or other global navigation receivers, inertial navigation sensors, terrestrial receivers, or other position determining devices that determine position relative to the Earth's surface). In step 314, the location of the POI relative to the Earth's surface may be determined by processing the data. In step 316, the POI may be included in a map or map system, such as by incorporated it into map data or associated the position with other map data or information, either locally or remotely.

In some embodiments, user input may be provided to identify or add notes associated with or correlating to the POIs. For instance, using a microphone and associated audio recording electronics, a spoken description of a POI may be provided by the user at the tracked distance measuring device, utility locator device, or other system device, and stored in memory on a file or other data structure. This annotation data may be associated with other collected data as described herein, such as linking records in a database or using other data association methods.

Computer Speech Recognition (CSR) or Speech to Text (STT) processing and associated hardware may be included as separate elements or implemented in shared functionality processing elements. CSR and/or STT may be used transcribe spoken notes and provide metadata during locate or other field operations to provide a virtual POI within a map system. For example, as illustrated in FIG. 1, a user 160 may create an audio note 165, which may data stored in non-transitory memory in a file format such as standard audio files like MP3 or other audio file format. The audio note 165, corresponding to the illustrate manhole POI, may be the English language (or other language) word "manhole cover" or other description of POI 170 (other POIs would typically have a file with a description or other identifier corresponding to the POI type or other POI characteristics).

The tracked distance measuring device 140, utility locator device 110, and/or other system devices may include audio recording hardware and software to receive and record the audio note 165, and may also associated the audio note 165 with POI 170 using, for example, a data linkage structure or other data association mechanism as used in databases or other linked data systems. The utility locating system 100 may further implement in hardware and/or software Computer Speech Recognition (CSR), Speech to Text (STT), or other signal processing methods to transcribe and generate metadata such that system 100 may recognize that POI 170 is a manhole cover (or other POI type). Pushbuttons or other input methods and associated hardware and software apparatus may be include on a tracked distance measuring device, utility locator device, or other system device allowing a user to directly input POI metadata and/or other data associated with the POI and/or associated operations (e.g., a utility locate operation, field survey operation, etc.).

Methods for determining the location of and mapping a POI may include such user input POI metadata in subsequent data processing. For example, a method such method embodiment 350 illustrated in FIG. 3B may be used. Method 350 may start at step 352, wherein a user identifies a POI within the locate or other map are, such as through visual sighting, field surveying or map data collection based on hard copy maps or images, use of predefined coordinates, and the like).

In step 354, a tracked distance measuring device may be directed at the POI and actuated, such as by pointing the device as described previously herein. Upon actuation, the tracked distance measuring device may determine a distance measurement to the POI, which may be in one or more orthogonal coordinate systems (e.g., as a scalar distance or vector distance data) while simultaneously, or in conjunction with the aiming and trigger actuation, generate a magnetic field dipole signal for detection by an associated utility locator. In step 356 user input and/or POI images may be received/captured. The user input may include, for example, pushbutton input, spoken audio notes, images generated by cameras or other imaging sensors within some tracked distance measuring devices or through separate cameras and/or other user generated input received and recorded by the tracked distance measuring device 140, utility locator device 110, and/or by or from other system devices.

In optional step 358, CSR, STT, artificial intelligence (AI) and/or other speech recognition signal processing algorithms may be applied to transcribe/determine meaning associated with the user input (e.g., to speech-recognize that the user stated "manhole cover" in the example of FIG. 1 and covert this to text or another digital format).

In step 360, the user input and/or images of POI may be correlated/associated with the POI such as through data linkage or other association data association methods known or developed in the art. In step 362, the magnetic dipole signal may be received at a utility locator or other magnetic field signal detection/tracking device. In step 364, the position of the signal source emitted from the tracked distance measuring device may be determined, for example, using locator detection and signal processing techniques as described in the incorporate applications and/or as known or developed in the art, which may include determining data defining a location and pose in three dimensional space relative to the utility locator or other signal tracking device, thereby providing a vector representing the relative position between the tracked distance measurement device and the locator.

Figure 4:
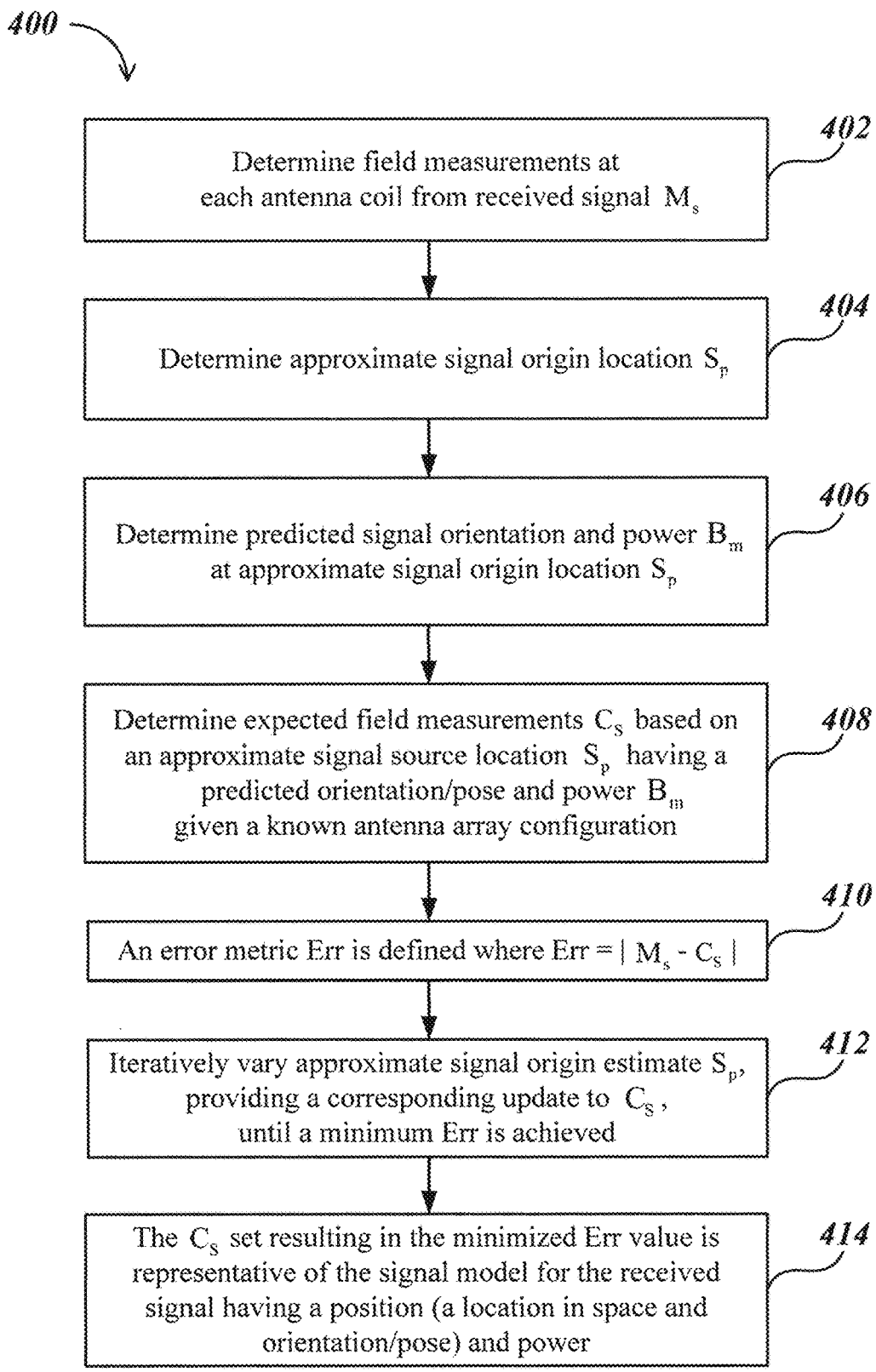
FIG. 4 illustrates details of an embodiment of a method for calculating dipole signal source information.

At step 364, a method such as method embodiment 400 of FIG. 4 or other similar or equivalent signal position determining methods. In step 366, the distance measurement data to the POI and position data of the tracked distance measurement device determined in prior steps may be used to determine POI location relative to the utility locator or other signal tracking device, which may be in one or more dimensional space (e.g., as a scalar or vector value, typically a vector in three dimensions, but alternately a scalar magnitude and directional angle, or as distance data in another coordinate system). Step 366 may implement a method such as method embodiment 550 described in FIG. 5C.

Returning to FIG. 3B, in step 368, the location of the utility locator device (or other signal detection/tracking device) relative to the Earth's surface may be determined from positioning elements. For example, inertial navigation sensors, GPS or other global navigation systems receivers, or other position determination devices and methods (e.g., terrestrial navigation systems, etc.) may be used to determine the locator's (or other signal detection/tracking device, or mapping device) position in absolute coordinates, such as latitude longitude or other reference coordinates. In step 370, the location of the POI relative to the Earth's surface may be determined in absolute coordinates (e.g., latitude/longitude or other reference coordinates) by combining the relative position or distance data between the locator (or other signal detection/tracking device, or mapping device) with the absolute position data determined from the positioning element/elements (e.g., GPS or other satellite receiver, inertial sensor and initial reference, etc.). In step 372, the POI may be included in a map or map system as a data point or record, and may be associated with other data as described herein, either locally or in a remote database system.

Referring back to FIG. 1, in the example operation illustrated therein, the dipole magnetic field signal 142 emitted by tracked distance measuring device 140 may be received at a utility locator device, such as at magnetic field antennas or antenna arrays (not shown in FIG. 1) of utility locator device 110, and may then be processed in electronic circuitry in the utility locator device, such as is known or developed in the art and/or as described in examples in the incorporated applications, to determine relative positional data. The relative positional data which may include location and pose of the tracked distance measuring device 140 in three dimensional space. For example, method 400 of FIG. 4 may be implemented using a dipole magnetic field signal 142 received at utility locator device 110 to determine location, orientation, and pose of tracked distance measuring device 140 relative to the locator (or other signal sensing/tracking device). The utility locator and/or other computing device may further include hardware and software to determine and map POI location based on distance data and position data.

If the tracked distance measuring device 140 is moved during use and electromagnetic dipole signals 142 are sent during movement, the utility locator device 110 may be programmed to track and store the tracked distance measuring device 140's position, movements, and/or orientations over time, such as by taking a series of data points as the tracked distance measurement device is moved about a locate site. The resulting data may be stored in a non-transitory memory in or operatively coupled to the locator. This information may further be associated with additional information such as data determined from the buried utility locator device 110 using utility locator signal processing circuitry, position data, such as may be provided as an input to the locator using inertial sensors or satellite navigation systems or sensors (e.g., GPS receivers, GLONASS receivers, etc.).

In various system embodiments, the utility locator device 110 may be any of a variety of utility locator devices known or developed in the art, including, for example, the various utility locator device embodiments disclosed in the incorporated applications, for receiving magnetic field components of electromagnetic signals emitted from flowing AC current in a utility or electromagnetic sonde and determining information about the associated utility. For example, the locator may receive and process a magnetic field signal from a tracked distance measuring device sonde, while simultaneously receiving one processing or more signals from other sources (e.g., a buried utility line or other conductor, a pipe sonde, a buried marker device, or other signal generating sources).

From these multiple magnetic field sources, the utility locator device may then determine, in multi-dimensional space (typically in three-dimensional space), the position and pose of each source. Examples of simultaneously receiving and processing multiple magnetic field signals from different sources are described in various of the incorporated applications. In an exemplary embodiment, the utility locator may include a dodecahedral antenna array or other similar antenna array to receive and process multiple simultaneous signals and determine magnetic field tensor gradients associated with the source. Examples of signal processing circuitry and implementation details for determining positional information from received magnetic field signals in a utility locator device, including with a dodecahedral antenna array or other similar antenna array configurations that provide multiple simultaneous signals usable to determine magnetic field tensor gradients associated with the source, are described in the various co-assigned incorporated patent and patent applications, including, for example, U.S. patent application Ser. No. 15/339,766 as well as other of the incorporated applications.

In implementations with a dodecahedral antenna array or other similar or equivalent antenna array configurations (such as, for example, octahedral antenna arrays, multiple nested antenna arrays, and the like oriented to receive magnetic field signal information sufficient to calculate tensor data), the utility locator device may include hardware and software for determining magnetic field tensor values associated with the magnetic fields provided from the tracked distance measuring device and optionally one or more buried utilities or other conductors, and store this information in a non-transitory memory for subsequent processing or transmission to a post-processing computing device or system.

In some system embodiments, the utility locator device may determine position data that includes a location and pose of a received signal using a method such as method embodiment 400 as illustrated in FIG. 4. For example, at step 402 of method 400, magnetic field measurements of a received signal, which may be or may include voltage measurements, gradient tensor measurements, gradient vectors, b-field vectors and the like, may be determined from received signals at each antenna coil of the locator antenna array(s). In an exemplary embodiment, the antenna array(s) include a dodecahedral antenna array which includes twelve antenna coils mounted in a dodecahedral shape on a corresponding dodecahedral frame. This set of measurements by the antenna array is notated herein as $M_s$. In step 404, an approximate signal origin location estimate in three dimensional space, notated herein as $S_p$ may be determined using measurement set $M_s$ from step 402.

In some method embodiments, $M_s$ values may be fit into or be used to determine values for a lookup table providing the approximate signal origin location, $S_p$. The lookup table may, for example, be derived from inverse trigonometric relationships between measured b-field vectors with gradient vectors. In some embodiments, the angle between the magnetic field and the gradient of the magnitude may be calculated from measurement set $M_s$ values. The resultant angle may be used with a lookup table to determine a magnetic latitude descriptive of the signal's source position relative to the utility locator. In other embodiments, rather than a lookup table, an approximate origin location estimate $S_p$ may be calculated in step 404. For example, $S_p$ may be calculated from the inverse trigonometric relationship between measured b-field vectors with gradient vectors.

In step 406, a predicted signal source orientation and power, notated herein as $B_m$, may be determined based on approximate origin location $S_p$, at step 404, and b-field values may be determined from signals at one or more antenna arrays. For instance, b-field values may be b-field measurements from a tri-axial antenna array or b-field estimates from a dodecahedral antenna array given an origin location $S_p$. In step 408, a set of expected field measurements defined as $C_s$ may be determined from the magnetic field model of a dipole signal at approximate signal source location $S_p$ having a predicted orientation and power $B_m$ given a known antenna array configuration, such as a dodecahedral antenna array. In step 410, an error metric Err may be determined, where Err=$|M_s-C_s|$. In step 412, the approximate signal origin estimate $S_p$ may be iteratively varied, providing a corresponding update to $C_s$, until a minimum Err is achieved. In step 414, the $C_s$ set resulting in the minimized $E_{rr}$ value may be determined, representative of the signal model for the received signal having a position (a location in space and orientation) and power.

In alternate method embodiments for determining the position of received signals, data from accelerometers, magnetometers, gyroscopic sensors, other inertial sensors and/or other similar sensor types, as well as additional global navigation sensors within the tracked distance measurement device, may be used to determine or refine position, which ma include location and pose/orientation data. Such method embodiments may be used in, for example, utility locator devices or other signal detection/tracking devices with antennas or antenna arrays and processing circuitry that is unable to calculate gradient tensors, or where gradient tensor calculations are not used for signal processing. Such methods may be used to determine the origin location of the received signal or signals using, for example, steps 402 and 404 of method 400 described in FIG. 4. Pose/orientation information, determined through accelerometers, magnetometers, gyroscopic, and/or like sensors within the tracked distance measuring device, may be communicated to the utility locator device, for instance, through Bluetooth or other wireless communications or wired communications. Such methods, including method embodiment 400 of FIG. 4, may be implemented in real-time or in post processing at the utility locator device or other system device.

In various embodiments where the tracked distance measuring device has a position determined by or is tracked using a dipole signal, the axis of distance measurement may be aligned with or otherwise positioned in a known, predefined orientation to the axis of the dipole signal so that a reference axis of the magnetic field dipole sonde is axially oriented with an aiming direction of the rangefinder, or both are otherwise commonly aligned so that the distance measurement from the rangefinder is in a common direction relative to the sonde dipole magnetic field.

Figure 5A:
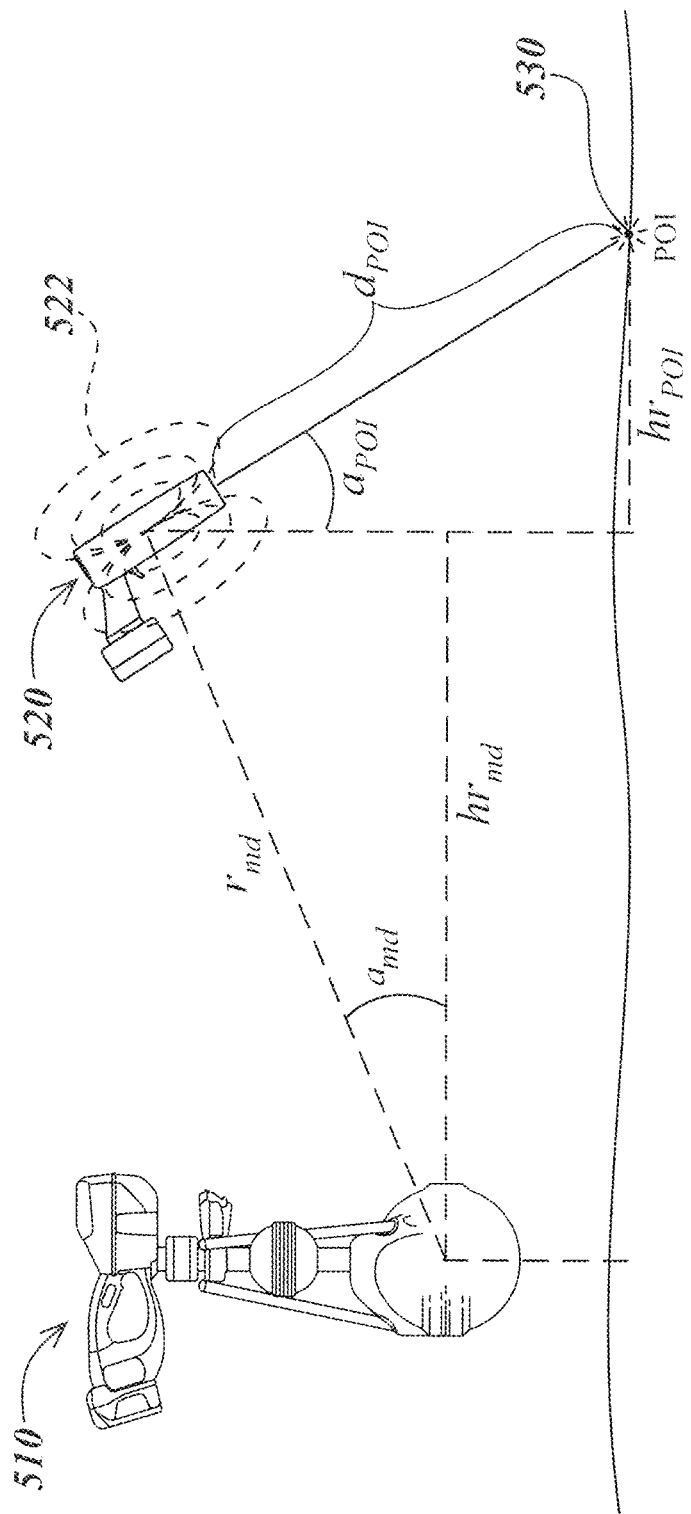
FIG. 5A illustrates details of an embodiment of a tracked distance measuring device and utility locating system defining measurement terms for method embodiment 550 of FIG. 5C.

For example, as illustrated in FIG. 5A, the direction of the distance $d_{POI}$ measurement made by tracked distance measuring device 520 may be set in alignment with the axis of the emitted dipole signal 522 as show. Further illustrated in FIG. 5A, values for the radial distance $r_{md}$ with an angle $a_{md}$ from the horizontal plane from the center of the antenna node at the utility locator device 510 towards the origin of signal 522 from the tracked distance measuring device 520 may be determined from a method such as method embodiment 400 illustrated in FIG. 4. The radial distance from utility locator device 510 to the source of signal 522 projected into the horizontal plane may be notated as $hr_{md}$.

Figure 5B:
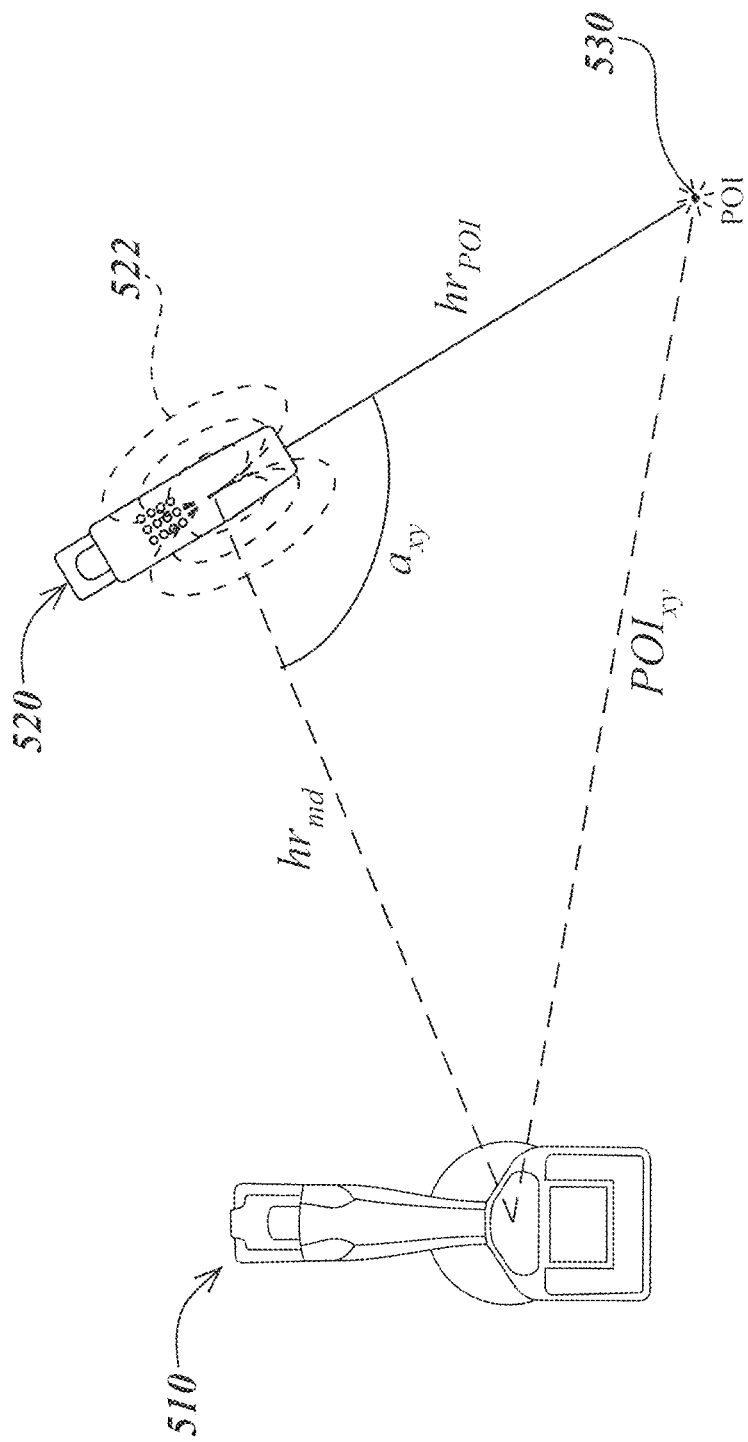
FIG. 5B is another illustration of details of a tracked distance measuring device and utility locating system embodiment defining measurement terms for method embodiment 550 of FIG. 5C.

Pose of signal 522 may be determined from a method such as method embodiment 400 illustrated in FIG. 4 such that a tilt angle $a_{POI}$ value in a known pose direction is determined. A radial distance from the source of signal 522 emitted by tracked distance measuring device 520 to POI 530 projected into the horizontal plane may be notated herein as $hr_{POI}$. As illustrated in FIG. 5B, a value for angle $a_{xy}$ in the horizontal plane may be determined from pose calculations of signal 522 emitted by the tracked distance measuring device 520 as described with respect to method 400 of FIG. 4. A calculation may be made to determine a radial distance in the horizontal plane from the utility locator device 510 to POI 530 (which is notated herein as $POI_{xy}$).

Figure 5C:
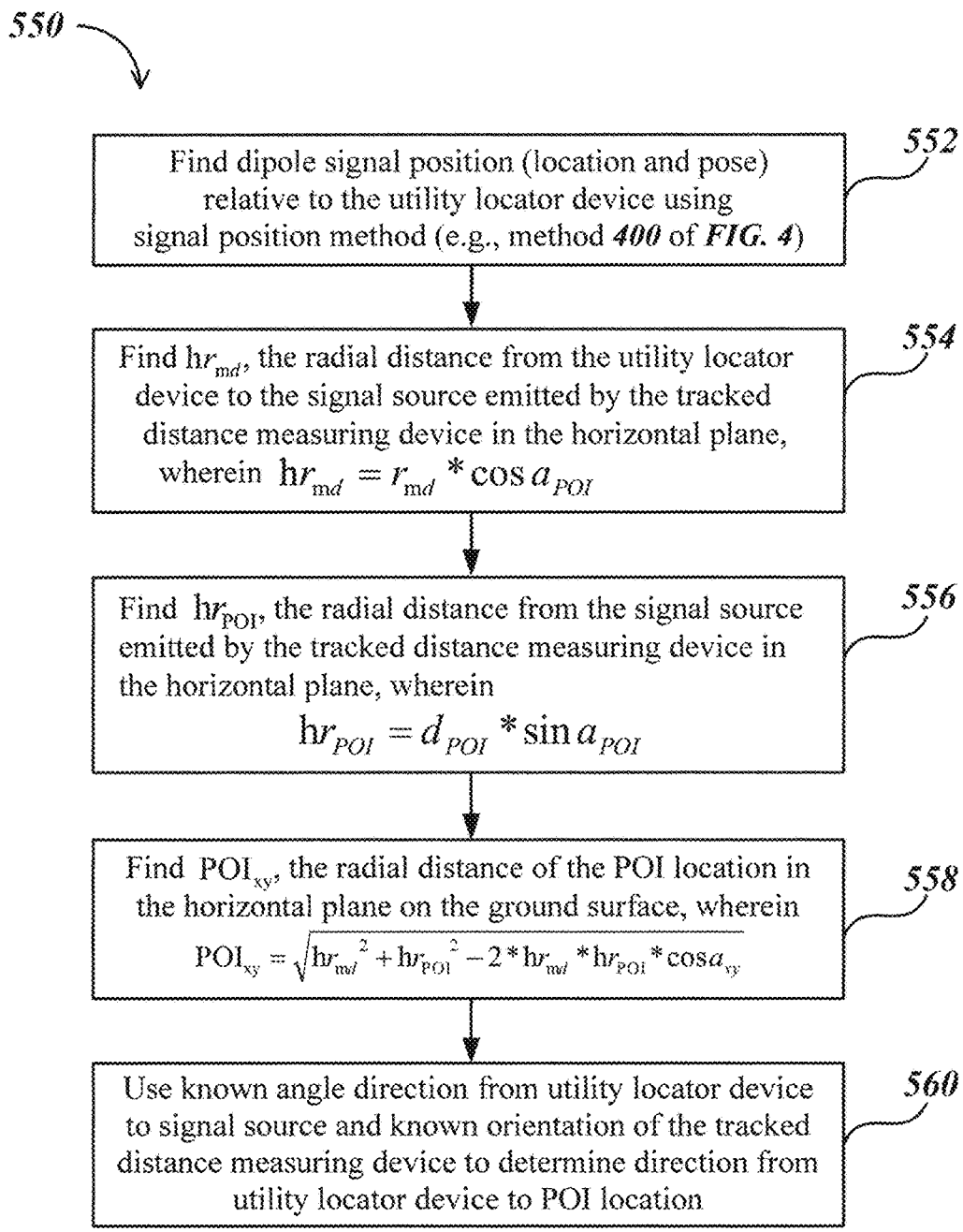
FIG. 5C illustrates details of an embodiment of a method for determining POI location.
Figure 6:
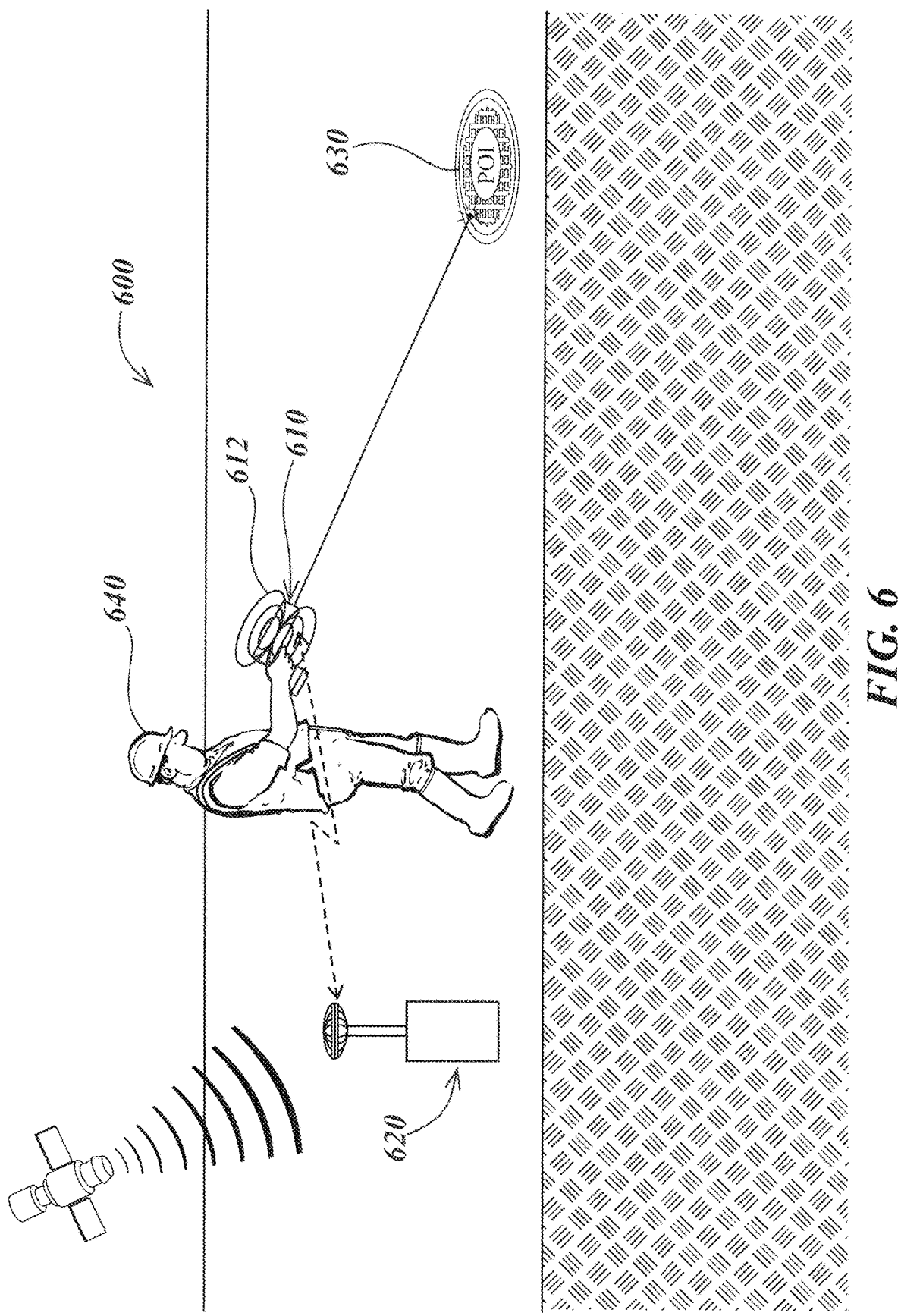
FIG. 6 illustrates details of a tracked distance measuring device system embodiment using a different signal receiving device.

Method embodiment 550 of FIG. 5C uses notation and terms defined with respect to FIGS. 5A and 5B (and the correlating Specification language) to calculate a value for the POI 530 radial distance along the ground surface, $POI_{xy}$, and its direction relative to the utility locator device 510. In step 552, the dipole signal position (location and pose) relative to the utility locator device 510 may be found using a signal position method (e.g., method 400 of FIG. 4). In step 554, a value for $hr_{md}$, the radial distance from the utility locator device to the signal source emitted by the tracked distance measuring device in the horizontal plane, may be determined, where $hr_{md}=r_{md}*\cos a_{POI}$. In step 556, a value for $hr_{POI}$, the radial distance from the signal source emitted by the tracked distance measuring device in the horizontal plane, may be found, where $hr_{POI}=d_{POI}*\sin a_{POI}$. In step 558, a value for $POI_{xy}$, the radial distance of the POI location in the horizontal plane along the ground surface, may be found, where $POI_{xy}=\sqrt{hr_{md}^2+hr_{POI}^2-2*hr_{md}*hr_{POI}*\cos a_{xy}}$. In step 560, a direction towards the POI in the horizontal plane along the ground surface may be determined using known angle direction between the utility locator device to the signal source and known pose of the tracked distance measuring device.

In some system embodiments, the tracked distance measuring device may be detected or tracked by devices other than a utility locator device. In typical forms of these embodiments, the other detection/tracking devices include magnetic field signal antennas ans signal processing elements providing similar functionality to those of a portable utility locator.

For example, some alternate system embodiments may be used for POI locating and mapping without simultaneous locating of buried utilities. An exemplary POI locating and mapping system showing an example is illustrated in embodiment 600 of FIG. 6. System embodiment 600 may include a tracked distance measuring device 610 configured to emit a dipole signal 612 that may be received and tracked at a signal tracking device 620 while simultaneously measuring a distance to a POI 630 using a rangefinder, such as a laser rangefinder. The tracked distance measuring device 610 may be or share aspects with the tracked distance measuring device 200 illustrated in FIGS. 2A and 2B, or with other tracked distance measurement devices described herein. The signal tracking device 620 may be a base station that remains stationary as the user 640 walks around a work area and locates and measure POIs such as POI 630.

As the user 640 actuates the tracked distance measuring device 610, thereby triggering and initiating a distance measurement to POI 630 and the simultaneous transmission of signal 612, the signal tracking device 620 may receive and track the signal 612 to determine a position including location and pose in three dimensional space of signal 612 and associated tracked distance measuring device 610 (e.g., utilizing method 400 of FIG. 4). The signal tracking device 620 may include one or more antenna arrays for receiving signal 612 which may be or include dodecahedral or similar antenna array and associated electronics and signal processing components configured to implement tensor gradient measurements of received signals such as described previously herein as well as in certain of the incorporated applications.

The signal tracking device 620 may further include GPS or other satellite navigation system sensors and/or other position sensors to determine an absolute location/position relative to the Earth's surface. Measurement data and/or other data from the tracked distance measuring device 610 may be communicated to the signal tracking device 620 via modulation of signal 612 (e.g., amplitude signal keying, frequency signal keying, or the like), via a separate radio transceiver device within the tracked distance measuring device 610 (e.g., Bluetooth, WIFI, or the like), and/or communicated via wired or other wireless connection in post processing to a utility locator device or other computing or base station device. The location of POI 630 may further be determined via method 550 described within FIG. 5C. The tracked distance measuring device 610 may further be configured with a microphone for receiving and recording audio notes and/or other input mechanisms (e.g., pushbuttons, levers, touchscreens, and the like) which may further be correlated with POI data.

Figure 7:
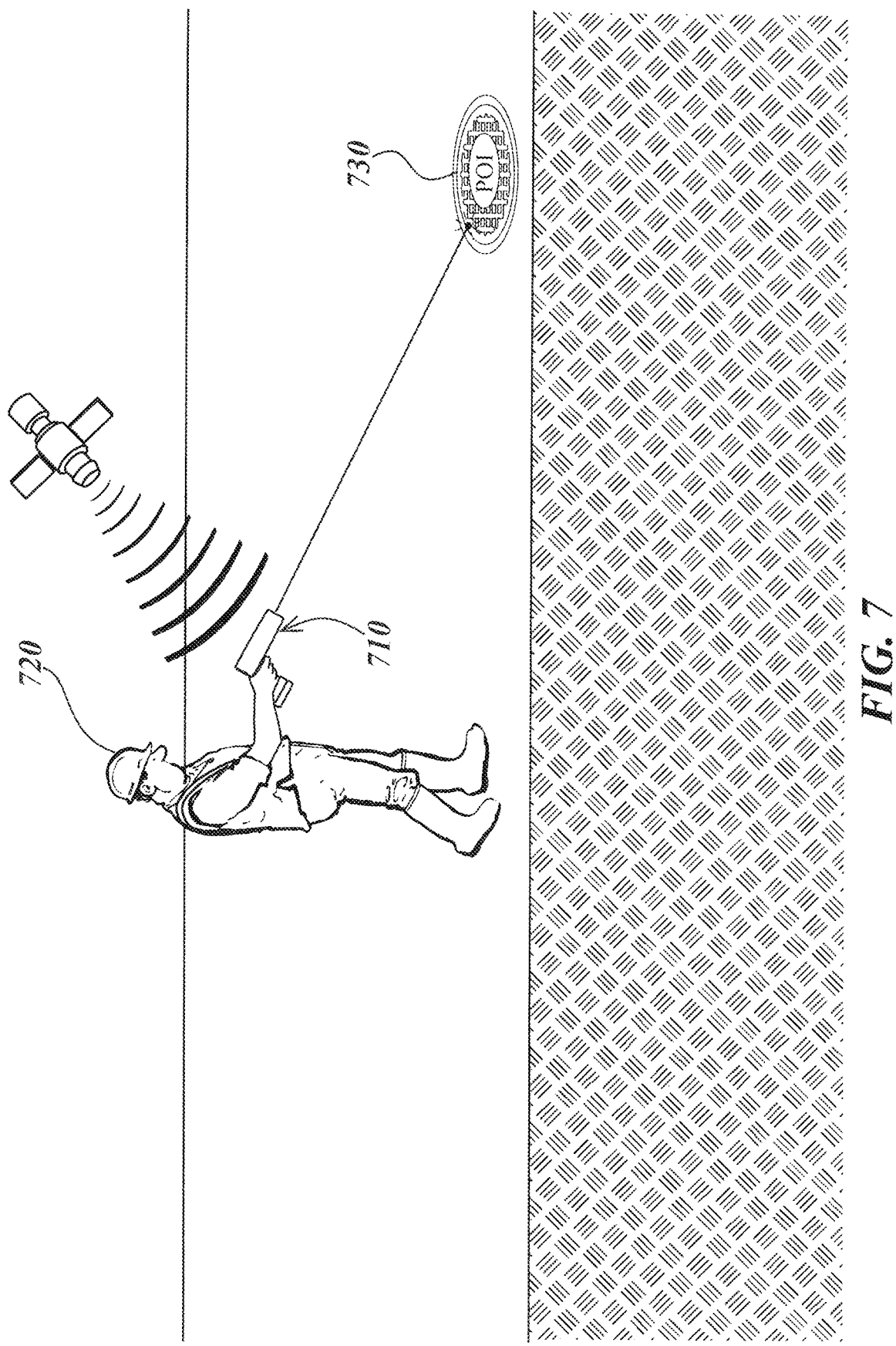
FIG. 7 illustrates details of a standalone tracked distance measuring device embodiment.

Further tracked distance measuring device embodiments may be standalone devices wherein tracking of positions may be implemented within the tracked distance measuring device and not a separate utility locator or other signal tracking device. As illustrated in FIG. 7, a tracked distance measuring device embodiment 710 held by a user 720 may direct and actuate the tracked distance measuring device 710 at a POI 730, thereby initiating a measurement of distance to POI 730 correlating with the recording of the position including location in three dimensional space and pose at that location of tracked distance measuring device 710. The tracked distance measuring device 710 may include one or more position elements which may further be or include GPS or other global navigation sensors, inertial navigation sensors, altimeters or other elevation/height determining sensors, as well as gyroscopic sensors, accelerometers, or other like sensors.

Distance to POI 730 may be determined via one or more rangefinder elements. Within tracked distance measuring device 710 the rangefinder element may be a laser rangefinder. Rangefinder elements of other standalone embodiments may be or include radar, sonar, LiDAR, ultrasonic, and/or other rangefinder mechanism or sensor. The location of POI 730 may be determined via distance data as well as correlated position data which may use method 900 described within FIG. 9. Processing of data within tracked distance measuring device 710 may be done through an included processing element. The processing element may be or include processor or processors and associated memory configured to perform the method and signal processing functions described herein. In some embodiments, processing may occur in real time or near real time in tracked distance measuring device 710 or other connected device. For instance, Bluetooth or WIFI connection may be established with a smart phone, tablet, or other computing device and data may be communicated to this device for processing. In yet other embodiments, tracked distance measuring device 710 may store raw measurements and signal data and be communicated via wired or wireless connection to a separate computing device for post processing of data and mapping POIs.

Figure 8:
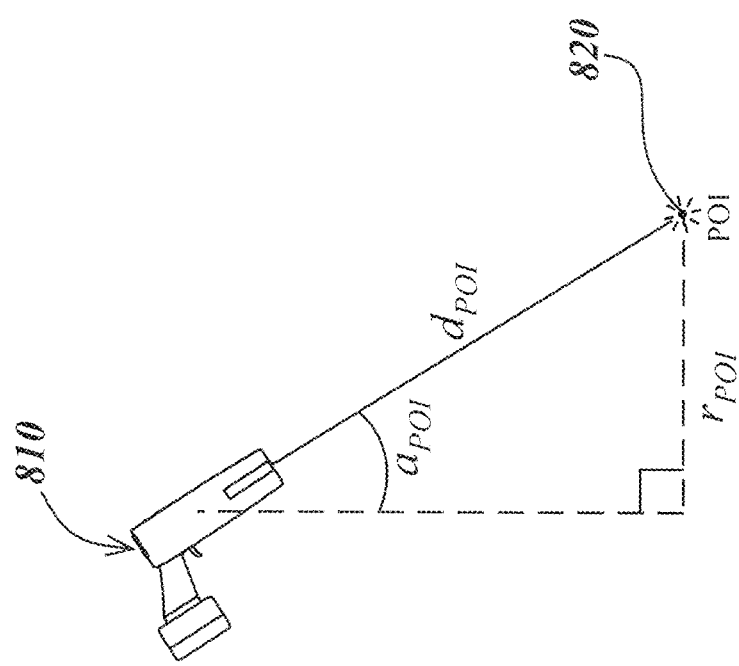
FIG. 8 illustrates details of a standalone tracked distance measuring device embodiment defining measurement terms for method embodiment 900 of FIG. 9.

As illustrated in FIG. 8, a tracked distance measuring device embodiment 810 measures a distance notated as $d_{POI}$ towards POI 820. The tracked distance measuring device 810 may be of the variety or share aspects with the standalone tracked distance measuring device 710 described in connection with FIG. 7 herein, or with other devices described herein. For example, tracked distance measuring device 810 may include an internal position element configured to determine, track, and record position that includes location in three dimensions and pose at that location of the tracked distance measuring device 810. For instance, tracked distance measuring device 810 may include GPS or other global navigation system receivers to determine location and gyroscopic or other inertial sensors to determine pose of tracked distance measuring device 810 at that location. An angle measurement $a_{POI}$ towards POI 820 may be determined from measurements of pose through gyroscopic or like sensor. Through known values, a radial measurement, $r_{POI}$, may be calculated for instance, using method embodiment 900 as illustrated in FIG. 9.

Figure 9:
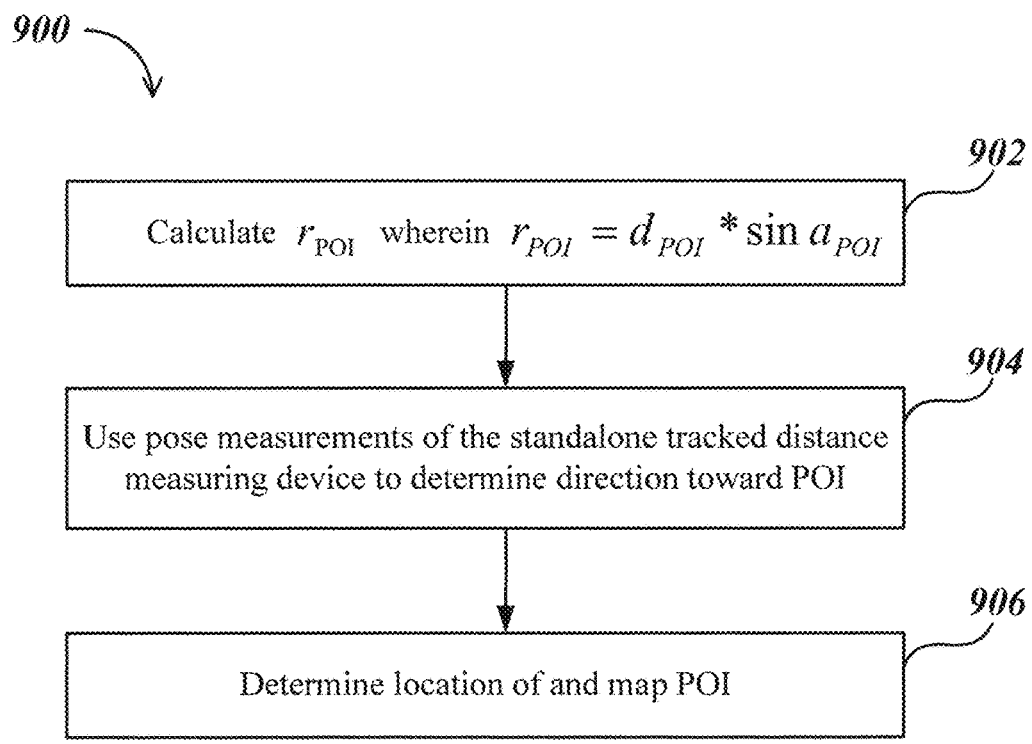
FIG. 9 illustrates details of an embodiment of a method for locating and mapping POIs from a standalone tracked distance measuring device.

Method embodiment 900 of FIG. 9 may include step 902, wherein $r_{POI}$ is calculated wherein $r_{POI}=d_{POI}*\sin a_{POI}$. In step 904, pose measurements of the standalone tracked distance measuring device may be used to determine direction toward POI in the horizontal plane. In step 906, POI location may be determined and mapped from radial distance measurement $r_{POI}$ and direction towards POI from prior steps.

Figure 10B:
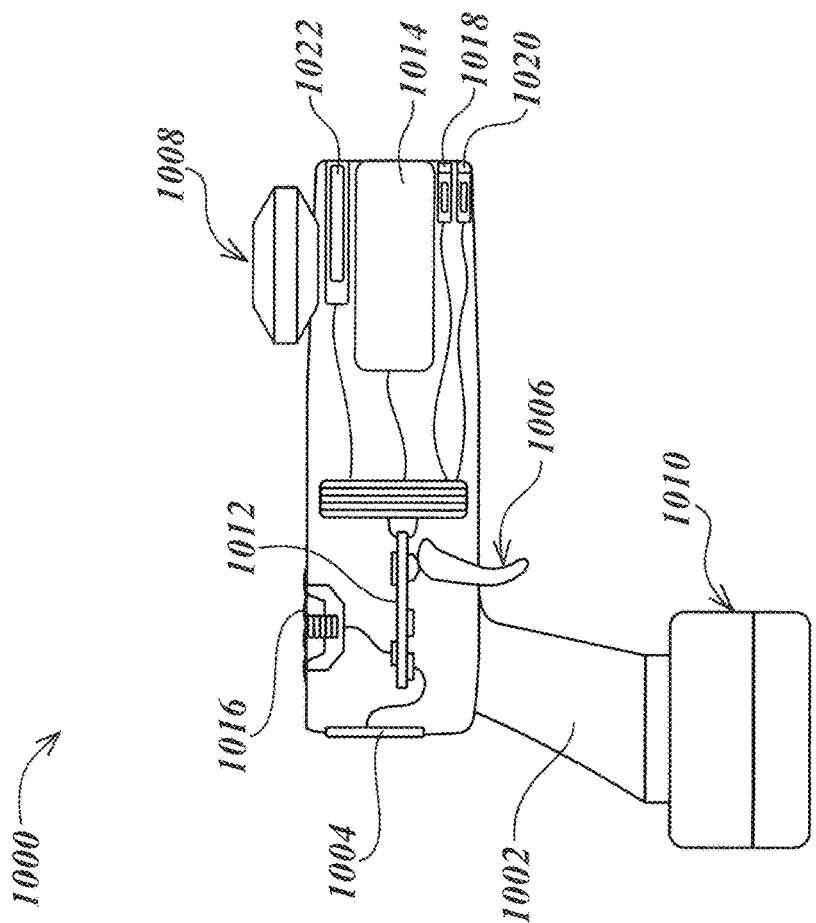
FIG. 10B is a sectional view of details of the standalone tracked distance measuring device embodiment of FIG. 10A along line 10B-10B.
Figure 10A:
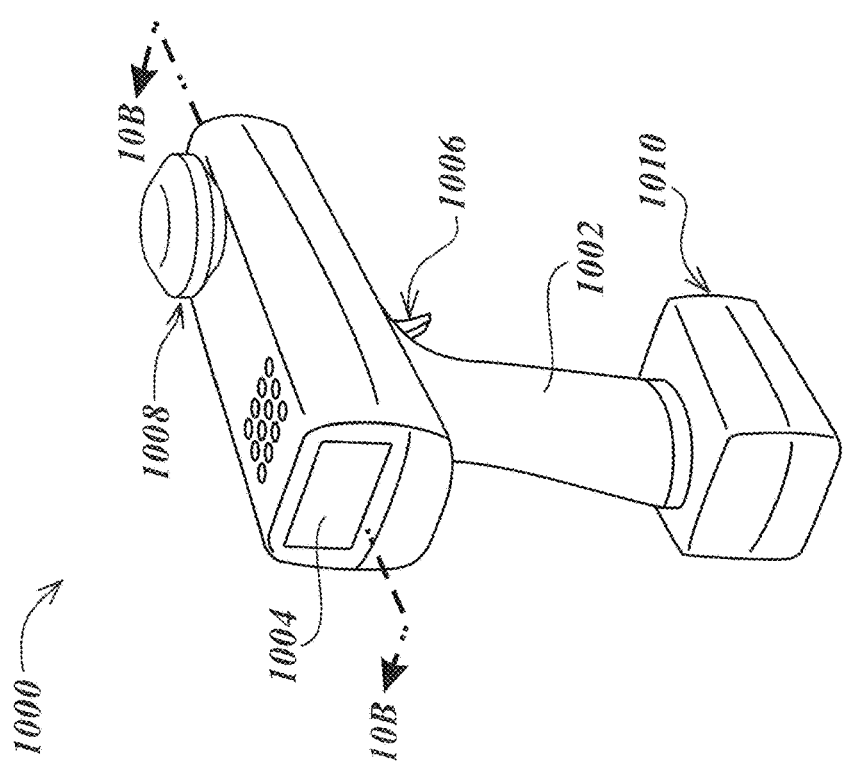
FIG. 10A illustrates details of a standalone tracked distance measuring device embodiment.

Details of a stand-alone tracked distance measuring device are illustrated with the tracked distance measuring device embodiment 1000 shown in FIGS. 10A and 10B. The tracked distance measuring device 1000 may be or share aspects with the tracked distance measuring device embodiment 810 of FIG. 8 or those described within method embodiment 900 of FIG. 9.

Turning to FIG. 10A, the tracked distance measuring device embodiment 1000 may include a housing 1002 in which a graphical user interface 1004 is positioned. An actuator 1006 may allow a user to actuate tracked distance measuring device 1000. In other embodiments, other types of user input mechanisms (e.g., pushbutton controls, switches, levers, touch screens) may be used. The tracked distance measuring device 1000 may further include a GPS receiver 1008 which may be a real time kinematic (RTK) receiver for providing RTK signal processing for improved accuracy. A battery 1010, which may be a smart battery as described in the incorporated applications, may be used to provide electrical power to the tracked distance measuring device 1000.

As further illustrated in FIG. 10B, the actuator 1006 may communicate with a PCB 1012 and initiate a distance measurement via rangefinder element 1014 that may correlate to a position (location and pose) of the tracked distance measuring device 1000. The rangefinder element 1014 may be a laser distance measurement rangefinder. In other embodiments, the rangefinder element may be or include other types of rangefinders (e.g., radar, sonar, LiDAR, ultrasonic, or the like).

The PCB 1012 may include a processing element using a processor or processors and associated memory that may be used to generate, receive, and process signals (e.g., data signals from sensors and mechanisms and/or other system devices, and the like) as well as user input signals recorded via microphone 1016. The PCB 1012 may further include various other sensors and modules such as gyroscopic sensors or other inertial navigation sensors, radio transceiver modules for communicating with various system devices (e.g., Bluetooth, WIFI, or other wireless communications transceivers), and so on.

The tracked distance measuring device 1000 may further include one or more cameras, such as the telephoto camera 1018 and wide angle camera 1020. In embodiment 1000, the cameras 1018 and 1020 may take still or video images of a targeted POI and/or the surrounding environment. Such images may further be displayed on graphical user interface 1004 and/or communicated to a connected system device for display. Images may further be stored and correlated/associated with the dipole signals and distance to POI data. Displaying of imagery provided by cameras 1018 and/or 1020 on graphical user interface 1004 may provide a visual reference to allow a user to effectively aim the tracked distance measuring device 1000 at a POI. Imagery collected may be used to identify the POI and create and map the POI which may also include metadata identifying the POI type or other characteristics through artificial intelligence, simultaneous localization and mapping (SLAM), or image recognition methods.

The tracked distance measuring device 1000 may further include a laser 1022, which may be a green laser or other color or other daylight visible laser, which may emit a laser beam and allow or aid to visually determine and aim the tracked distance measuring device 1000 by providing a precise visual reference of where the tracked distance measurement device is being aimed.

Figures 11A, 11B:
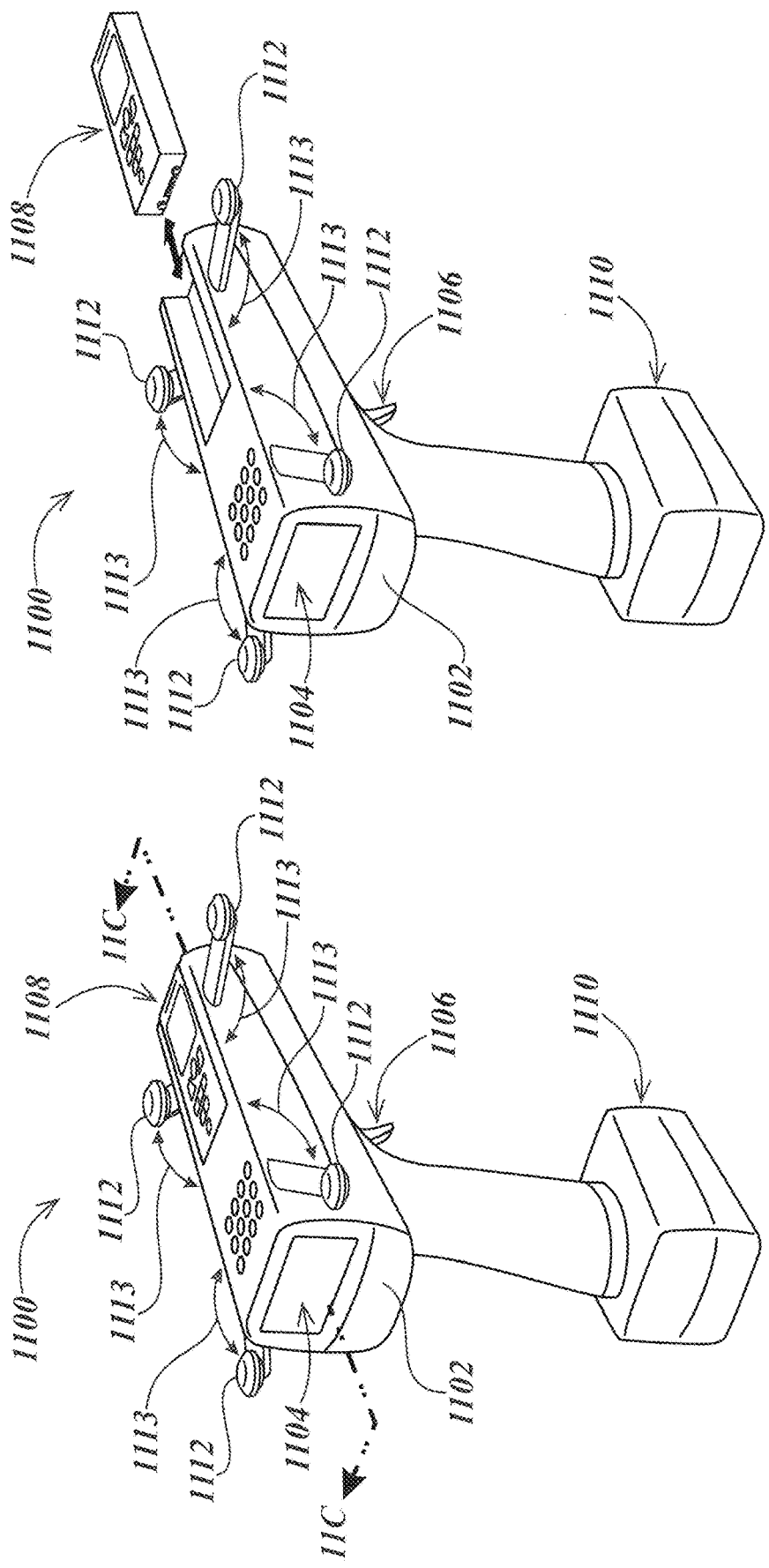
FIG. 11A illustrates details of an embodiment of a tracked distance measuring device embodiment that accommodates a separate distance meter device.
FIG. 11B is another view of details of the tracked distance measuring device embodiment of FIG. 11A.

In some embodiments, a tracked distance measuring device may include the signal transmitter and associated electronics with the distance measuring aspects implemented in a separate distance meter (e.g., commercially available Leica DISTO™ line of laser distance meters or similar or equivalent devices). For example, as illustrated in FIGS. 11A and 11B, a tracked distance measuring device embodiment 1100 may include a housing 1102 in which a graphical user interface 1104 may be positioned. An actuator/trigger mechanism 1106 may allow a user to actuate tracked distance measuring device 1100. In other embodiments, other types of user input mechanisms (e.g., pushbutton controls, switches, levers, touchscreens. Etc/) may be used. The tracked distance measuring device 1100 may be configured to work with a distance meter device 1108, which may be a commercially available distance meter.

For example, as demonstrated in FIG. 11B, the distance meter device 1108 may be removably attachable to the tracked distance measuring device 1100. The tracked distance measuring device 1100 may further include a battery 1110, which may be a smart battery as described in U.S. patent application Ser. No. 13/532,721, filed Jun. 25, 2012, entitled MODULAR BATTERY PACK APPARATUS, SYSTEMS, AND METHODS and U.S. patent application Ser. No. 13/925,636, filed Jun. 24, 2013, entitled MODULAR BATTERY PACK APPARATUS, SYSTEMS, AND METHODS INCLUDING VIRAL DATA AND/OR CODE TRANSFER of the incorporated applications, configured to provide electrical power to the tracked distance measuring device 1100.

The tracked distance measuring device 1100 illustrated in FIGS. 11A and 11B may further include a stowable satellite navigation antenna array 1112. The stowable satellite navigation antenna array 1112 may include multiple individual antennas, as well as associated circuitry, for receiving GPS and/or other satellite navigation signals in order to determine location and/or tilt, orientation, and pose of the tracked distance measuring device 1100. The individual antennas may be positioned along an arm that may be further configured to fold in and be stored when not in use or folded out and extend outward when in use. For instance, the arms may be configured to fold along direction of arrows 1113.

Figure 11C:
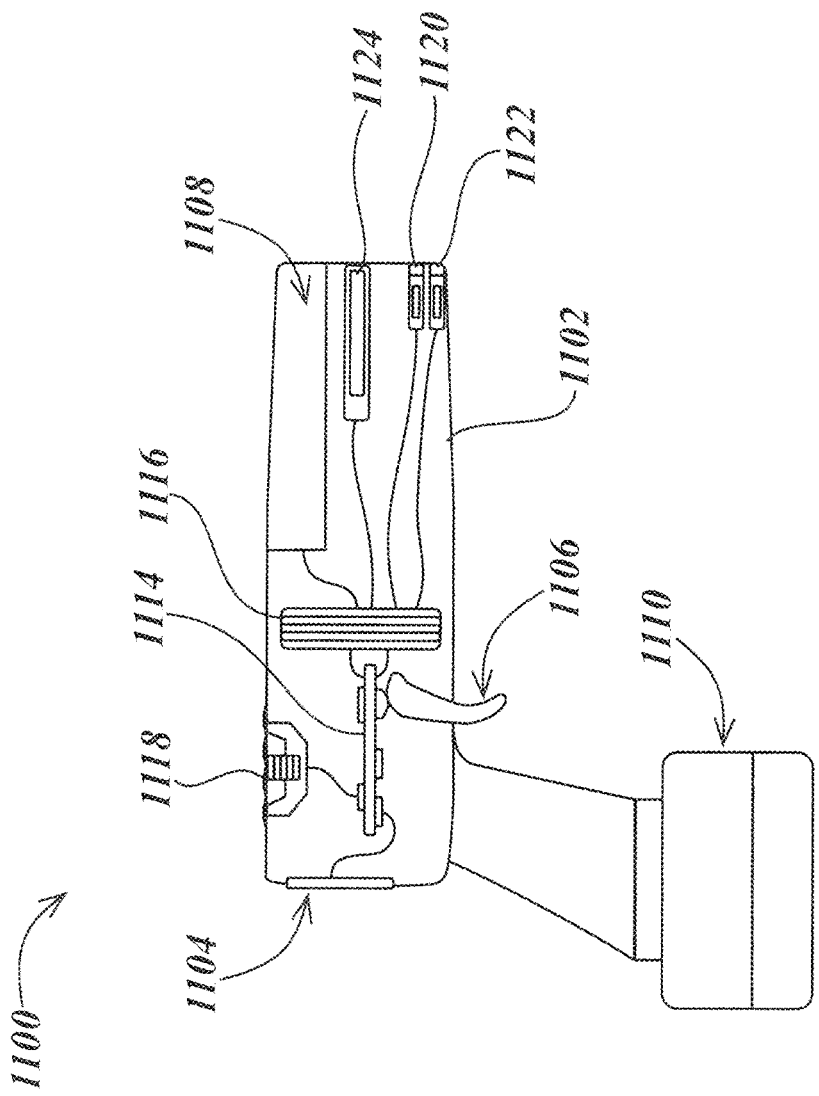
FIG. 11C is a section view of details of the tracked distance measuring device embodiment of FIG. 11A along line 11C-11C.

As further illustrated in FIG. 11C, the actuator 1106 may communicate with a PCB 1114 and initiate a dipole magnetic field signal from antenna 1116 and a distance measurement via distance meter device 1108, that may correlate to a position (location and pose) of the tracked distance measuring device 1100. The PCB 1114 may include a processing element using a processor or processors and associated memory that may be used to generate, receive, and process signals (e.g., data signals from sensors and mechanisms, distance meter device 1108, and/or other system devices, and the like) as well as user input signals recorded via microphone 1118.

The PCB 1114 may include other sensors and modules, such as gyroscopic sensors or other inertial navigation sensors, radio transceiver modules for communicating with various system devices (e.g., Bluetooth, WIFI, or other wireless communications transceivers), and so on. The tracked distance measuring device 1100 may further include one or more cameras such as the telephoto camera 1120 and wide angle camera 1122. In embodiment 1100, the cameras 1120 and 1122 may take still or video images of a targeted POI and/or the surrounding environment. Such images may further be displayed on graphical user interface 1104 and/or communicated to a connected system device for display. Images may further be stored and correlated with the dipole signals and distance to POI data. Displaying of imagery provided by cameras 1120 and/or 1122 on graphical user interface 1104 may allow a user to effectively aim the tracked distance measuring device 1100 at a POI. Imagery collected may be used to identify the POI and create and map the POI which may also include metadata identifying the POI type or other characteristics through artificial intelligence, simultaneous localization and mapping (SLAM), or image recognition methods.

The tracked distance measuring device 1100 may further include a laser 1124, which may be a green laser or other color or other daylight visible laser, which may emit a laser beam and allow or aid to visually determine the aim of the tracked distance measuring device 1100.

Figure 12:
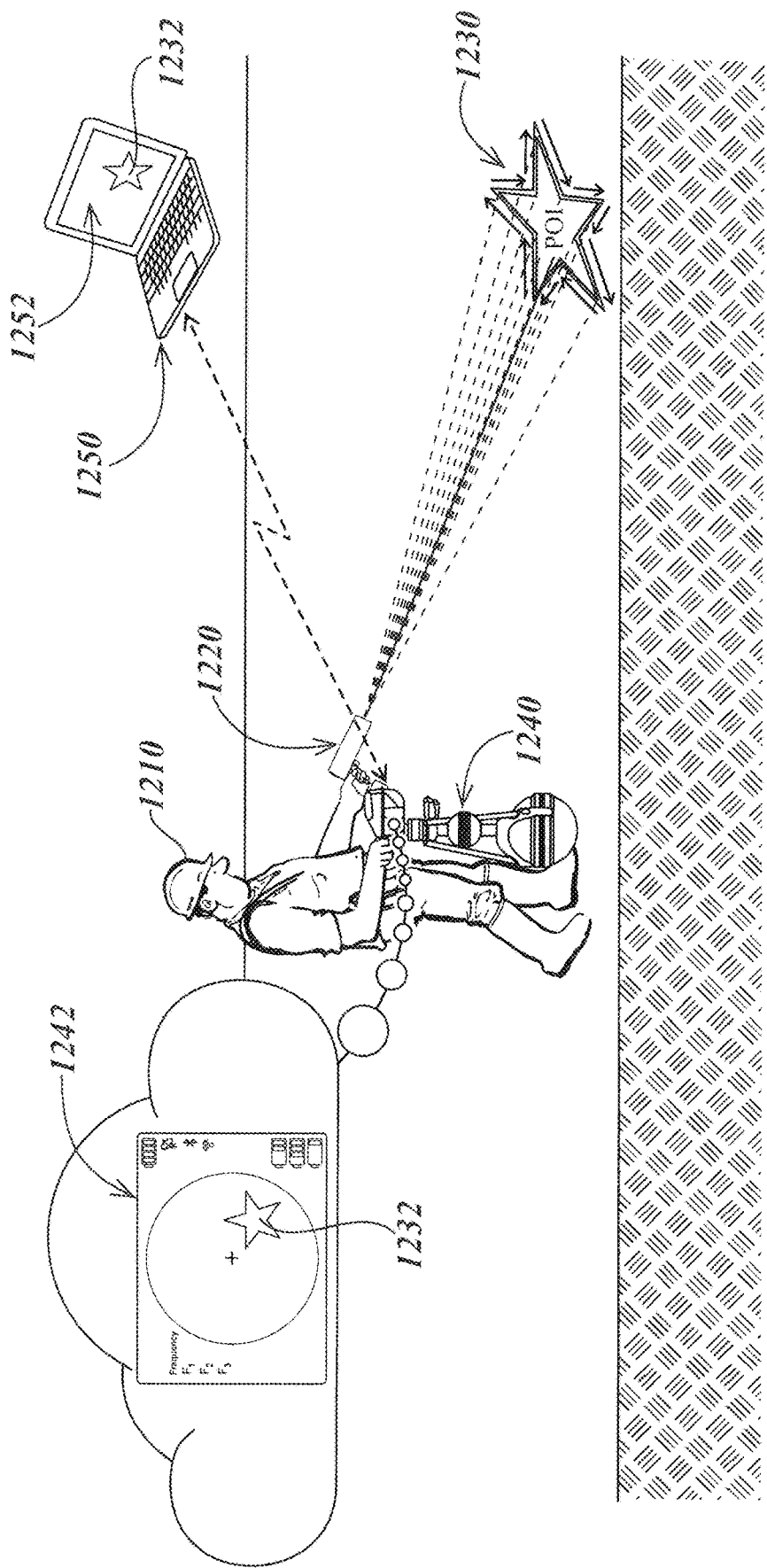
FIG. 12 illustrates an example operation for tracing a POI with a tracked distance measuring device embodiment.

The various tracked distance measuring devices as described herein may be used in a tracking mode to draw out or outline POIs. For example, as illustrated in FIG. 12, a user 1210 may be equipped with a tracked distance measuring device 1220, which may be any of the types described herein or similar or equivalent types, to outline POI 1230. The locations associated with POI 1230 may further be communicated to a utility locator 1240, one or more computer mapping devices 1250, and/or other computer systems and system devices. The mapped POI location 1232 may further be displayed on the graphical user interface 1242 of the utility locator 1240, display 1252 of computer mapping device 1250, and/or displayed on other system devices.

Figure 13:
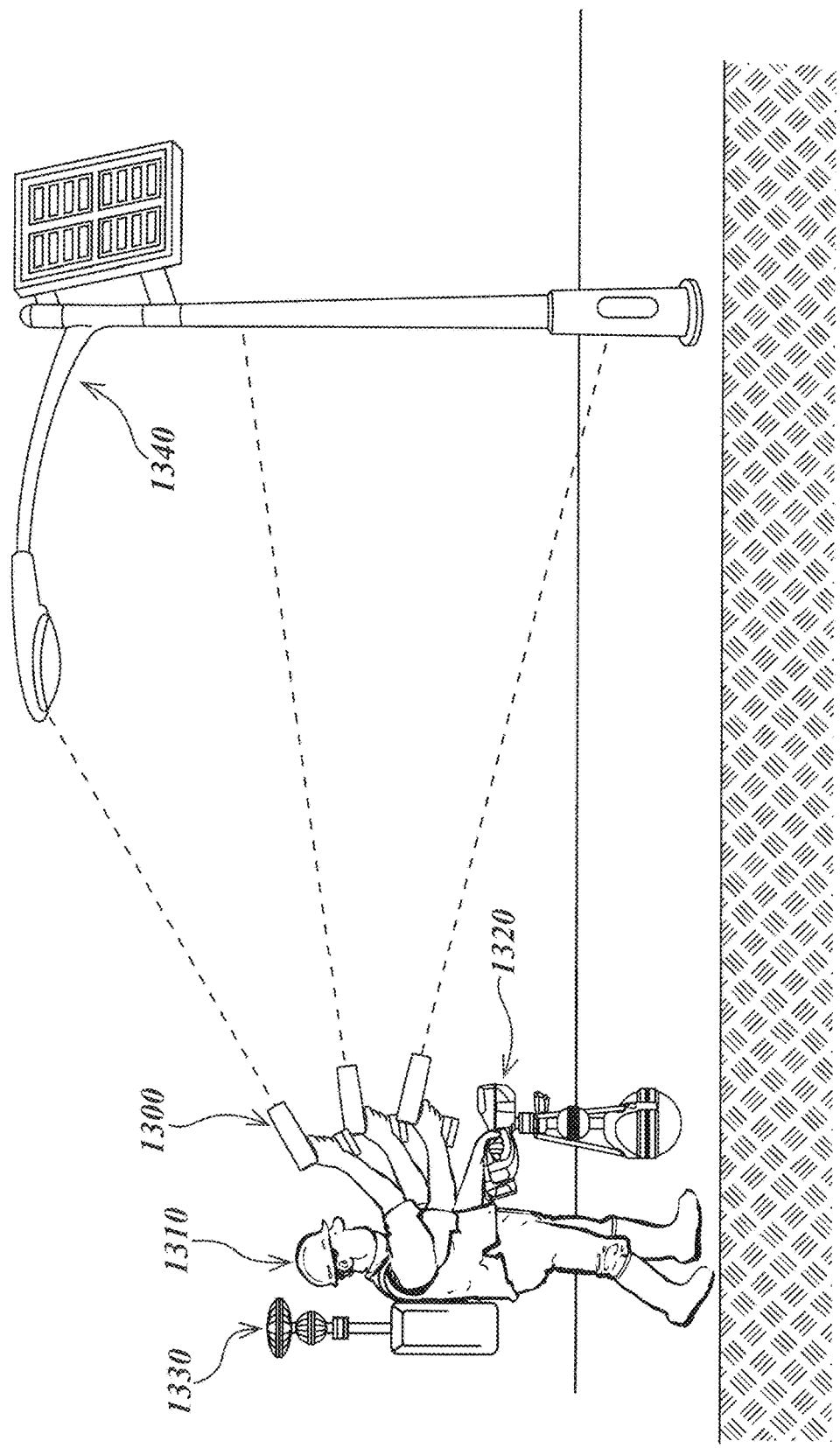
FIG. 13 illustrates details of an embodiment of a tracked distance measuring device for use in determining the dimensions and geometry of a POI.

Tracked distance measuring device embodiments may also be used to determine dimensions and or geometry of POIs or other objects within the work area. For example, as illustrated in FIG. 13, tracked distance measuring device embodiment 1300, which may be of any embodiment of the types described herein or equivalent or similar devices, may be held by a user 1310 who may further hold a utility locator device 1320 and a GPS backpack device 1330. The tracked distance measuring device 1300 may be directed at a POI 1340 and may generate one or more tracked measurements of POI 1340. Within FIG. 13, user 1310 is shown generating three different tracked measurements of POI 1340 though a different number of measurements may be used to determine a POI's height or other dimensions or the POI's geometry.

Figure 14A:
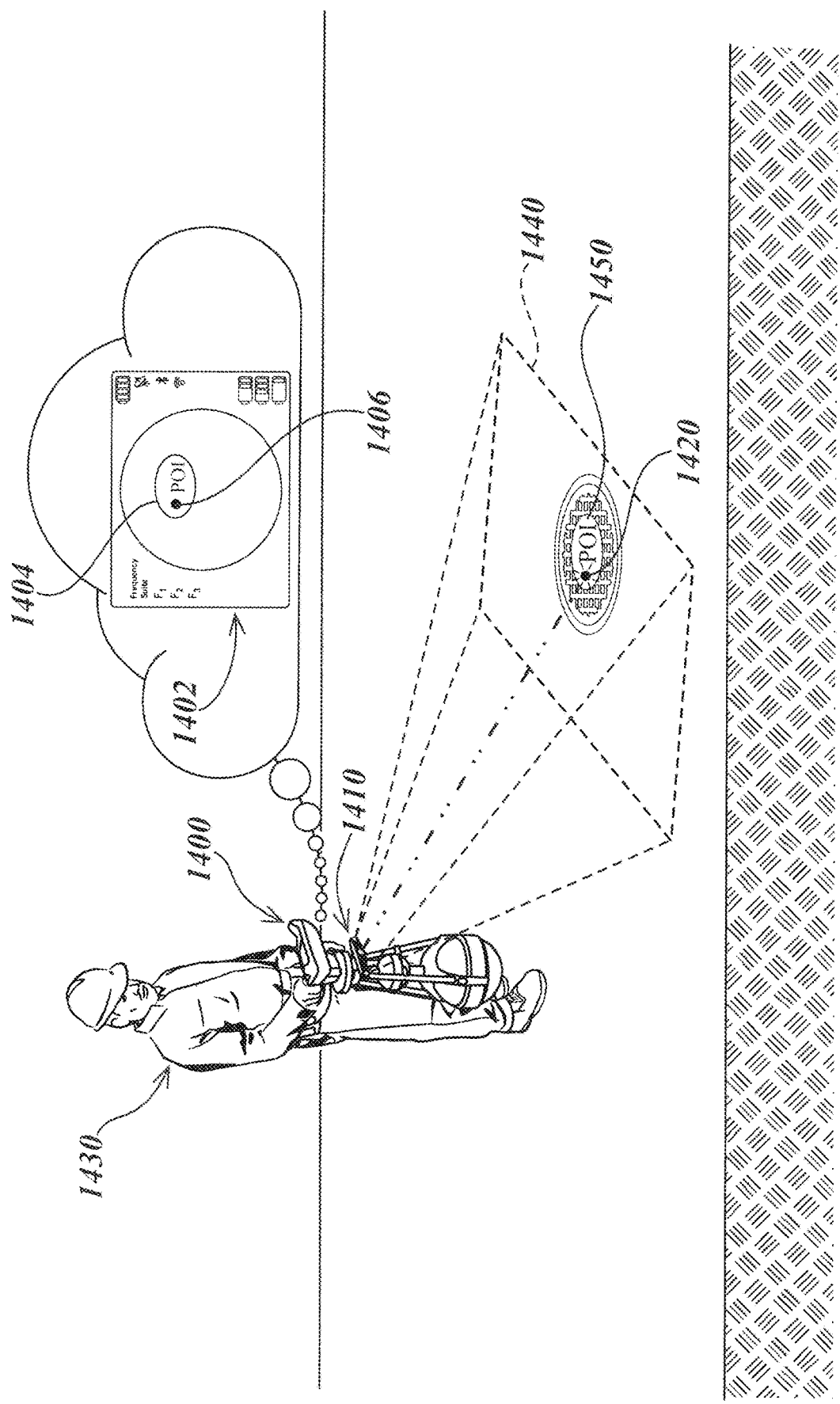
FIG. 14A is an illustration details of a locate operation where the distance measuring capabilities are built into an optical ground tracking device embodiment.

In some embodiments, tracked distance measuring capabilities may be built into an optical ground tracking device disposed upon a utility locator such as those described in the incorporated applications. For example, as illustrated in FIG. 14A, a utility locator device embodiment 1400 may include an optical ground tracking device 1410 disposed upon the utility locator 1400's mast to optically track movements and locations of utility locator device 1400 as it is moved across a locate area.

Figure 14B:
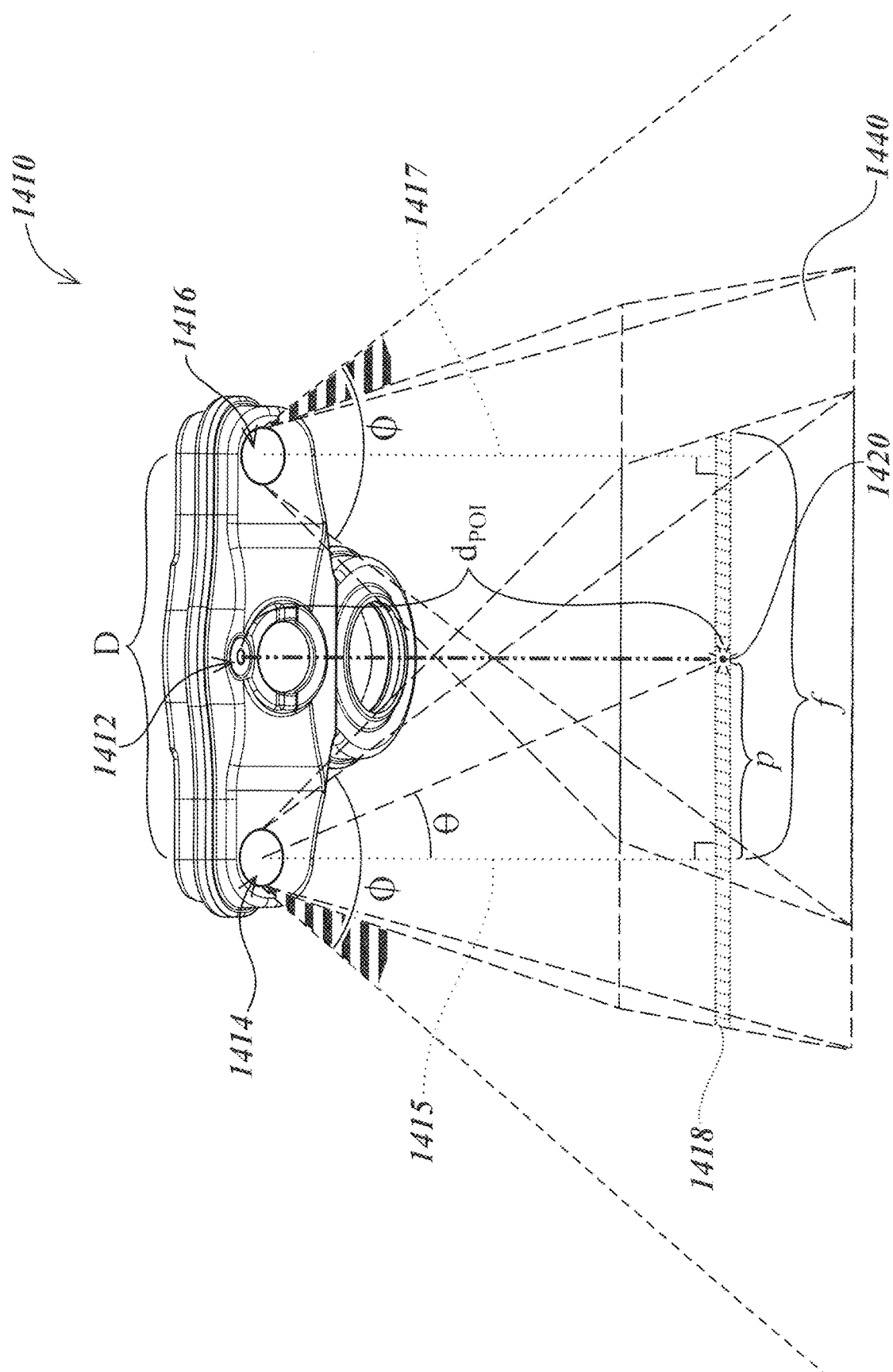
FIG. 14B illustrates details of the optical ground tracking device embodiment of FIG. 14A.

As further shown in FIG. 14B, optical ground tracking device embodiment 1410 may further include a laser 1412, which may be a green laser or other color or other daylight visible laser, that may emit a laser beam onto the ground surface. The optical ground tracking device 1410 may further include a series of cameras 1414 and 1416 configured to track the ground and determine movement of the utility locator device 1400 (FIG. 14A). Each camera may have a respective optical axis 1415 and 1417 which may be parallel and oriented in the same direction as the beam emitted by laser 1412. The laser 1412 may be located midway along the baseline between cameras 1414 and 1416 wherein the baseline may have a known measured distance notated as D. Each camera 1414 and 1416 may have an angle of total possible field of view notated as ϕ bisected by the optical axis 1415 or 1417 that may include measured areas truncated from view of the internal imager sensor within the respective camera 1414 or 1416. Likewise, the total distance from the optical axis to the edge of frame measured in pixels is notated herein as f.

Another angle, notated herein as θ, may represent the angle between the optical axis 1415 or 1417 towards laser spot 1420. The distance within the frame measured along the optical axis 1415 or 1417 and laser spot 1420 measured in pixels may be notated herein as p. Within the optical ground tracking device 1410 illustrated in FIG. 14B, the angle ϕ may be known and the pixel measurements of f and p may be determined from the frame collected by the camera containing the laser spot such as laser spot 1420 within the frame collected by camera 1414. A further calculation may be made to determine angle θ wherein $$\theta = \frac{(\phi * p)}{2 * f}.$$

The optical ground tracking device 1410 may be of the variety described in U.S. patent application Ser. No. 14/752,834, filed Jun. 27, 2015, entitled GROUND TRACKING APPARATUS, SYSTEMS, AND METHODS and U.S. patent application Ser. No. 15/187,785, filed Jun. 21, 2016, entitled BURIED UTILITY LOCATOR GROUND TRACKING APPARATUS, SYSTEMS, AND METHODS of the incorporated patent and patent applications with the addition of a laser such as laser 1412.

Returning to FIG. 14A, the laser 1412 (FIG. 14B) may emit a laser beam and create a laser spot 1420 along the ground surface visually identifiable by a user 1430 and allowing or aiding the user 1430 to aim the cameras 1414 and 1416 (FIG. 14B). As illustrated in FIG. 14A, the field of view 1440 of the cameras 1414 and 1416 (FIG. 14B) of optical ground tracking device 1410 may be aimed towards a POI 1450. The laser 1412 (FIG. 14B) may be oriented within optical ground tracking device 1410 such that the laser spot 1420 may be located within the field of view 1440.

As illustrated in FIG. 14A, the laser spot 1420 may be located within the center of the field of view 1440. As the field of view 1440 is directed towards POI 1450, the optical ground tracking device 1410 may collect imagery from field of view 1440 as well as determine and map the location of the POI 1450 (e.g., method 1500 of FIG. 15). The imagery collected, which may include that of the laser spot 1420 and the POI 1450 within the field of view 1440 may further be displayed upon a graphical user interface 1402 on the utility locator device 1400 (e.g., POI indication 1404 or laser spot indication 1406) and/or communicated to other mapping systems or other computing devices (not illustrated).

Figure 14C:
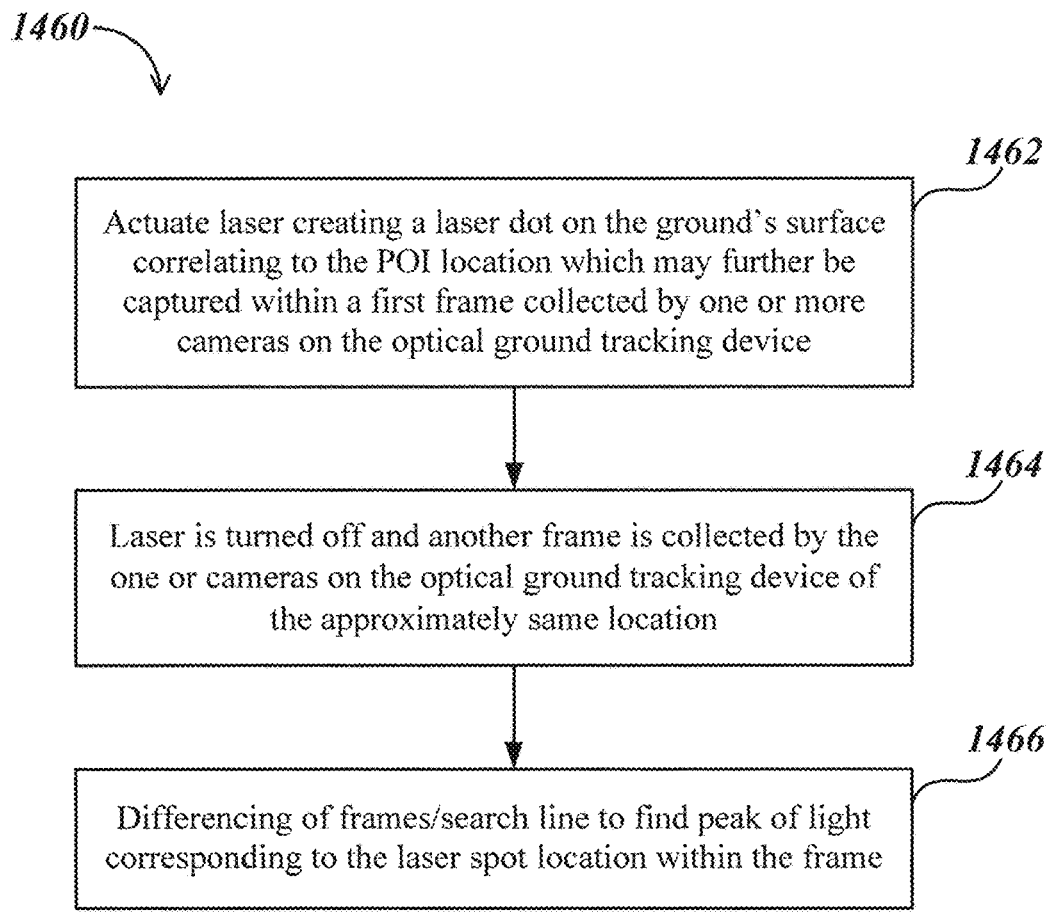
FIG. 14C illustrates details of an embodiment of a method for finding a laser spot corresponding to a POI within two or more subsequent camera frames.

An optical ground tracking embodiment including a laser, such as optical ground tracking device 1410 of FIGS. 14A and 14B, may use a method such as method embodiment 1460 as illustrated in FIG. 14C to determine a POI's location within the field of view of one or more cameras of the optical ground tracking device. In step 1462, the laser may be turned on to create laser spot, such as laser spot 1420, along the ground surface within the field of view of one or more of the cameras on the optical ground tracking device and recorded within a first frame or set of overlapping adjacent frames. Within this method, the laser spot may correlate to the POI location on the ground. The recorded image(s) of the frame(s) from step 1462 may be stored within a memory. In step 1464, the laser may be turned off within another frame or set of overlapping frames captured by the camera or cameras and further stored within memory.

Due to frame rate of images collected within the subsequent frames and/or the user directing the laser of the optical ground tracking device towards a POI and holding the device aimed in the same direction between frames, the subsequent frames or frame sets may be of the same approximate location. In a step 1466, differencing of subsequent frames or search lines known to contain the laser spot may be carried out in order to find a peak of light corresponding to the location of the laser spot within the frame. In some embodiments, the orientation of the laser relative to the camera or cameras (e.g., the orientation of cameras 1414 or 1416 relative to laser 1412 of optical ground tracking device 1410 illustrated in FIG. 14B) may determine that the laser spot may occur within a single search line such as search line 1418 of FIG. 14B. In some such method embodiments, motion compensation signal processing may be used to compensate for movement between subsequent frames. For instance, a sum of absolute difference, other block-matching method, or other motion compensation methods may be used.

Within the optical ground tracking device 1410 illustrated in FIG. 14B, the laser 1412 may be oriented midway between cameras 1414 and 1416 and oriented such that the laser emitted may be parallel to the optical axes 1415 and 1417. Given such a geometry, the distance to laser spot 1420, which may correspond to a POI location in use, is notated as $d_{POI}$ and may be determined by method 1470 described in FIG. 14D. Various terms illustrated in FIG. 14B may be used within the method 1470 of FIG. D. Method embodiment 1470 of FIG. D may include step 1472 in which the location of the laser spot may be determined in at least one camera. This step may be implemented via method 1460 of step 14C. In step 1474, a value for angle θ may be determined wherein $$\theta = \frac{(\phi * p)}{2 * f}.$$

As the optical axis and laser beam direction are parallel (e.g. optical axis 1415 and beam from laser 1412 of optical ground tracking device 1410 illustrated in FIG. 14B), the angle θ and the angle originating from laser spot between the camera and laser may be equivalent. In step 1476, the measurement or range between the laser and laser spot (e.g., laser 1412 and laser spot 1420 of FIG. 14B) notated as $d_{POI}$ may be calculated wherein $d_{POI} = D/(2*\tan\theta)$. With a $d_{POI}$ value determined through method 1470, the location of a POI corresponding to the laser may further be determined (e.g., through the use of method 900 of FIG. 9). The illustration of optical ground tracking device embodiment 1410 of FIG. 14B and method embodiment 1470 of FIG. 14D only illustrate using a single camera (e.g., camera 1414 of FIG. 14B) to determine a $d_{POI}$ value. The method 1470 of FIG. 14D may, in some embodiments, be implemented with the other camera (e.g., camera 1416 of FIG. 14B) or via both cameras or with additional cameras or imaging sensors (not shown).

In tracking distance measuring device embodiments equipped with an optical ground tracking having two or more cameras, such as for stereoscopic imaging, three dimensional modeling of a POI may be done. For example, the optical ground tracking device embodiment 1410 illustrated in FIG. 14B may have spatially spaced apart cameras 1414 and 1416 that may each generate an image of the same POI (e.g., a POI marked by laser spot 1420) from different known angles. Methods known or developed in the art for three dimensional reconstructions from multiple images may be applied to the overlapping images of the POI generated by cameras 1414 and 1416 to generate a three dimensional model of the POI. The three dimensional POI model may further be added to a map or mapping system covering the locate area.

Figure 15:
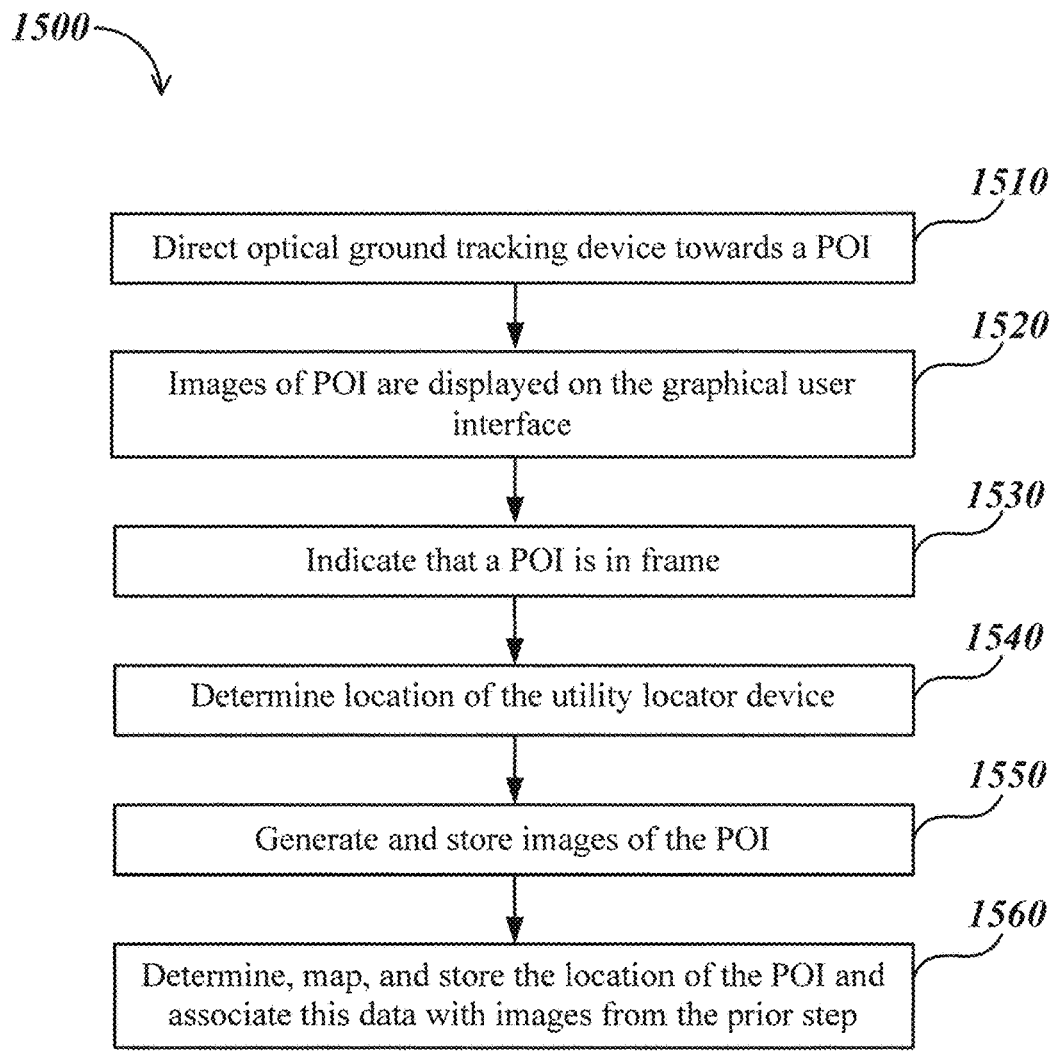
FIG. 15 illustrates details of an embodiment of a method for using an optical ground tracking device as a POI mapping device.

FIG. 15 illustrates details of a method embodiment 1500 that may be used for POI identification and mapping using an optical ground tracking device configured for distance measuring, such as the optical ground tracking device embodiment of FIGS. 14A and 14B, or other optical ground tracking device embodiments as described in the incorporated applications or as known or developed in the art. Process 1500 may begin at step 1510, wherein the laser and optical ground tracking device may be aimed/pointed or otherwise positioned towards a POI. In step 1520, as images of the POI come into a viewing frame of the optical ground tracker they may be displayed on the graphical user interface of the utility locator and/or other communicatively coupled system device. For example, the utility locator may be held momentarily in a position with the optical ground tracking device directed towards the POI. In some embodiments, the laser may be pulsed on and off so that it appears only in certain imaging fields, such as, for example, in every other field of view collected by one or more cameras, or in frames collected by the multiple cameras with overlapping frames as described in the incorporated optical ground tracking applications.

A sum of absolute differences or other similar or equivalent algorithms for motion estimation may be used to difference the frames and provide relative location of the in frame POI relative to the utility locator. In step 1530, an indication may be provided that a POI is at the location in frame at the optical ground tracking device. For example, a user may press a button on the utility locator or provide an audio note to a microphone on the utility locator or other like indication to the presence of a POI. In some embodiments, POI identification may be done using image analysis, computer vision, artificial intelligence, and/or other machine learning algorithms and methods as known or developed in the art, in either real time or in post processing.

In step 1540, the location of the utility locator device may be determined, such as, for example, is described previously herein with respect to satellite or terrestrial positioning system receivers, inertial sensors, or other positioning devices. For example, the utility locator may be equipped with GPS and/or other satellite navigation receiver, as well as the optical ground tracking device. The GPS receiver may determine the location of the utility locator relative to the Earth's surface and provide a corresponding output with positional data. In step 1550, images of the POI may be generated, associated with the POI data, and stored in a non-transitory memory. Such images may be generated through the cameras within the optical ground tracking device, or, in some embodiments, via separate cameras or imaging sensors.

In step 1560, the location of the POI may be determined and stored within the memory as data. For example, from the utility locator location data determined in a prior step and the known geometry of cameras and laser on the optical ground tracking device relative to the utility locator, the location of the POI may be determined by calculation using the various determined distances and angles and combining them in three-dimensional vector space.

Figure 14D:
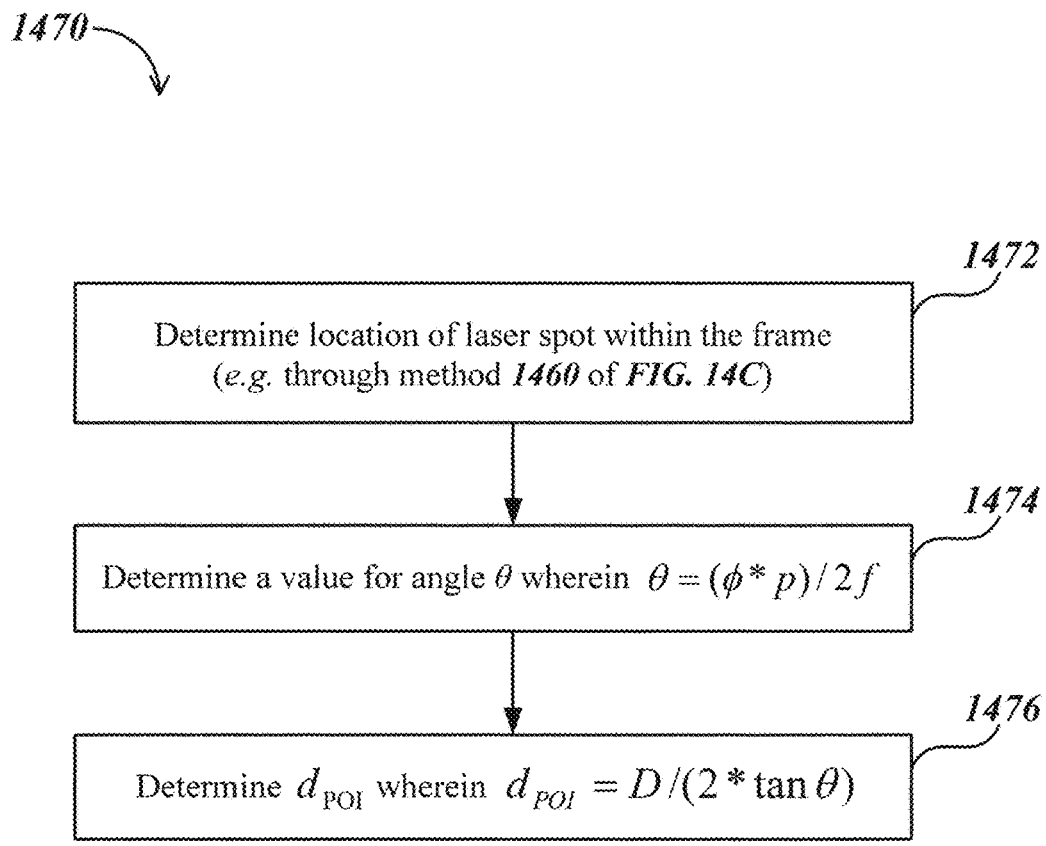
FIG. 14D illustrates details of an embodiment of a method for finding the range to a laser spot corresponding to a POI.

Step 1560 may be implemented by a process such as that illustrated in the method embodiment 1460 of FIG. 14C for determining the location of the POI marked by the laser within the camera frame, method 1470 of FIG. 14D to determine range to the POI marked by the POI, and/or method 900 of FIG. 9 to determine the location of the POI relative to the Earth's surface and map the POI. The various steps described in method 1500 may be implemented in either real time within the utility locator and/or in post processing either within the utility locator or other system or electronic computing device.

Optionally, the POI imagery and/or other imagery collected by cameras and optical ground tracking devices as described within the various embodiments may be orthorectified and aligned with aerial imagery of the Earth's surface.

Figure 16:
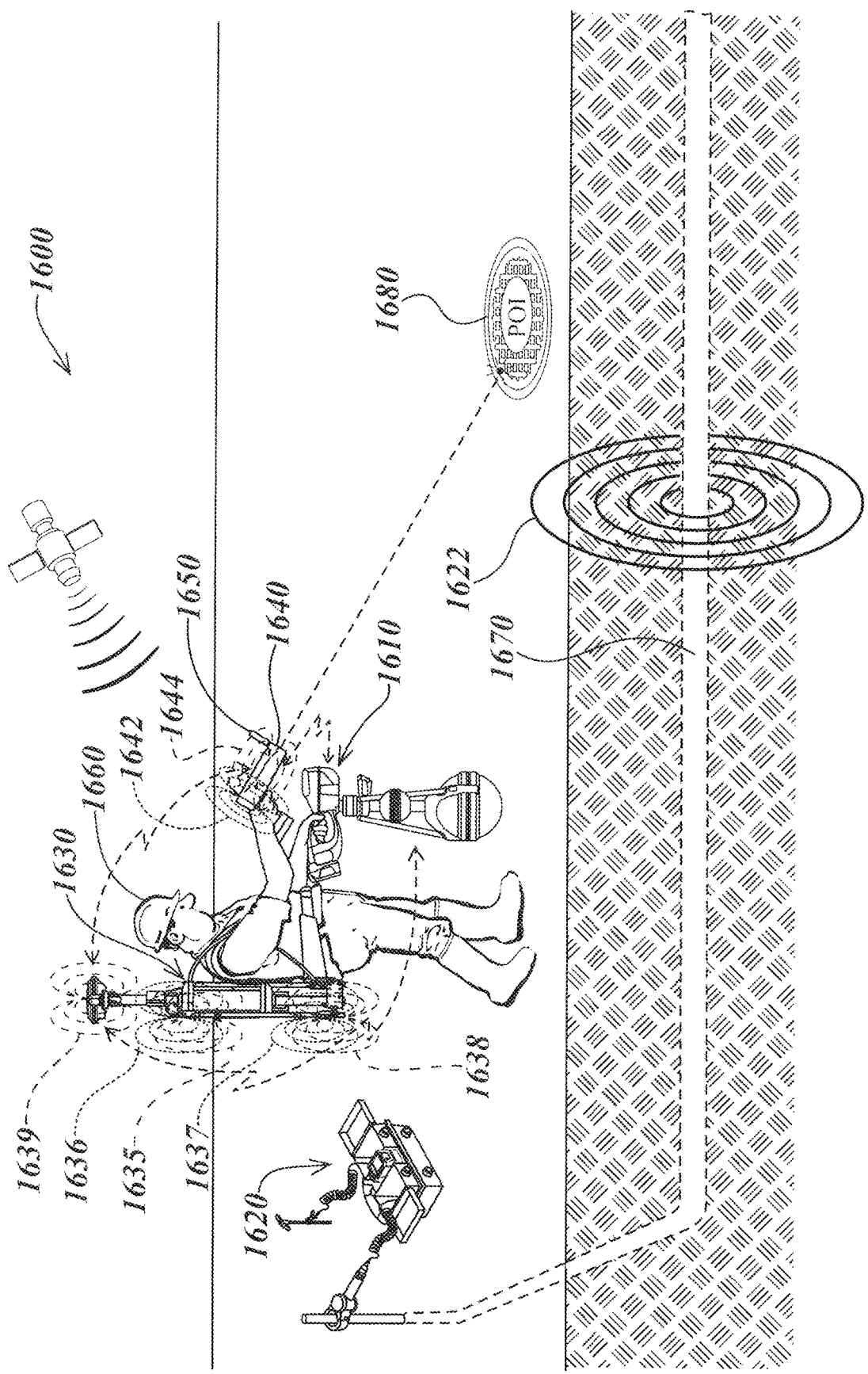
FIG. 16 illustrates details of an embodiment of a tracked distance measuring device and utility locating system.

FIG. 16 illustrates details of an embodiment 1600 of a tracked distance measuring device and utility locating system. As shown, a utility locating and POI identification system may include a utility locator device 1610, a transmitter 1620, a backpack device 1630 (interchangeably referred to as GPS backpack device 1630), and a tracked distance measuring device 1640. A smart phone 1650 (also illustrated in the FIG. 17A as smart phone 1750 associated with the tracked distance measuring device 1710) may secure to the tracked distance measuring device 1640 allowing the user 1660 to view device or system data, aim the tracked distance measuring device 1640, process and/or store POI and/or utility locate and mapping data. Optionally, the smart phone 1650 may take photographs and/or video of the work area. For instance, a data link (wired or wirelessly utilizing Bluetooth, WIFI, or like wireless communications transceivers) may be established between the tracked distance measuring device 1640 and the smart phone 1650. Upon actuation of the tracked distance measuring device 1640, the smart phone 1650 may record imagery of a targeted POI such as POI 1680. Likewise, the smart phone 1650 may communicate other sensor data with the tracked distance measuring device 1640 and/or other system devices. In some embodiments, the smart phone 1650 may process and/or store the tracked distance measuring device 1640 and/or other system device data. In some embodiments, the smart phone 1650 may further communicate data to a cloud computing system for storage and/or processing of data.

The utility locator device 1610 may sense one or more electromagnetic signals, such as signal 1622 emitted from utility line 1670 and determine the location of utility line 1670 (as well as depth within the ground therefrom). Signal 1622 emitted from utility line 1670 may be generated from transmitter 1620 coupled to utility line 1670. Likewise, the utility locator device 1610 may measure various other electromagnetic signals present in the environment to determine and map such signals that may further be used to determine the location and orientation of various signal sources within the locate environment (e.g., other utility lines or buried conductor emitting signals, overhead powerlines, radio broadcast towers, electronic marking devices, Sondes, or other signal sources).

In some embodiments, a system in keeping with the present disclosure may include one or more utility locator devices configured for use with passive signals generated due to, for example, current flow induced in the utility from broadcast signals such as AM broadcast radio transmissions or other ambient signals, and/or active signals generated upon coupling or inducing current onto the utility line 1670 by using a transmitter device (e.g. signal 1622 from transmitter 1620 coupled to utility line 1670) or inductive couplers or lines that otherwise have inherent current flow therein. Within system 1600, such signals measured at the utility locator device 1610 may include dipole signals 1635-1639 emitted by the GPS backpack device 1630 and/or dipole signals 1642 and 1644 emitted by the tracked distance measuring device 1640 to determine the location and pose of the GPS backpack device 1630 and tracked distance measuring device 1640 relative to the utility locator device 1610 and further use such information to determine the location of and map signals measured by the utility locator device 1610 and any POIs identified by a tracked distance measuring device such as POI 1680 of FIG. 16 identified by tracked distance measuring device 1640 (e.g., through methods described herein in connection with FIGS. 3A-4, 5C, and 9). Additional wireless communication may be established between the utility locator device 1610, GPS backpack device 1630, tracked distance measuring device 1640, and smart phone 1650 for exchange of data and control over various system devices.

Figure 17A:
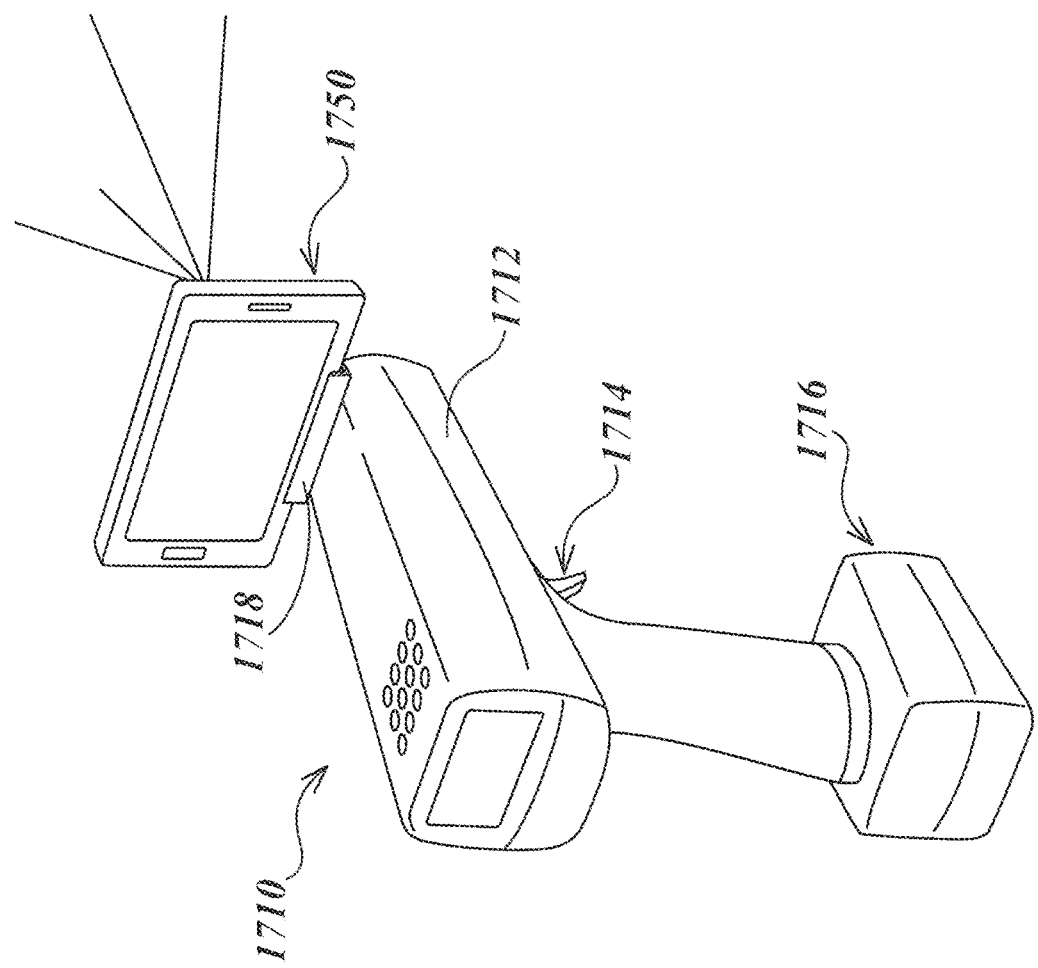
FIG. 17A illustrates details of an embodiment showing tracked distance measuring device with a smart phone attached thereto.

FIG. 17A illustrates details of an embodiment showing additional details of a tracked distance measuring device 1710 with a smart phone 1750 attached or secured thereto. The tracked distance measuring device 1710 with smart phone 1750 may be of the variety or share aspects with the tracked distance measuring device 1610 and smart phone 1650 described in connection with FIG. 16 or other tracked distance measuring devices as disclosed herein. The tracked distance measuring device 1710 may externally include a housing 1712 and an actuator or trigger mechanism 1714. The actuator/trigger mechanism 1714 may allow a user to actuate tracked distance measuring device 1710. In other embodiments, other types of user input mechanisms (e.g., pushbutton controls, switches, levers, touch screens, or through an attached smart phone) may be included. The actuator/trigger mechanism 1714 may be actuated in a single action or in a continuous tracing mode (as described within FIG. 12) if held depressed. A battery 1716 may secure to tracked distance measuring device 1710 to provide electrical power.

As shown in FIGS. 17B and 17C, the smart phone 1750 (FIG. 17A) may be secured to the tracked distance measuring device 1710 via bracket 1718. The bracket 1718 may be designed to allow an unobstructed view of a targeted POI and surrounding work area via the connected smart phone (such as smart phone 1750 of FIG. 17A). In some embodiments, the bracket may be made adjustable to accommodate the dimensions of different smart phones, tablets, or other like computing devices.

As further illustrated in FIG. 17C, the actuator/trigger mechanism 1714 may pass into an internal cavity within the housing 1712 such that the actuator/trigger mechanism 1714 may allow for communication to a PCB 1720 and actuate the generation of dipole signals emitted via antennas 1722 and 1724 as well as initiate a correlating distance measurement via rangefinder element 1726. The antennas 1722 and 1724 may be arranged orthogonal to one another in a known arrangement within the tracked distance measuring device 1710. The dipole signals produced by each antenna 1722 and 1724 may be the same frequency or different frequencies known at the utility locator device. The rangefinder element 1726 may be a laser distance measurement rangefinder. In other embodiments, the rangefinder element may be or include other types of rangefinders (e.g., radar, sonar, LiDAR, ultrasonic, or the like). One or more cameras, such as camera 1727 may be included to collect still and or video images of a POI and/or the surrounding work area in addition to or in lieu of an attached smart phone (e.g., smart phone 1750 of FIG. 17A). The PCB 1720 may contain a processing element using a processor or processors and associated memory that may be used to generate, receive, and process signals (e.g., dipole signal for tracking, data signals from sensors and mechanisms and/or other system devices, and the like) as well as user input signals recorded via microphone 1728.

The PCB 1720 may further include various other sensors and modules such as gyroscopic sensors or other inertial navigation sensors, radio transceiver modules for communicating with various system devices (e.g., Bluetooth, WIFI, or other wireless communications transceivers), and so on. In embodiments with wireless transceivers, a wireless connection may be established between various system devices. For instance, as illustrated in FIG. 16, various devices may communicate wirelessly within the system embodiment 1600. In some embodiments, a tracked distance measuring device may further include other sensors and modules including, but not limited to, GPS or other satellite and/or land based navigation system sensors and associated antennas, various cameras and imaging sensors, audio recording capabilities and sensors, as well as graphical user interfaces to display data to a user. A wired connector 1730 may further be provided to a smart phone such as the smart phone 1750 of FIG. 17A allowing a connection to tracked distance measuring device 1710. In some embodiments, a wireless connection (e.g., Bluetooth, WIFI, or other wireless communications transceivers) may instead or additionally be used.

Figure 18:
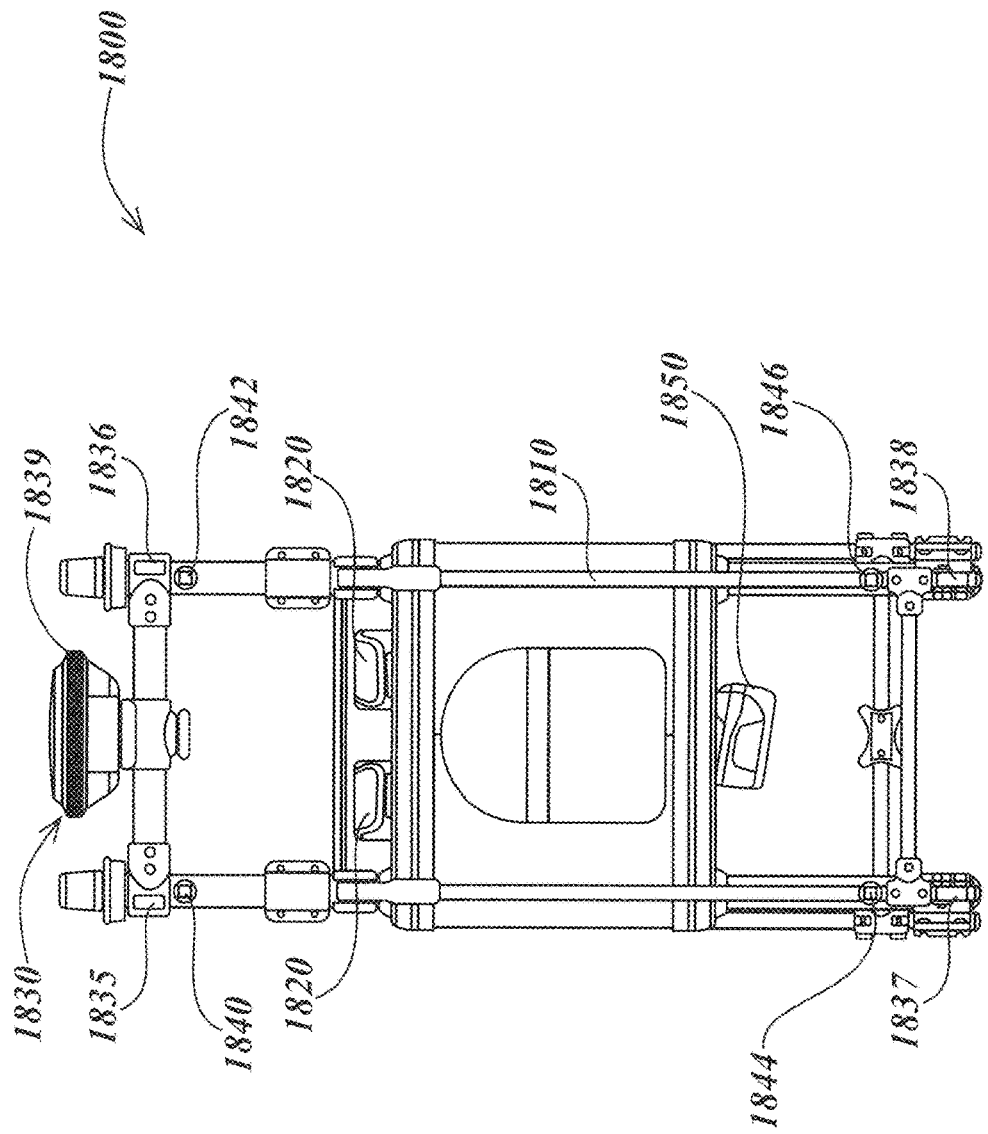
FIG. 18 illustrates details of an embodiment of a GPS backpack device used in conjunction with the tracked distance measuring device embodiment of FIG. 16.

FIG. 18 illustrates details of an embodiment of a GPS backpack device 1800 used in conjunction with the tracked distance measuring device embodiment of FIG. 16. The GPS backpack device 1800 may be of the variety or share aspects with the GPS backpack device 1630 of FIG. 16 or other GPS backpack devices described herein. The GPS backpack device 1800 may be used to determine or refine the geolocation of a utility locator device such as the utility locator device 1610 of FIG. 16. The GPS backpack device 1800 may include a frame 1810 onto which electronics and other components may secure, and straps 1820 allowing a user to carry the GPS backpack device 1800. The GPS backpack device 1800 may further include a GPS antenna 1830 may be of a high precision. For instance, GPS antenna 1830 may be a Viva GS-16 GNSS antenna commercially available from Leica Geosystems or other high precision GPS antennas for receiving signals from global positioning satellites and determining location along the Earth's surface. The GPS backpack device 1800 may emit various signals, such as signals 1635-1639 emitted from GPS backpack device 1630 of FIG. 16, that may be measured at a utility locator device to determine or refine the position and pose of the utility locator device relative to the GPS backpack device and the Earth's surface.

Further, the GPS backpack device 1800 may include a number of antennas or antenna arrays such as beacon antennas 1835-1838 as well as beacon antenna 1839 secured circumferentially about the GPS antenna 1830 that may be used to transmit signals. A different frequency may be transmitted at each beacon antenna 1835-1839 that may be received and measured at a utility locator device such as the utility locator device 1610 of FIG. 16. In some system and device embodiments, the various beacon antennas of a GPS backpack device may be centered around 600 Hz. The use of 600 Hz may be advantageous be the lowest common harmonic of 50 and 60 Hz ideal for accurate tracking. For instance, the various beacon antennas of the GPS backpack device 1800 illustrated in FIG. 18 may include first step frequencies set to plus or minus 8 Hz (608 and 592 Hz), second step frequencies set to plus or minus 7 Hz from the first step frequencies (615 and 585 Hz), third step frequencies set to plus or minus 8 Hz from the second step frequencies (622 and 578 Hz), fourth step frequencies set to plus or minus 7 Hz from the third step frequencies (629 and 571 Hz), fifth step frequencies set to plus or minus 8 Hz from the fourth step frequencies (636 and 564 Hz), and so on. As such, within the GPS backpack device 1800 the beacon antenna 1835 may be set to broadcast a signal at 608 Hz, beacon antenna 1837 may be set to broadcast a signal at 592 Hz, beacon antenna 1836 may be set to broadcast a signal at 615 Hz, beacon antenna 1838 may be set to broadcast a signal at 585 Hz, and beacon antenna 1839 may be set to broadcast a signal at 622 Hz. Such signals measured at a utility locator device may be used to determine the location and pose of the GPS backpack device 1800 relative to the utility locator device. The GPS backpack device 1800 may further include one or more inertial sensors such as sensors 1840, 1842, 1844, and 1846 to aid in determining the pose of GPS backpack device 1800. A battery 1850 may further secure to GPS backpack device 1800 and provide electrical power to the various powered components thereof.

In some POI identification system embodiments including a GPS backpack device, the GPS backpack device may include antennas to receive and measure the signals emitted from a tracked distance measuring device so as to use such signals to determine the location and pose of the tracked distance measuring device. The GPS backpack device embodiment may further process and/or store tracked distance measuring device data and associated POI location data. For instance, the GPS backpack embodiment may utilize the method embodiments described in conjunction with FIGS. 3A-4, 5C, and 9 to determine location and pose of the tracked distance measuring device and further determine the location of POIs relative to the Earth's surface. Such systems allow POI identification and mapping without use of a utility locator device.

Figure 19:
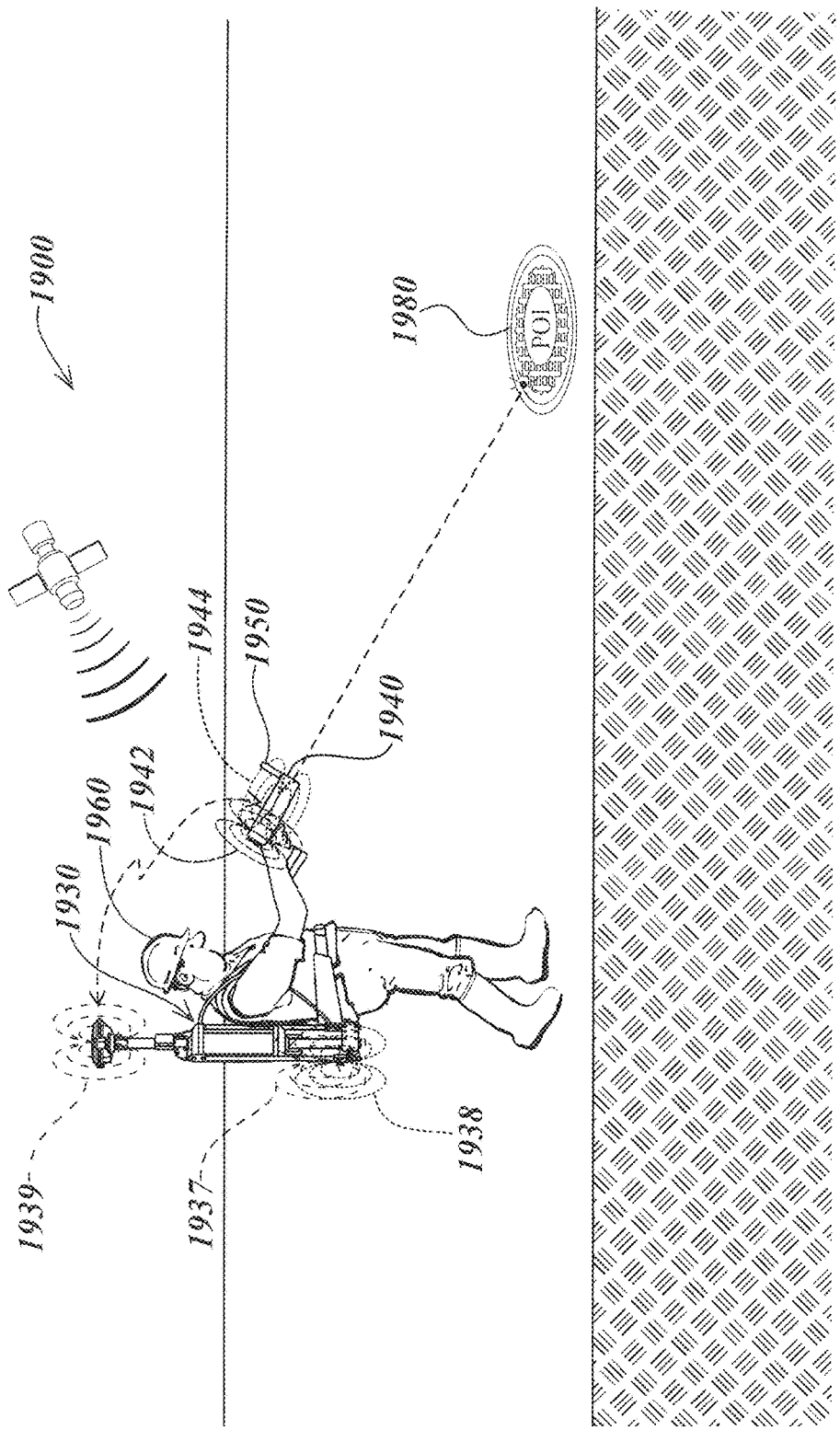
FIG. 19 illustrates details of an embodiment of a POI identification system without a utility locator device.

FIG. 19 illustrates details of an embodiment of a POI identification system 1900 without a utility locator device. The POI identification system embodiment 1900 may include a GPS backpack device 1930 and a tracked distance measuring device 1940. A smart phone 1950 (such as smart phone 1750 illustrated in FIG. 17A) may be secured to the tracked distance measuring device 1940 allowing the user 1960 to view device or system data, aim the tracked distance measuring device 1940, process and/or store POI and/or utility locate and mapping data. The GPS backpack device 1930 may be of the variety or share aspects with the GPS backpack device 1800 described in conjunction with FIG. 18. For instance, the GPS backpack device 1930 may include the four beacon antennas along the four corner of the frame of the GPS backpack device 1930 as well as the antenna secured circumferentially about the GPS antenna. Within GPS backpack device 1930, some such beacon antennas may be switched from broadcasting signals to instead receive the signals. For instance, signals 1942 and 1944 emitted by the tracked distance measuring device 1940 may be received by antennas within the GPS backpack device 1930 to determine the position and pose of the tracked distance measuring device 1940 relative to the GPS backpack device 1930. Such information may further be used to determine the location of and map any POIs identified by the tracked distance measuring device 1940 such as POI 1980. Within system 1900, the GPS backpack device 1930, tracked distance measuring device 1940, smart phone 1950, and/or other various system devices may include wireless transceivers (e.g., Bluetooth, WIFI, or other wireless communications transceivers) for wireless communication of data and/or control commands.

Figure 20:
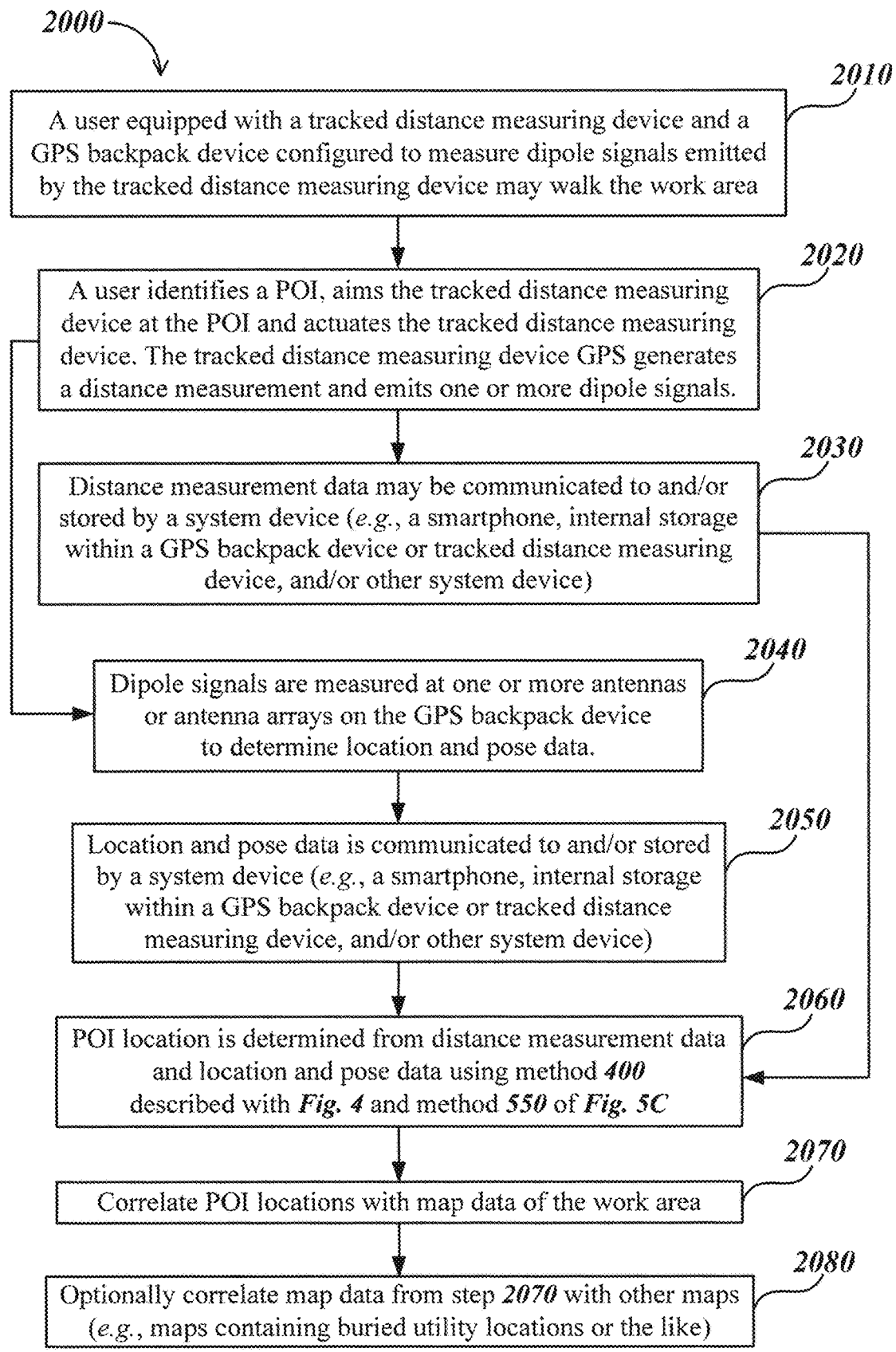
FIG. 20 illustrates details of an embodiment of a method for POI identification system embodiments configured to operate without a utility locator device.

FIG. 20 illustrates details of an embodiment of a method 2000 for POI identification system (such as the system 1900 illustrated in FIG. 19) embodiments configured to operate without a utility locator device. In a first step 2010 of the method 2000, a user equipped with a GPS backpack device and tracked distance measuring device may walk the work area. The GPS backpack device includes one or more antennas or antenna arrays to receive and measure signals emitted by the tracked distance measuring device to determine its location and pose relative to the GPS backpack device. In a second step 2020, the user may identify a POI and mark the POI with the tracked distance measuring device. The user may aim the tracked distance measuring device at the POI and actuate the tracked distance measuring device, for instance, by pulling a trigger/actuator or pushing a button on the tracked distance measuring device. Upon actuating the tracked distance measuring device, the tracked distance measuring device may emit one or more signals (e.g., signals 1942 and 1944 of FIG. 19) as well as collect a distance measurement. In a step 2030, the distance measurement data may be communicated and stored by a connected system device. For instance, the tracked distance measuring device, the GPS backpack device, a smart phone, and/or other connected system device may receive the distance measurement data generated by the tracked distance measuring device using method 400 of FIG. 4 and method 550 of FIG. 5C.

In a step 2040, the signal(s) emitted by the tracked distance measuring device are measured at one or more antennas at the GPS backpack device. In a step 2050, the location and pose data is communicated to and/or stored by a system device (e.g., a smart phone, internal storage within a GPS backpack device or tracked distance measuring device, and/or other system device). In a step 2060, the POI location is determined from the distance measurement data from step 2030 and the location and pose data from step 2050. This step may utilize the method 400 described with FIG. 4 and/or method 550 of FIG. 5C. In a step 2070, the POI locations are correlated with maps of the work area. In an optional step 2080, map data containing POI locations from step 2070 may be correlated with other maps of the work area. For instance, a user later equipped with a mapping utility locator device may walk the work area measuring and mapping electromagnetic signals within the work area to determine the presence, absence, location, depth, and other utility data of utility lines buried within the Earth. The utility locate map created may be merged with the POI location map from step 2080.

The various illustrative logical blocks, modules, functions, and circuits described in connection with the embodiments disclosed herein and, for example, in a processor or processing element as described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, firmware, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processing element may further include or be coupled to one or more non-transitory memory storage elements such as ROM, RAM, SRAM, or other memory elements for storing instructions, data, and/or other information in a digital storage format.

In some configurations, embodiments of a tracked distance measuring device and/or associated utility locator device or other devices or systems as described herein may include means for performing various functions as described herein. In one aspect, the aforementioned means may be in a processing element using a processor or processors and associated memory in which embodiments reside, and which are configured to perform the functions recited by the aforementioned means. The aforementioned means may be, for example, modules or apparatus residing in a printed circuit board element or modules, or other electronic circuitry modules, to perform the functions, methods, and processes as are described herein. In another aspect, the aforementioned means may be a module or apparatus configured to perform the functions recited by the aforementioned means.

In one or more exemplary embodiments, the functions, methods and processes described may be implemented in whole or in part in hardware, software, firmware, or any combination thereof. If implemented in software, the functions may be stored on or encoded as one or more instructions or code on a non-transitory processor-readable medium and may be executed in one or more processing elements. Processor-readable media includes computer storage media. Storage media may be any available non-transitory media that can be accessed by a computer, processor, or other programmable digital device.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any method claims may present elements of the various steps in a sample order, and are not meant to be limited to the specific order or hierarchy presented or inclusion of all steps or inclusion of alternate or equivalent steps unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps may have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, processes, methods, and/or circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium such as a non-transitory memory may be externally coupled to the processor such that the processor can read information from, and write information to, the storage medium and/or read and execute instructions from the storage medium. In the alternative, the storage medium may be integral to the processor. The processor and the storage medium may reside in an ASIC. The ASIC may reside in a device such as described herein another device. In the alternative, the processor and the storage medium may reside as discrete components. Instructions to be read and executed by a processing element to implement the various methods, processes, and algorithms disclosed herein may be stored in a non-transitory memory or memories of the devices disclosed herein.

It is noted that as used herein that the terms "component," "unit," "element," or other singular terms may refer to two or more of those things. For example, a "component" may comprise multiple components. Moreover, the terms "component," "unit," "element," or other descriptive terms may be used to describe a general feature or function of a group of components, units, elements, or other items. For example, an "RFID unit" may refer to the primary function of the unit, but the physical unit may include non-RFID components, sub-units, and such.

The presently claimed invention is not intended to be limited to the aspects shown herein, but is to be accorded the full scope consistent with the disclosures herein and their equivalents as reflected by the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the appended Claims and their equivalents.

We claim:

1. A distance measuring system, comprising:
   a utility locator device including one or more magnetic field antennas, a processing element programmed with instructions for processing received magnetic field signals to determine relative position of one or more magnetic field signal sources and in the utility locator device and provide the determined relative position as locator output data and/or store the determined relative position in a non-transitory memory of the locator;
   a positioning element, including a positioning element processor, operatively coupled to the locator for determining a location of the utility locator device in three dimensional space and providing output data defining the determined location;
   a tracked distance measuring device including:
   a housing;
   a laser rangefinder element integrated in the tracked distance measuring device including a rangefinder processor for determining a distance or relative position to a point of interest (POI) on a surface, and providing rangefinder output data corresponding to the determined distance or relative position to the POI;
   a magnetic field dipole sonde including:
   an alternating current (AC) signal generator including an output for providing an output AC current signal at one or more predetermined frequencies; and
   a magnetic field dipole antenna operatively coupled to the AC signal generator output to receive the output AC current signal and radiate a corresponding magnetic field dipole signal for sensing by the utility locator device;
   an actuator mechanism operatively coupled to the rangefinder element and the magnetic field dipole sonde for:
   triggering a distance determination; and
   triggering generation of the magnetic field dipole signal in conjunction with the triggering a distance determination; and
   a non-transitory memory for storing the output data from the positioning device and the output data from the utility locator device.

2. The system of claim 1, wherein the magnetic field sources include the magnetic field dipole sonde.

3. The system of claim 1, wherein the magnetic field sources include a buried utility carrying an AC current signal therein.

4. The system of claim 1, wherein the magnetic field sources include a buried RFID marker device.

5. The system of claim 1, wherein the rangefinder is a laser or acoustic rangefinder.

6. The system of claim 1, wherein the positioning element is a satellite positioning system receiver.

7. The system of claim 6, wherein the satellite positioning system receiver comprises a real-time kinematic (RTK) system receiver including a reference station for providing real-time correction data.

8. The system of claim 1, wherein the positioning element is a terrestrial positioning system receiver configured to determine absolute position data.

9. The system of claim 1, wherein the output AC current signal is a CW signal.

10. The system of claim 1, wherein the output AC current signal is a data modulated signal.

11. The system of claim 1, wherein the locator one or more magnetic field antennas include a dodecahedral antenna array and the locator processing element is configured to determine the relative position locator output data by processing outputs from the dodecahedral antenna array to determine gradient tensors and generating the output data based at least in part on the determined gradient tensors.

12. The system of claim 1, wherein a reference axis of the magnetic field dipole sonde is axially oriented with an aiming direction of the rangefinder.

13. The system of claim 1 further comprising a user input element.

14. The system of claim 13, wherein the user input element includes a microphone and an audio recorder operatively coupled to an output of the microphone for recording audio data provided from a user.

15. The system of claim 13, wherein the user input element includes pushbutton for inputting data from a user.

16. The system of claim 1 further including a radio transceiver module for communicating data to one or more remote system devices.

17. The system of claim 16, wherein the radio transceiver module is a Bluetooth or WiFi transceiver module.

18. The system of claim 1, wherein the one or more magnetic field sources includes the magnetic field dipole sonde, and the locator output data is generated at least in part using a lookup table including approximate signal origin location data associated with the magnetic field dipole sonde.

19. The system of claim 1, wherein the one or more magnetic field sources includes the magnetic field dipole sonde, and the locator output data is generated at least in part using an approximate signal location estimate.

20. The system of claim 1, wherein the one or more magnetic field sources include a buried utility and the magnetic field dipole sonde, and magnetic fields from the buried utility and the magnetic field dipole sonde are simultaneously processed to provide the locator output data, wherein the locator output data includes information associated with a relative position of the utility and information associated with a relative position of the sonde.

21. The system of claim 1, wherein the rangefinder element comprises an optical ground tracking element.

22. The system of claim 1, further comprising a camera element for capturing an image or video of the POI, wherein the image or video is stored in the non-transitory memory.

23. The system of claim 1, further comprising a backpack device to be carried by a user, the backpack device includes one or more antennas to broadcast dipole signals at pre-defined frequencies measureable at the utility locator device for determining location of the utility locator device relative to the backpack device.

24. The system of claim 1, wherein the positioning element is a satellite positioning system element disposed in or on the locator.

* * * * *